(12) United States Patent
Mu et al.

(10) Patent No.: US 9,829,358 B2
(45) Date of Patent: Nov. 28, 2017

(54) DEVICE FOR DETERMINING A PROPERTY OF A FLUID AND METHOD OF FORMING THE SAME

(71) Applicant: Agency for Science, Technology and Research, Singapore (SG)

(72) Inventors: Xiaojing Mu, Singapore (SG); Chengliang Sun, Singapore (SG); Alex Yuandong Gu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/031,982

(22) PCT Filed: Nov. 21, 2014

(86) PCT No.: PCT/SG2014/000553
§ 371 (c)(1),
(2) Date: Apr. 25, 2016

(87) PCT Pub. No.: WO2015/076757
PCT Pub. Date: May 28, 2015

(65) Prior Publication Data
US 2016/0273947 A1    Sep. 22, 2016

(30) Foreign Application Priority Data
Nov. 22, 2013   (SG) ..................... SG201308684-8

(51) Int. Cl.
*G01F 15/06*    (2006.01)
*G01F 1/48*     (2006.01)
(Continued)

(52) U.S. Cl.
CPC .......... *G01F 1/3218* (2013.01); *G01F 1/3209* (2013.01); *G01F 1/36* (2013.01);
(Continued)

(58) Field of Classification Search
None
See application file for complete search history.

(56) References Cited

U.S. PATENT DOCUMENTS

| | | |
|---|---|---|
| 5,223,763 A | 6/1993 | Chang |
| 6,011,346 A | 1/2000 | Buchanan et al. |

(Continued)

FOREIGN PATENT DOCUMENTS

| | | |
|---|---|---|
| EP | 2399676 A1 | 12/2011 |
| EP | 2065228 B1 | 4/2013 |
| WO | WO2012081008 A1 | 6/2012 |

OTHER PUBLICATIONS

Elfrink, et al., Shock Induced Energy Harvesting with a MEMS Harvester for Automotive Applications, IEEE IEDM11-677 29.51 (2011).

(Continued)

*Primary Examiner* — Harshad R Patel
(74) *Attorney, Agent, or Firm* — K. David Crockett, Esq.; Paul J. Backofen, Esq.; Crockett & Crockett, PC

(57) ABSTRACT

In various embodiments, a device for determining a property of a fluid may be provided. The device may include a fluid receiving structure configured to receive the fluid having a first condition. The device may further include a flow control structure coupled to the fluid receiving structure. The flow control structure may be configured to change the first condition of the fluid to a second condition. The device may further include a determination mechanism configured to determine the property of the fluid based on the second condition. The device may also include a voltage generation mechanism a voltage generation mechanism configured to generate a voltage based on the second condition.

20 Claims, 19 Drawing Sheets

(51) Int. Cl.
  *G01F 1/32*   (2006.01)
  *G01F 1/36*   (2006.01)
  *H02N 2/18*   (2006.01)

(52) U.S. Cl.
  CPC .............. *G01F 1/48* (2013.01); *G01F 15/063* (2013.01); *H02N 2/185* (2013.01)

(56) References Cited

U.S. PATENT DOCUMENTS

| | | |
|---|---|---|
| 6,424,079 B1 | 7/2002 | Carroll |
| 7,199,480 B2 | 4/2007 | Fripp et al. |
| 7,208,845 B2 | 4/2007 | Masters et al. |
| 7,310,052 B2 | 12/2007 | Bowman |
| 7,400,264 B2 | 7/2008 | Boaz |
| 7,560,856 B2 | 7/2009 | Chen et al. |
| 7,986,051 B2 | 7/2011 | Frayne |
| 8,314,503 B2 | 11/2012 | Liu et al. |
| 2003/0034900 A1 | 2/2003 | Han |
| 2005/0134047 A1 | 6/2005 | Schumacher et al. |
| 2009/0134632 A1 | 5/2009 | Kvisteroy et al. |
| 2009/0189778 A1 | 7/2009 | Juan et al. |

OTHER PUBLICATIONS

Sun, et al., PVDF Microbelts for Harvesting Energy from Respiration, 4 Energy and Environmental Science 4508 (2011).

Aktakka, et al., Thinned-PZT on SOI Process and Design Optimization for Piezoelectric Inertial Energy Harvesting, Transducers 1649 (Jun. 2011).

Elfrink, et al., Vacuum-Packaged Piezoelectric Vibration Energy Harvesters: Damping Contributions and Autonomy for a Wireless Sensor System, 20 Journal of Micromechanics and Microengineering 1 (Sep. 2010).

FIG. 14

1400 provide a fluid receiving structure configured to receive the fluid having a first condition
1402 couple a flow control structure to the fluid receiving structure, the flow control structure configured to change the first condition of the fluid to a second condition
1404 provide a determination mechanism configured to determine the property of the fluid based on the fluid having the second condition
1406 provide a voltage generation mechanism configured to generate a voltage based on the fluid having the second condition
1408

DEVICE FOR DETERMINING A PROPERTY OF A FLUID AND METHOD OF FORMING THE SAME

CROSS-REFERENCE TO RELATED APPLICATION

This application claims the benefit of priority of Singapore patent application No. 201308684-8, filed 22 Nov. 2013, the content of it being hereby incorporated by reference in its entirety for all purposes.

TECHNICAL FIELD

Various aspects of this disclosure relate to devices for determining properties of a fluid and methods of forming the devices.

BACKGROUND

The advantages of wireless automatic reading of gas meters have long been recognized. Such advantages accrue from the elimination of the high costs associated with manually reading meters located a long distance from a central utility office, inside of a customer's premises, at dangerous locations, and at the remote ends of a distribution network. Furthermore, in rural utility networks, long distances are typically encountered between each meter location. Thus, more employees are required to manually read each meter on a predetermined time schedule for accurate billing. However, most traditional wireless modules require a battery as a power source, and the battery may lead to problems such as adding weight to the whole system, limited life time, high cost of replacement, or potential hazard to the environment.

SUMMARY

In various embodiments, a device for determining a property of a fluid may be provided. The device may include a fluid receiving structure configured to receive the fluid having a first condition. The device may further include a flow control structure coupled to the fluid receiving structure. The flow control structure may be configured to change the first condition of the fluid to a second condition. The device may further include a determination mechanism configured to determine the property of the fluid based on the second condition. The device may also include a voltage generation mechanism configured to generate a voltage based on the second condition.

In various, a method of forming a device for determining a property of a fluid may be provided. The method may include providing a fluid receiving structure configured to receive the fluid having a first condition. The method may further include coupling a flow control structure to the fluid receiving structure, the flow control structure configured to change the first condition of the fluid to a second condition. The method may additionally include providing a determination mechanism configured to determine the property of the fluid based on the fluid having the second condition. The method may further include providing a voltage generation mechanism configured to generate a voltage based on the fluid having the second condition.

BRIEF DESCRIPTION OF THE DRAWINGS

The invention will be better understood with reference to the detailed description when considered in conjunction with the non-limiting examples and the accompanying drawings, in which:

FIG. 14 is a schematic illustrating a method of forming a device for determining a property of a fluid according to various embodiments.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure.

Figure 1:
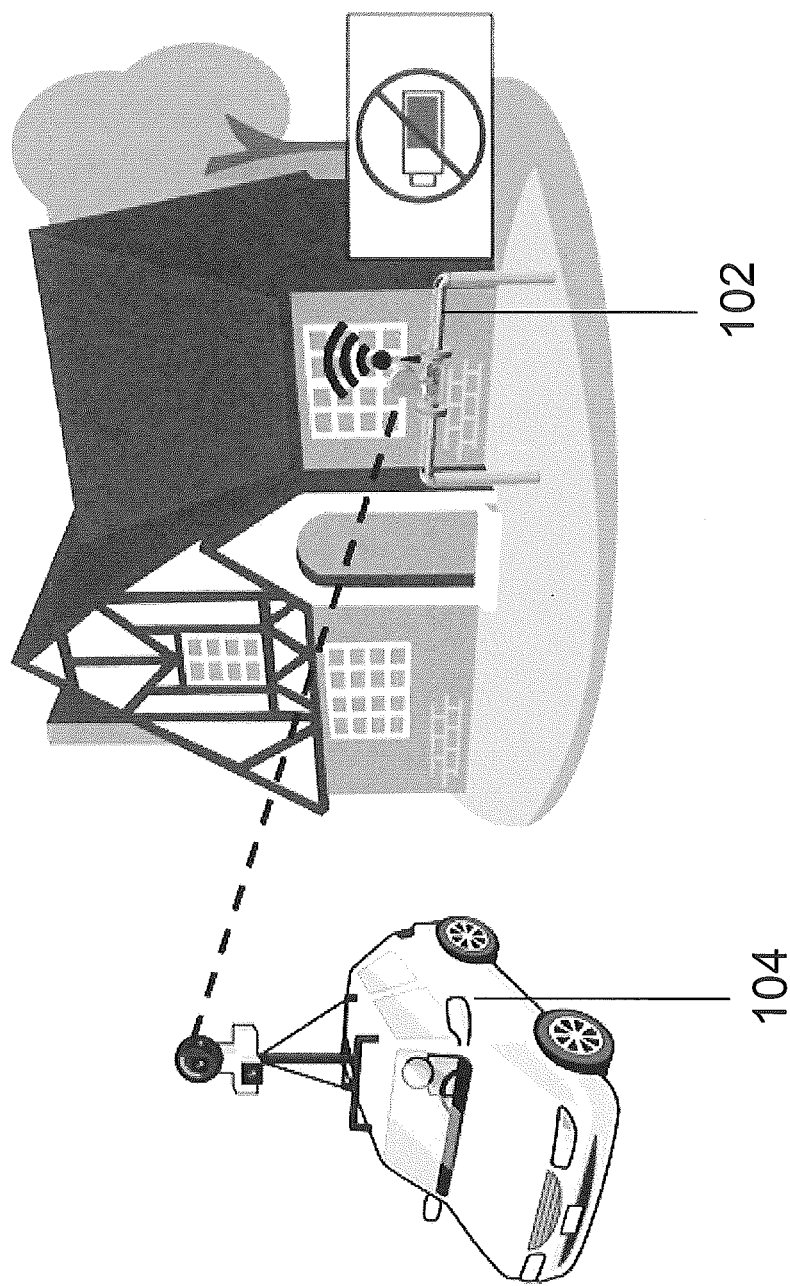
FIG. 1 is a schematic illustrating a wireless remote meter reading process according to various embodiments.

To solve the abovementioned problems, battery-less self-powered Energy Harvesting (EH) module for gas meter built-in processor and RF module (transmitter and sensors), which could scavenge energy from the environment (gas flow), are highly desirable. FIG. 1 is a schematic 100 illustrating a wireless remote meter reading process according to various embodiments. The gas meter 102 may be read via a wireless means from a remote location, such as from a vehicle 104. In various embodiments, the gas meter 102 may not require a battery. In various embodiments, the gas meter 102 may include an energy harvesting (EH) module or energy harvester (EH). The use of energy harvesting may remove one of the key factors limiting the proliferation of wireless nodes—the scarcity of power sources having the characteristics necessary to deliver the energy and power to the sensor node for years without battery replacement.

Plenty of motion energy from high frequency ambient environments may be efficiently harvested to power the wireless module. The gas flow rate is normally constant in the conduit of gas transmission line. However, the low frequency energy may not able to be effectively harvested by existing energy harvester devices.

A method of up-regulating the gas flow linear velocity, frequency up-conversion and high power generation may be provided herein. The method may be necessary for the efficient operation of energy harvesters (EHs). The energy harvesting capabilities of piezoelectric EHs may depend on the vibration source from which the energy can be extracted, the electromechanical properties of piezoelectric material, and structure of the functional elements where the energy conversion takes place. Various piezoelectric materials have been extensively investigated on the energy generation capability and have proved to be effective under different circumstances. Triboelectric materials or magnetic materials may also be used.

Figure 2:
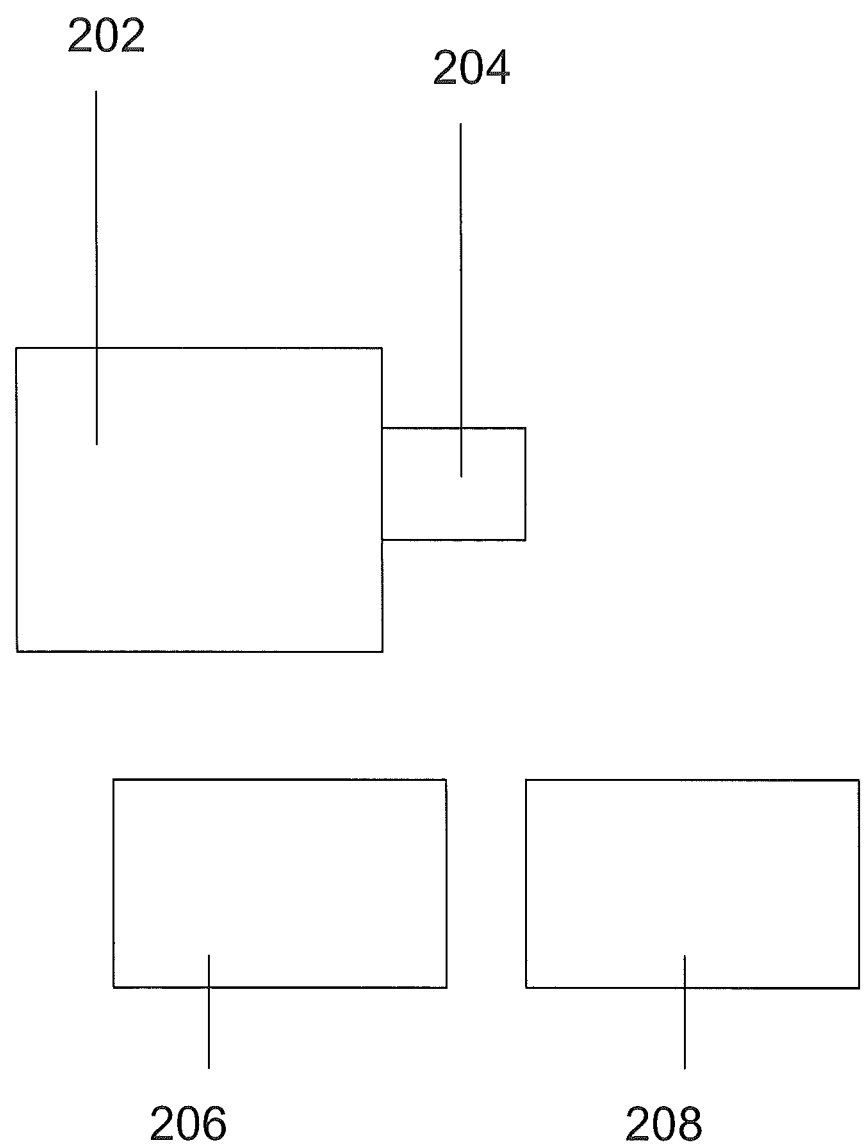
FIG. 2 is a schematic illustrating a device for determining a property of a fluid according to various embodiments.

FIG. 2 is a schematic 200 illustrating a device for determining a property of a fluid according to various embodiments. The device may include a fluid receiving structure 202 configured to receive the fluid having a first condition. The device may further include a flow control structure 204 coupled to the fluid receiving structure. The flow control structure 204 may be configured to change the first condition of the fluid to a second condition. The device may further include a determination mechanism 206 configured to determine the property of the fluid based on the second condition. The device may also include a voltage generation mechanism 208 configured to generate a voltage based on the second condition.

In other words, a device for measuring a property of a fluid, such as a volumetric flow rate or a mass flow rate of the fluid, may be provided. The device may include a fluid receiving structure 202 in which the fluid flows through. The device may further include a suitable structure 204 coupled to the fluid receiving structure 202 in which the suitable structure 204 is configured to effect a change in a condition of the fluid. The device may further include a determination mechanism 206 configured to determine the property of the fluid based on the changed condition of the fluid. The device may also include a voltage generation mechanism 208 configured to generate a voltage based on the changed condition.

In various embodiments, the device may be a gas meter. The fluid may be a gas. Various embodiments may provide a gas meter which is able to provide a reading on a property of the gas, such as a flow rate of the gas, and which is at least partially powered by the gas flowing through, e.g. by the kinetic of the gas that flows through the gas meter. Various embodiments may reduce the need or do not require a power source such as a battery.

The voltage generation mechanism 208 may be configured to at least partially convert a kinetic energy of the fluid to electrical energy.

In various embodiments, a "circuit" may be understood as any kind of a logic implementing entity, which may be special purpose circuitry or a processor executing software stored in a memory, firmware, or any combination thereof. Thus, in various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java.

In various embodiments, the flow control structure 204 may include or may be an obstruction within the fluid receiving structure 202. The obstruction may be a bluff body. The device may also include a vibration structure attached to the obstruction. The vibration structure may also be referred to as a flexible structure.

The obstruction may be further configured to generate a plurality of vortex swirls in the fluid so that the fluid is the second condition. The obstruction may be configured to alternately generate vortex swirls on a first side of the obstruction and a second side of the obstruction. Fluid flowing through the obstruction may be separated into two portions, i.e. a first portion on the first side and a second portion on the second side of the obstruction. The obstruction may be configured to create a local increase in pressure (and a local decrease in velocity) on the first portion and a local decrease in pressure (and a local increase in velocity) on the second portion. Subsequently, the obstruction may be configured to create a local decrease in pressure (and a local increase in velocity) on the first portion and a local increase in pressure (and a local decrease in velocity) on the second portion.

The obstruction may be configured to generate periodic fluctuations of increased pressure and decreased pressure on each side. When the first portion experiences an increased pressure, the second portion may experience a decreased pressure. When the first portion experiences a decreased pressure, the second portion may experience an increased pressure.

The vibration structure may be configured to move at a frequency due to the plurality of vortex swirls.

In various embodiments, the vibration structure may include a transducer configured to determine the property of the fluid based on the varying force. In various other embodiments, the device may include a transducer configured to determine the property of the fluid based on a varying force exerted by the plurality of vortex swirls. In other words, the transducer may be included in the vibration structure or in another part of the device. A transducer may also be referred to as a functional element.

A transducer or transducers described herein may include or be made of a suitable piezoelectric material such as but not limited to aluminum nitride (AlN), zinc oxide (ZnO), lithium niobate (LiNbO$_3$), zirconate-titanate (PZT) or poly-vinylidene fluoride (PVDF). The transducer or transducers may also include a triboelectric material such as Kapton. The transducer or transducers may also include a magnetic material. The transducers may include a combination of the different types of materials. For instance, the transducers may include piezoelectric transducers and triboelectric transducers. The transducer or transducers may include one or more of a piezoelectric material, a triboelectric material, and a magnetic material. For instance, the vibration structure may include the triboelectric material and the device may further include one or more electrodes (e.g. on the fluid receiving structure 202) for detecting the movement of charges as the vibration structure moves.

The transducer may be configured to generate the voltage because of the varying force exerted by the plurality of vortex swirls.

The first condition of the fluid may be a condition of the fluid being free of the plurality of vortex swirls. Correspondingly, the second condition of the fluid may be a condition of the fluid having the plurality of vortex swirls.

In various embodiments, the flow control structure 204 may be or may include an interconnecting channel having a width smaller than a width of the fluid receiving structure 202. The device may also include a (coupled) cavity coupled to the interconnecting channel so that the interconnecting channel is between the fluid receiving structure 202 and the (coupled) cavity. In various embodiments, the fluid receiving structure 202 may be or may include a cavity, i.e. a fluid receiving cavity, or a channel, i.e. a fluid receiving channel. The interconnecting channel may be referred to as a nozzle.

In various embodiments, the (coupled) cavity may be or may include a whistle type cavity or a Helmholtz (resonating) cavity. The (coupled) cavity may include a plurality of transducers. The determination mechanism may be further configured to determine the property of the fluid based on the first condition of the fluid. The fluid in the first condition may have a first pressure. The fluid in the second condition may have a second pressure. A first transducer of the plurality of transducers may be configured to generate the voltage. A second transducer of the plurality of transducers may be configured to determine the property of the fluid based on a difference between the first pressure and the second pressure. The second transducer may be configured to generate a voltage proportional or having a linear relationship with the difference between the first pressure and the second pressure. The transducers may include micro-belts, micro-nets, micro-cantilevers, micro-leafs/butterfly-wings and/or micro-beams. The transducers may be of various suitable shapes and sizes. In various embodiments, the transducers may include nanostructures or microstructures. The first condition of the fluid may be a condition of the fluid having the first pressure. The second condition of the fluid may be a condition of the fluid having the second pressure.

In various embodiments, the (coupled) cavity may be or may include a Helmholtz cavity. The (coupled) cavity may include a plurality of transducers, e.g. piezoelectric structures, configured to generate the voltage. The determination mechanism may be further configured to determine the property of the fluid based on the first condition of the fluid. The fluid in the first condition may have a first pressure. The fluid in the second condition may have a second pressure. The device may further include a pressure sensor coupled between the fluid receiving structure and the (coupled) cavity. The pressure sensor may be configured to determine the property of the fluid based on a difference between the first pressure and the second pressure. The pressure sensor may be configured to determine the property of the fluid based on a difference between the first pressure and the second pressure. The first condition of the fluid may be a condition of the fluid having the first pressure. The second condition of the fluid may be a condition of the fluid having the second pressure.

The device may be or may include a energy harvester (EH) module. The fluid receiving structure 202 and the flow control structure 204 may be included in the energy harvester (EH) module. Additionally, the EH module may include the determination mechanism 206 and a voltage generation mechanism 208. The EH module may be configured to determine the property of the fluid and provide a voltage (convert at least partially kinetic energy of the fluid to electrical energy).

The device may include a measurement unit may include the fluid receiving structure 202, the flow control structure 204 and the determination mechanism 206. The measurement unit may or may not include the voltage generation mechanism 208. If the measurement unit does not include the voltage generation mechanism 208, the voltage generation mechanism 208 may be included in a powering unit coupled to the measurement unit. The measurement unit may also be referred to as a measurement module.

The energy harvester (EH) module or measurement unit may also be coupled to a powering unit even if the energy harvester (EH) module or measurement unit includes a voltage generation mechanism 208.

The device may include a powering unit further coupled to the fluid receiving structure. The power unit may be coupled to the (coupled) cavity. The power unit may be coupled to the EH module or a measurement unit. The powering unit may be coupled to via an interconnecting channel such as a funnel tube. The powering unit may include one or more (additional) transducers may be configured to provide a further voltage. The one or more (additional) transducers may be configured to at least partially convert a further kinetic energy of the fluid to a further electrical energy. The one or more (additional) transducers may be within a (further coupled) cavity. The (further coupled) cavity may be coupled to the coupled cavity by a (further) interconnecting channel. In various embodiments, the (further coupled cavity) may include an obstruction, e.g. a bluff body, positioned at a predetermined positioned from the (further) interconnecting channel. The bluff body may be configured to generate a plurality of vortex swirls. The one or more (additional) transducers may be configured to be driven by the plurality of vortex swirls. The one or more (additional) transducers may be coupled to a capacitor such as a super capacitor, the super capacitor configured to store the electrical energy converted.

The device or determination circuit may further include a processor circuit. The processor circuit may also be referred to as an electronics processor module. The processor may be configured to determine or calculate the property of the fluid, e.g. the volumetric flow rate, based on one or more readings from the pressure sensor or the transducer. The processor circuit may alternatively or additionally determine or calculate data such as volume usage based on the property determined. The processor circuit may include one or more of a microcontroller unit, a microcontroller, a data logger, a super capacitor, a through silicon via/through silicon interconnects based integrated circuit, a sensor analog-to-digital conversion circuit and sensors.

The device may include a transmitter circuit and/or a transceiver circuit coupled to the processor circuit. The transmitter circuit and/or transceiver circuit may also be referred to as a signal transmission module. The transmitter circuit and/or a transceiver circuit may include an antenna. The transmitter circuit and/or a transceiver circuit may be configured to transmit data, e.g. data indicating the property of the fluid such as flow rate, volume usage etc to a remote location, such as a central location or a remote reader or a data logger. The data may be used for subsequent billing.

The processor circuit may be configured to store an identifier, which may be transmitted by the transmitter/transceiver circuit for identification of the device. The processor circuit may be coupled to a reader or a meter. The reader or meter may include an identifier.

The EH module may be configured to power the transmitter module or/and processor module.

The device or measurement unit may be or may include a gas flow meter for measuring a flow rate or quantity of a moving fluid. The device may measure the property using an open or closed conduit. The device may have a mechanical type, an inferential type or an electrical type flow meter. The gas meter may include a fixed restriction variable head type flow meter using different sensors such as orifice plates, venturi tubes, flow nozzles, pitot tubes or dall tubes, or a quantity meter such as positive displacement meter or mass flow meter. The variable head type flow meter may include a restriction of known dimensions (introduced along a pipeline). The restriction may cause a head loss or pressure drop and an increase in flow velocity.

Figure 3:
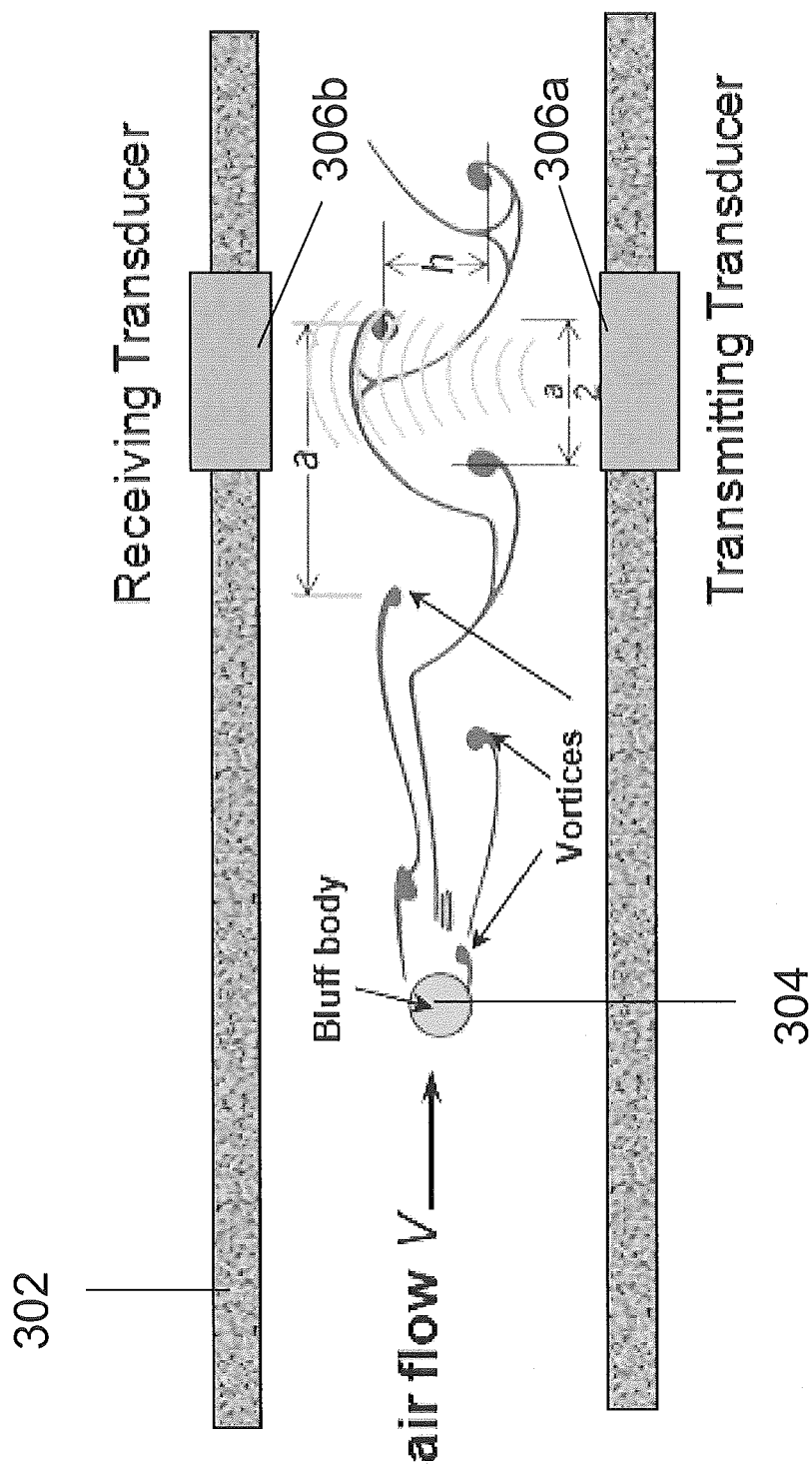
FIG. 3 is a schematic of a device for determining a property of a fluid according to various embodiments.

FIG. 3 is a schematic 300 of a device for determining a property of a fluid according to various embodiments. The device may include a fluid receiving channel 302. The device may include an obstruction such as a bluff body 304. The device may further include a transmitting transducer 306a and a receiving transducer 306b. The transmitting transducer 306a and the receiving transducer 306b may be provided along the fluid receiving channel 302. The transmitting transducer 306a and the receiving transducer 306b may be provided may be provided downstream (with reference to flow of the fluid) from the bluff body 304. The transmitting transducer 306a may be provided on a first side of the fluid receiving channel 302 and the receiving transducer 306b may be provided on a second side of the fluid receiving channel 302.

The device may be or may include a vortex shedding meter. The operating principle of the vortex shedding meter may utilize the vortex shedding phenomenon. When a fluid stream encounters the obstruction or bluff body 304, the fluid may separate, move around the bluff body 304 and may continue to flow downstream. At the point of contact, eddy currents or vortex swirls may be formed alternately on either side of the bluff body 304. This may create a local increase in pressure and a local decrease in velocity on one side of the bluff body 304. Meanwhile, the bluff body 304 may also create a local decrease in pressure and a local increase in velocity on the other side of the bluff body 304. After shedding a swirl from one side, the process may be reversed and a vortex or a swirl may be shed from the other side. The frequency of this alternating shedding process may be proportional to the velocity of the flowing stream of fluid as the fluid passes the point of contact, i.e. the bluff body 304. The rate of vortex shedding may be detected by an ultrasonic, electronic, or fiber-optic sensor, e.g. transducers 306a, 306b, that monitors the changes in the vortex pattern, or von karman vortex street downstream from the bluff body 304. A von karman vortex street is a repeating pattern of swirling vortices caused by the unsteady separation of flow of a fluid around blunt bodies. The transducers 306a, 306b may transmit a pulsating output signal to external readouts or data acquisition equipment. There vortex shedding flow meter may not require moving parts.

Figure 4:
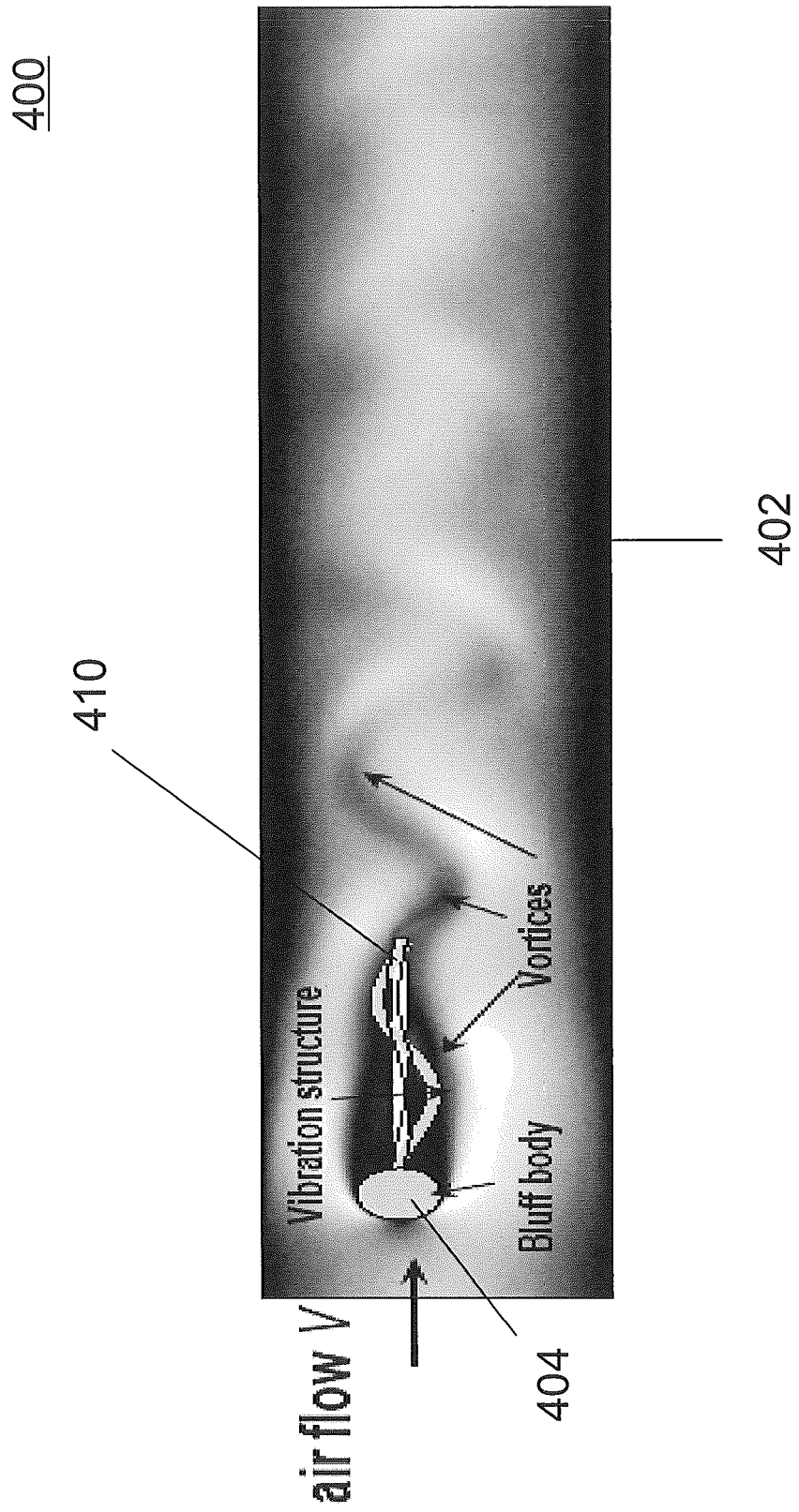
FIG. 4 is a schematic of a device for determining a property of a fluid according to various embodiments.

FIG. 4 is a schematic 400 of a device for determining a property of a fluid according to various embodiments. The device may include a fluid receiving structure configured 402, e.g. a fluid receiving channel, to receive the fluid having a first condition. The device may further include a flow control structure 404, i.e. an obstruction such as a bluff body, coupled to the fluid receiving structure 402, the flow control structure 404 configured to change the first condition of the fluid to a second condition. The first condition of the fluid may be a condition of the fluid being free of the plurality of vortex swirls. The second condition of the fluid may be a condition of the fluid having the plurality of vortex swirls. The obstruction 404 may be configured to generate the plurality of vortex swirls in the fluid so that the fluid is the second condition.

The bluff body 404 may be arranged within the fluid receiving channel 402. The device may further include a vibration structure 410 attached to the obstruction 404. The vibration structure 410 may be configured to move at a frequency due to the plurality of vortex swirls.

The vibration structure 410 may include a transducer configured to determine the property of the fluid based on a varying force exerted by the plurality of vortex swirls. The transducer may be configured to generate the voltage because of the varying force exerted by the plurality of vortex swirls. In other words, the vibration structure 410 may include the a determination mechanism configured to determine the property of the fluid based on the second condition and a voltage generation mechanism configured to generate a voltage based on the second condition. The transducer may be or may include the determination mechanism and the voltage generation mechanism. The device may be referred to as a vortex shedding flow meter.

The vibration structure 410 may be a non-rigid structure mounted on the back of the bluff body 404. The vibration structure 410 may be configured to vibrate with the frequency of vortex shedding. The transducer may be a piezoelectric transducer or a triboelectric transducer. As a result, the structure 410 may exhibit piezoelectric effect or triboelectric effect and the vibrating frequency may be readout from the structure 410. The voltage output may be used to power the device. The voltage output may be used to power the processing circuit coupled to the structure 410. Further, the voltage may be used to determine a property of the fluid, e.g. measure a flow rate of the fluid.

The average fluid velocity may be proportional to the frequency of vortex shedding and the width of the bluff body. This proportionality may be defined as the Strouhal number, which is dimensionless. Therefore, $$St = f * d/v \quad (1)$$

where: St=Strouhal number; f=frequency of vortex shedding; d=width of bluff body; v=average fluid velocity.

The actual width of a bluff body within a specific vortex meter may be fixed, and therefore constant. The frequency of vortex shedding may be linearly proportional to the average flowing velocity over a wide range of Reynolds numbers. The vortex shedding flow meter may operate accurately at Reynolds numbers from 10,000 up to 10,000,000.

The vortex shedding flow meter may be a volumetric flow meter. Therefore, to define the mathematics of vortex metering, the following relationship of volumetric flow may be defined:

$$Q = A * v \quad (2)$$

where: Q=volumetric flow rate; v=average fluid velocity; A=cross sectional area of flow path.

If a Strouhal number is substituted for average fluid velocity ("v"), it becomes:

$$Q = f*d*A/St \tag{3}$$

Since the Strouhal number, and bluff body width, and the cross sectional area of the flow meter are all constants (which is defined as "K"), the equation may become:

$$Q = f/K \tag{4}$$

Figure 5A:
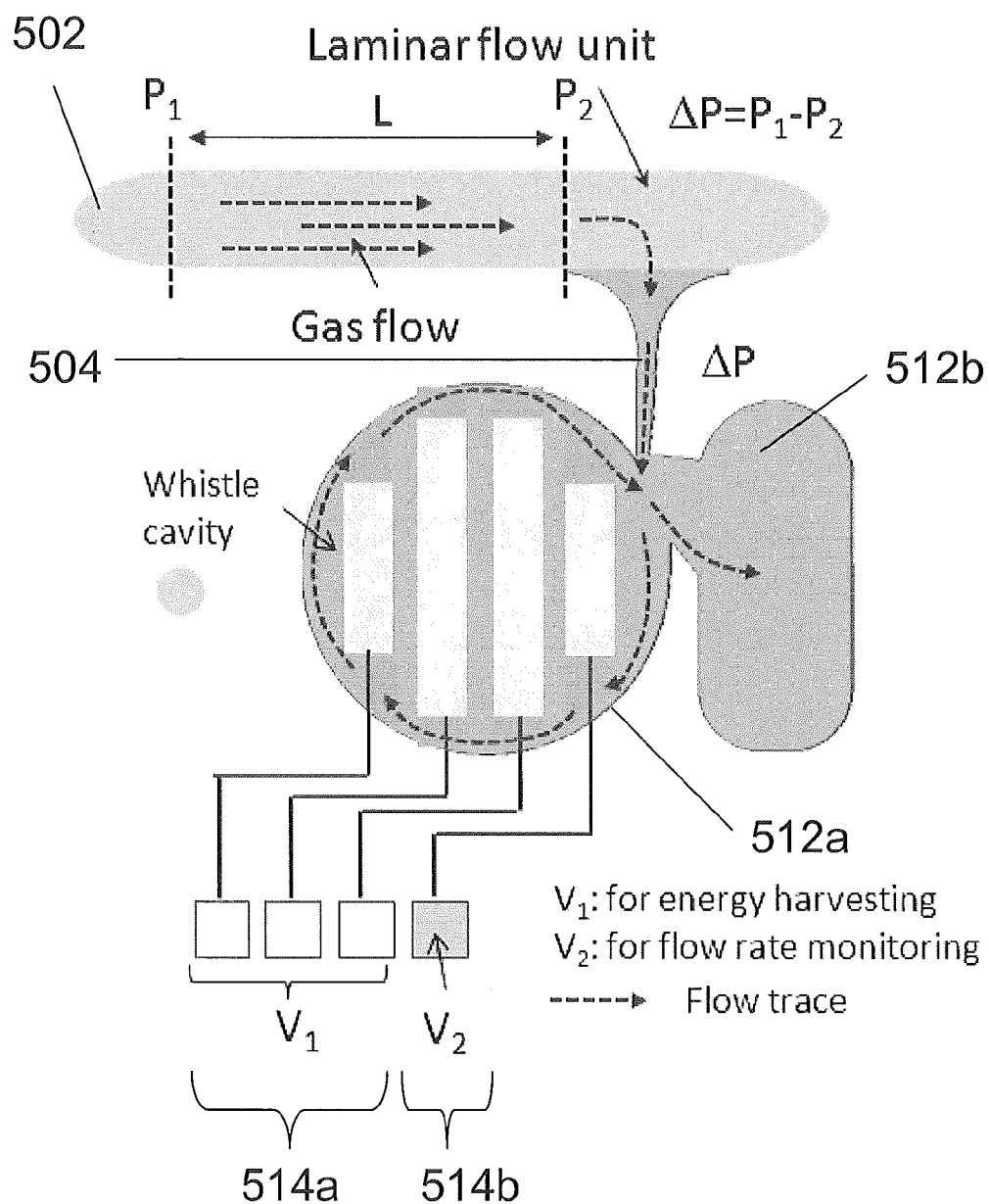
FIG. 5A is a schematic of a device for determining a property of a fluid according to various embodiments.

FIG. 5A is a schematic 500a of a device for determining a property of a fluid according to various embodiments. The device may include a fluid receiving channel 502. The device may include a flow control structure 504 such as nozzle 504. The device may further include cavity 512a, 512b. The cavity 512a, 512b may be a whistle type cavity and may include a first chamber 512a and a second chamber 512b coupled to the first chamber 512a. The nozzle 504 may be coupled to the first chamber 512a so that the nozzle 504 is between the fluid receiving channel 502 and the first chamber 512a. The first chamber 512a may include a plurality of transducers 514a, 514b. First transducers 514a of the plurality of transducers 514a, 514b may be configured to generate the voltage. A second transducer 514b of the plurality of transducers 514a, 514b may be configured to determine the property of the fluid based on a difference between the first pressure and the second pressure. The second transducer 514b may be configured to generate a voltage proportional or having a linear relationship with the difference between the first pressure and the second pressure. The fluid receiving channel 502 may also be referred to as a laminar flow unit (LFU). The difference between the first pressure and the second pressure may be referred to as an input air pressure.

The nozzle 504 may be configured to change the first condition of the fluid to a second condition. The device may further include a determination mechanism, i.e. second transducer 514b, configured to determine the property of the fluid based on the first condition and the second condition. The device may also include a voltage generation mechanism. i.e. 514a, configured to generate a voltage based on the second condition. The first condition of the fluid may be a condition of the fluid having the first pressure. The second condition of the fluid may be a condition of the fluid having the second pressure.

The whistle type cavity 512a, 512b may be integrated with the laminar flow unit 502. The laminar flow unit 502 may force the gas molecules to move in parallel paths along the length of the passage, nearly eliminating flow turbulence. In other words, the laminar flow unit 502 may be configured to generate a laminar flow of the fluid. The differential pressure drop may be measured within the laminar region. The Poiseuille Equation may quantify the relationship between pressure drop and flow and may be provided as follows:

$$Q = (P_1 - P_2)\pi r^4/8\eta L \tag{5}$$

where: Q=volumetric flow rate; $P_1$=static pressure at the inlet; $P_2$=static pressure at the outlet; r=hydraulic Radius of the restriction; η=absolute viscosity of the fluid. Since π, r and L are constant, the equation may be rewritten as:

$$Q = K(\Delta P/\eta) \tag{6}$$

K may be a constant factor determined by the geometry of the restriction. Equation (6) shows the linear relationship between volumetric flow rate (Q), differential pressure (ΔP), and absolute viscosity (η) in a simpler form. Taken temperature effect into consideration to correct the viscosity and the gas density, actual mass flow rate of the gas may be determined. The relationship between volume flow and mass flow may be defined as:

Mass flow rate=Volumetric flow rate*Density correction factor (7)

According to the experimental results, the amplitude of open-circuit voltage output ($V_{pp}$) of the transducer, i.e. the second transducer 514b, near the cavity inlet area may have a linear relationship with inlet air pressure drop (ΔP). ΔP may be determined based on the open-circuit voltage output. The volumetric flow rate and mass flow rate may be determined or calculated according to the equations (6) and (7).

Figure 5B:
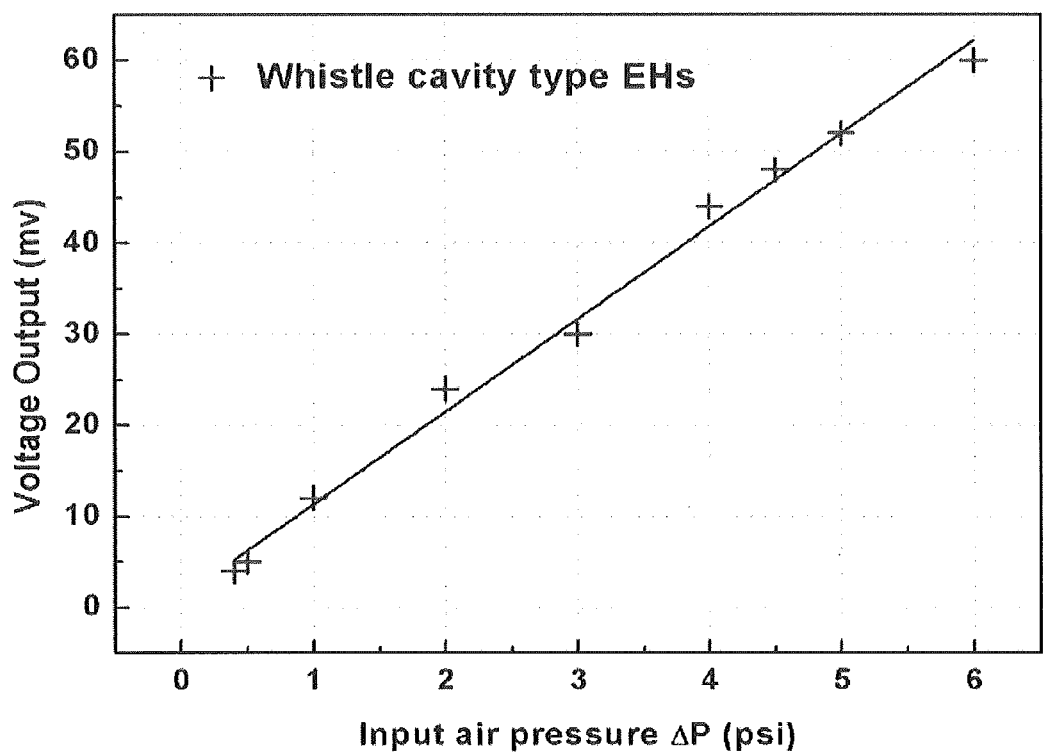
FIG. 5B is a plot of voltage output (in mV) against input air pressure $\Delta P$ (in pounds per square inch or psi) illustrating the linear relationship between open-circuit voltage output and the input air pressure $\Delta P$.

FIG. 5B is a plot 500b of voltage output (in mV) against input air pressure ΔP (in pounds per square inch or psi) illustrating the linear relationship between open-circuit voltage output and the input air pressure ΔP.

Figure 6A:
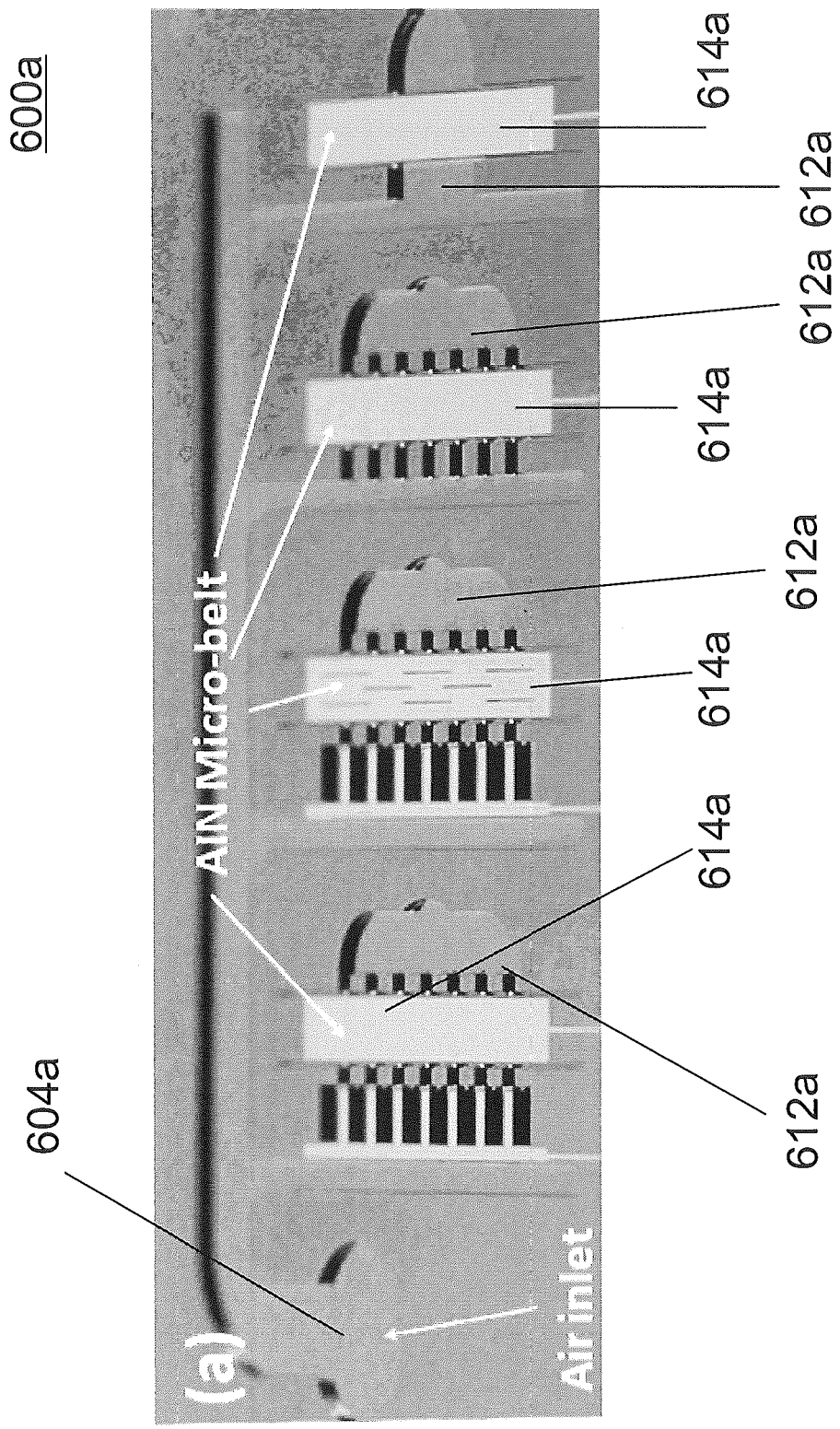
FIG. 6A is an optical image of a plurality of aluminum nitride micro-belt transducers within a cavity according to various embodiments.

FIG. 6A is an optical image 600a of a plurality of aluminum nitride micro-belt transducers 614a within a cavity 612a according to various embodiments. The cavity 612a may be a modified Helmholtz resonating cavity. An air inlet 604a may be coupled to the cavity 612a.

Figure 6B:
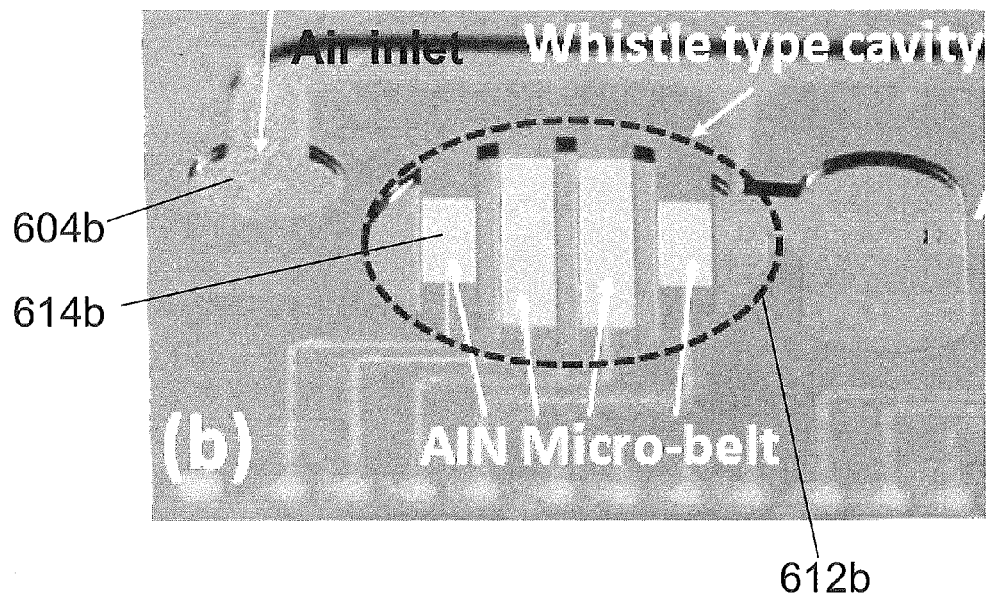
FIG. 6B is an optical image of a plurality of aluminum nitride micro-belt transducers within a cavity according to various embodiments.

FIG. 6B is an optical image 600b of a plurality of aluminum nitride micro-belt transducers 614b within a cavity 612b according to various embodiments. The cavity 612b may be a (traditional) whistle type cavity with a first chamber and a second chamber. An air inlet 604b may be coupled to the cavity 612b.

Figure 6C:
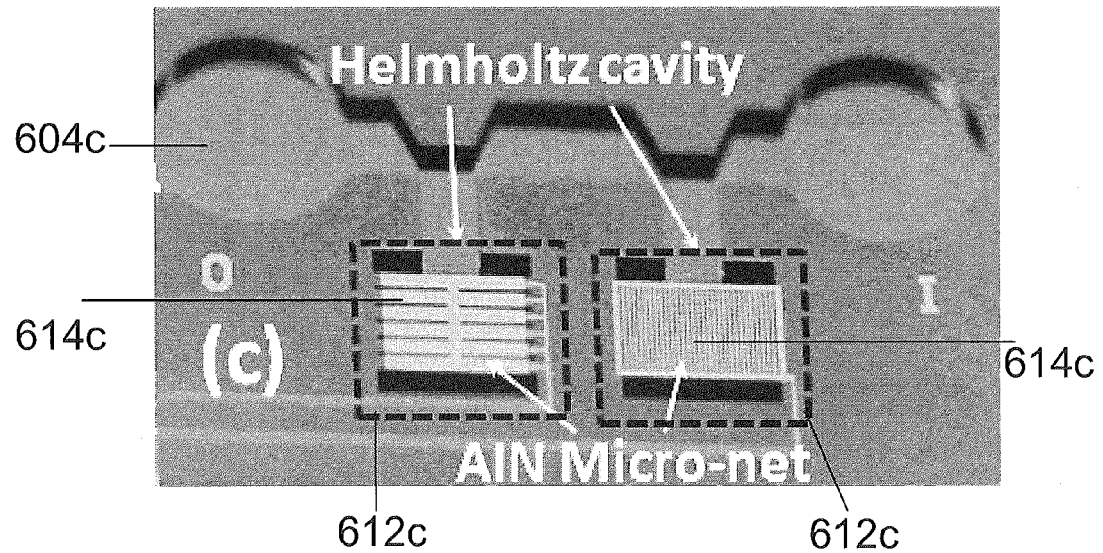
FIG. 6C is an optical image of a plurality of aluminum nitride micro-net transducers within a cavity according to various embodiments.

FIG. 6C is an optical image 600c of a plurality of aluminum nitride micro-net transducers 614c within a cavity 612c according to various embodiments. The cavity 612c may be a (traditional) Helmholtz resonating type cavity. An air inlet 604c may be coupled to the cavity 612c.

Figure 7:
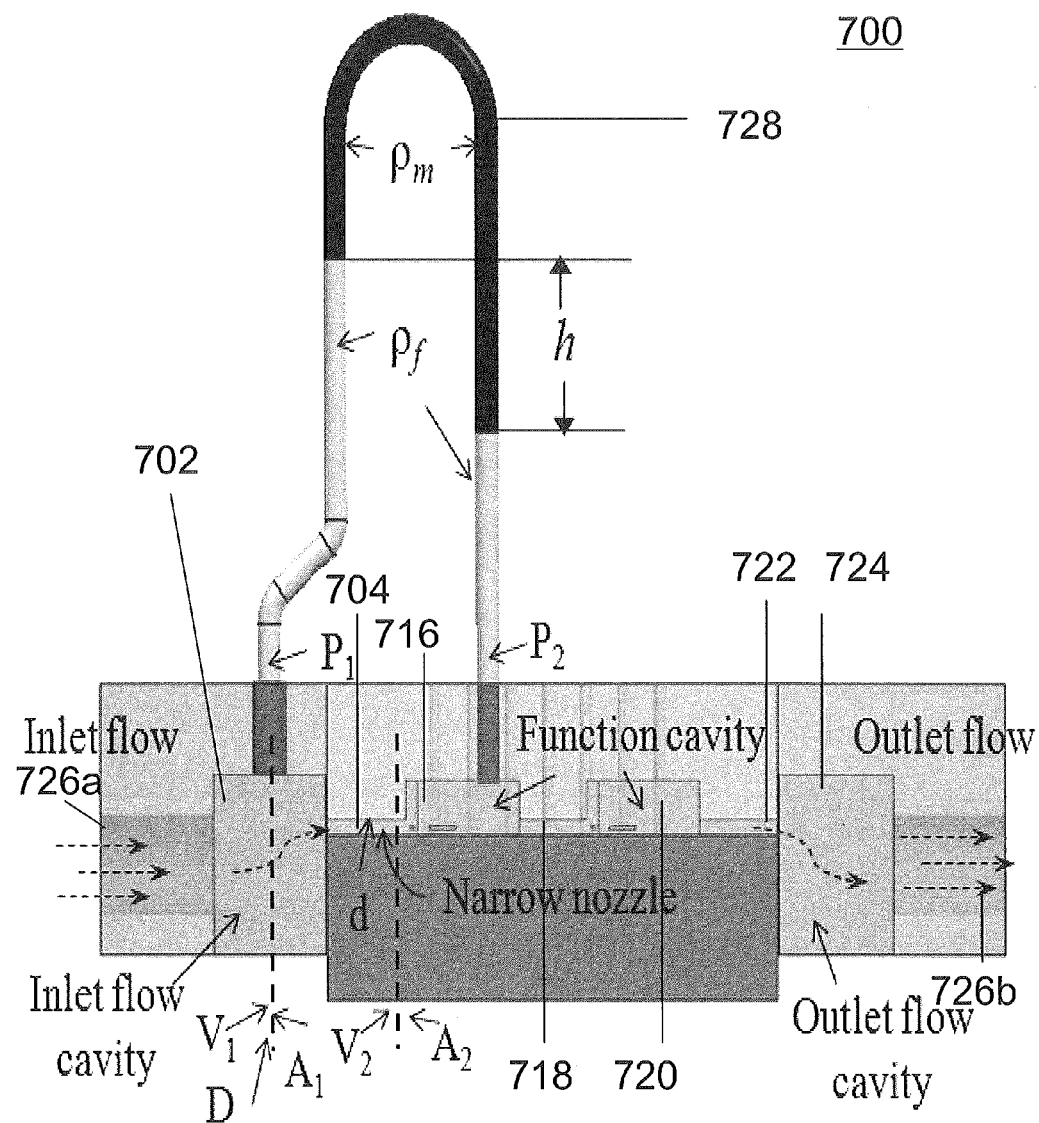
FIG. 7 is a schematic illustrating a device for determining a property of a fluid according to various embodiments.

FIG. 7 is a schematic 700 illustrating a device for determining a property of a fluid according to various embodiments. The device may include a fluid receiving structure 702 configured to receive the fluid having a first condition. The device may further include a flow control structure 704, i.e. an interconnecting channel, coupled to the fluid receiving structure 702. The flow control structure 704 may be configured to change the first condition of the fluid to a second condition. The fluid receiving structure 702 may be referred to as an inlet flow cavity.

The first condition of the fluid may be a condition of the fluid having the first pressure. The second condition of the fluid may be a condition of the fluid having the second pressure.

The device may also include a cavity 716, i.e. a functional cavity, coupled to the interconnecting channel 704 so that the interconnecting channel 704 is between the fluid receiving structure 702 and the cavity 716. The cavity 716 may be a Helmholtz resonating type cavity. The cavity 716 may include a plurality of transducers (not shown in FIG. 7) configured to generate the voltage. The plurality of transducers may be configured to generate a voltage based on the second condition. In other words, the voltage generation mechanism may be implemented by the plurality of transducers.

The device may further include a further cavity 720, i.e. a further functional cavity, and a further interconnecting channel 718 coupled between the further cavity 720 and the cavity 716. The further cavity 720 may include a further plurality of transducers (not shown in FIG. 7) configured to generate the voltage.

The device may further include an outlet flow cavity 724 and another interconnecting channel 722 coupled between the outlet flow cavity 724 and the further cavity 720. Fluid may flow in from an external channel or pipe into inlet flow cavity 702 (for instance through channel or pipe 726a). Fluid may flow out from the outlet flow cavity 724 into a further external channel or pipe (for instance through channel or pipe 726b).

The cavity 716 and/or cavity 720 may include an obstruction or bluff body. The fluid control structure may include the interconnecting channel and the obstruction.

The device may include a pressure sensor 728, such as a manometer, coupled between the fluid receiving structure 702 and the cavity 716. The pressure sensor 728 may be configured to determine the property of the fluid based on a difference between the first pressure and the second pressure. In other words, the determination mechanism may be implemented by the pressure sensor 728.

The narrow nozzles 704, 718 may serve as accelerators to increase the flow rate of inlet cavity gas, e.g. from flow rate of $V_1$ to the flow rate of $V_2$ at the outlet location of the nozzle 704, which results in a pressure drop from $P_1$ to $P_2$. The derivation of the expression of the volume flow rate may be summarized from equations (8)-(22).

The fluid may be compressible. The flow rate can be obtained if the gas is considered ideal and the flow is considered adiabatic.

The relation between pressure and velocity for flow of a compressible fluid through the narrow nozzle may be be found from the fluid and no external work done on or by the fluid and neglecting the very small datum level difference $(Z_1-Z_2)$, we have $$P_2 v_2 + \frac{V_2^2}{2g} + JE_2 = P_1 v_1 + \frac{V_1^2}{2g} + JE_1 \qquad (8)$$

where E=internal molecular energy of fluid; J=work equivalent of heat; v=specific volume of fluid; g=acceleration due to gravity.

Employing the definition of enthalpy H may provide:

$$V_2^2 - V_1^2 = 2gJ(H_1 - H_2) \qquad (9A)$$

For an idea gas and if specific heats are constant, $$H_1 - H_2 = \frac{KR}{J(K-1)} T[1-(P_2/P_1)^{(K-1)/K}] \qquad (9B)$$

where K=ratio of specific heats=$C_p/C_v$; R=gas constant for a given gas; T=absolute temperature.

From the equation of continuity (conservation of mass)

$$W = \frac{A_2 V_2}{v_2} = \frac{A_1 V_1}{v_1} \qquad (10)$$

where W is the mass flow rate, A is the cross-sectional area.

Combining the foregoing equations and manipulating, we get the relation for flow of ideal gases.

$$W = A_1 \beta^2 \sqrt{\frac{2gK}{K-1} \cdot \frac{P_1}{v_1} \cdot \frac{(P_2/P_1)^{2/K} - (P_2/P_1)^{(K+1)/K}}{1-\beta^4(P_2/P_1)^{2/K}}} \qquad (11)$$

where β is the ratio between the diameter of the restriction and the inside diameter of the pipe as provided in Equation (20).

A manometer, however, measures $(P_1-P_2)$ and not $P_2/P_1$. Therefore, it may be necessary to convert the equation (11) such that W is a function of $(P_1-P_2)$. Write $P_2/P_1 = 1-x$ such that $x=1-(P_2/P_1)$. In general, for gas flow $P_2/P_1$ is very close to unity such that x is very close to zero.

$$(P_2/P_1)^{2/K} \cong 1-(2/K)x = 1-(2/K)+(2/K)(P_2/P_1) \qquad (12)$$

Hence, $$(P_2/P_1)^{(K+1/K)} \cong 1-(K+1/K)+(K+1/K)(P_2/P_1) \qquad (13)$$

Using equation (13), equation (11) may be modified to $$W = CA_1 \beta^2 \frac{2g(P_1 - P_2)}{v_1[1-\beta^4(P_2/P_1)]^{2/K}} \qquad (14)$$

where C is the discharge coefficient.

By determining the mass flow rate for incompressible fluids and multiplying with Y, flow rate for compressible fluids can be found out and Y may be easily shown as $$Y = \sqrt{\frac{1-\beta^4}{1-\beta^4(P_2/P_1)^{2/K}} \cdot \frac{K(P_2/P_1)^{2/K}}{K-1} \cdot \frac{1-(P_2/P_1)^{(K-1)/K}}{1-(P_2/P_1)}} \qquad (15)$$

Instead of calculating Y from the equation (15) empirical relations may be suggested which give good results for limited $(P_2/P_1)$ values, such as $0.8 < 1.0$.

$$Y = 1 - [0.41 + 0.35\beta^4](P_1 - P_2/KP_1) \qquad (16)$$

When the gas contains moisture, a further correction may be required to account correctly for the density of the vapour $$M = 1 + \frac{P_v\{(S_v/S)-1\}}{P} \qquad (17)$$

where $P_v$=Vapour pressure (abs);
$S_v$=Vapour specific gravity referred to air at the same pressure and temperature;
S=Specific gravity of the gas; and
P=Pressure of the gas The specific volume of the gas may be found from $$V = \frac{yRT}{P} \qquad (18)$$

where y=compressibility factor; and
R=gas constant.

The flow equation for gases may be provided as $$Q = KA_2 Y \frac{v_b}{M_b} \sqrt{\frac{2gM_1(\rho_m - \rho_f)h}{v_1}} \qquad (19)$$

where $v_b$=Specific volume of gas at base condition;
$v_1$=Specific volume of gas at upstream conditions;
$M_1$=Moisture factor at upstream conditions;
$M_b$=Moisture factor at base conditions;

$\rho_m$=weight density of manometer fluid;
$\rho_f$=weight density of fluid over the manometer fluid;
h=differential at restriction, liquid column height; and
Q=volumetric flow rate.

Most variable head meters may depend on a restriction (narrow nozzle) in the flow path to produce a change in velocity. For the usual circular pipe, the Beta ratio is the ratio between the diameter of the restriction and the inside diameter of the pipe.

$$\beta = d/D \quad (20)$$

where d=diameter of the restriction (narrow nozzle); and
D=inside diameter of the pipe (front cavity in this disclosure).

Figure 8:
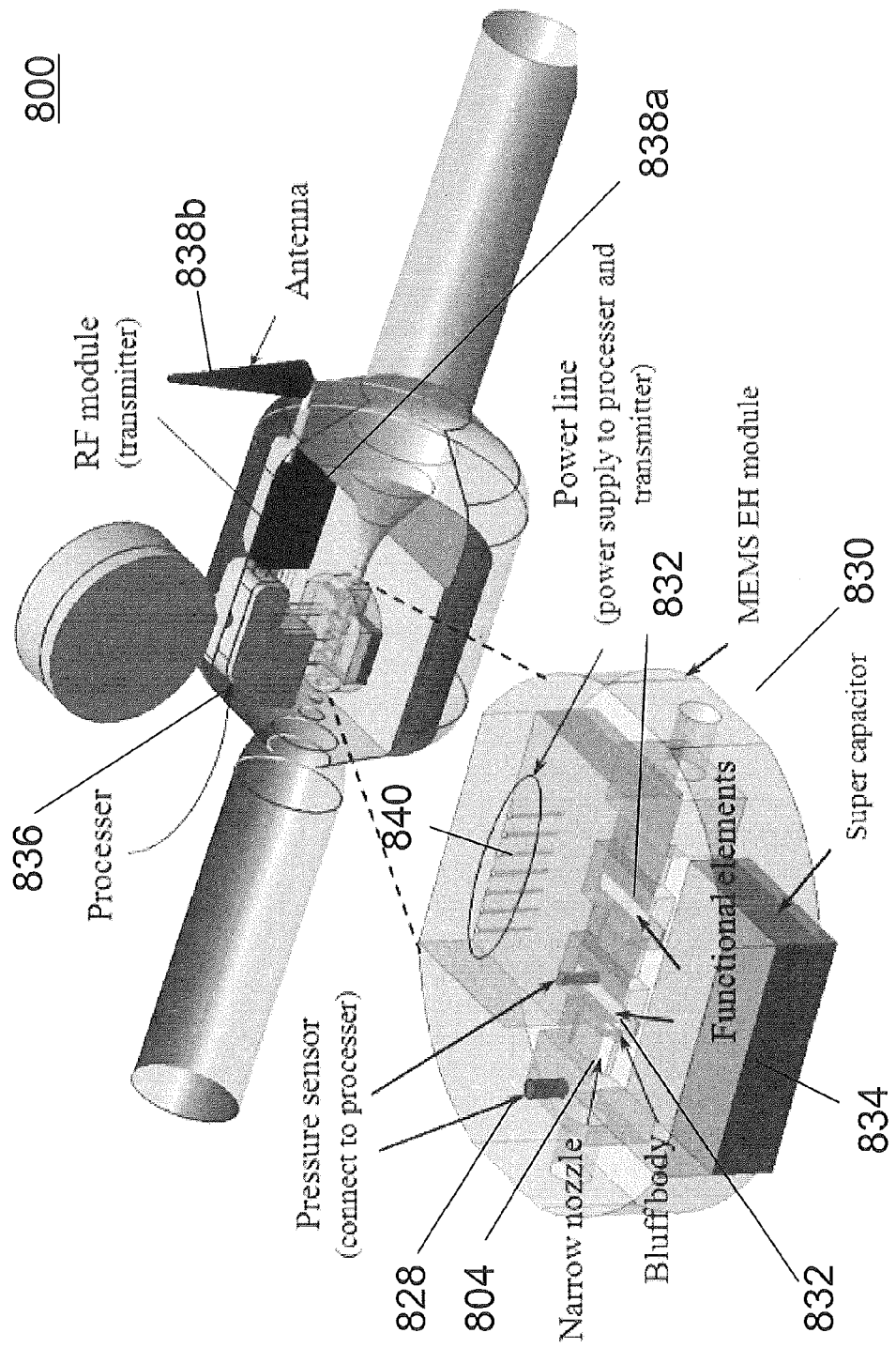
FIG. 8 is a schematic of a device for determining a property of a fluid according to various embodiments.

The discharge coefficient, $C_d$ may be defined as the ratio between actual volumetric flow rate and ideal volumetric flow rate:

$$C_d = \frac{q_{actual}}{q_{ideal}} \quad (21)$$

where $q_{actual}$=Actual volumetric flow rate; and
$q_{ideal}$=Ideal volumetric flow rate (Theoretical)
The flow Coefficient, K, may be defined as:

$$K = C_d \sqrt{1-\beta^4} \quad (22)$$

where K=Flow coefficient;
$C_d$=discharge coefficient; and
$\beta$=ratio of diameters=d/D FIG. 8 is a schematic 800 of a device for determining a property of a fluid according to various embodiments. The device may include an energy harvester (EH) module 830. The energy harvester (EH) module 830 may be similar to that illustrated in FIG. 7. The EH module 830 may include a (coupled) cavity. The device may include nozzle 804 coupled to the (coupled) cavity. The (coupled) cavity may be or may be a Helmholtz resonator type cavity. The (coupled) cavity may include functional elements or transducers 832, e.g. piezoelectric micro-belts. The (coupled) cavity may include a bluff body. The bluff body may be provided between the nozzle 804 and the functional elements or transducers 832. The device may further include a pressure sensor 828 coupled with a fluid receiving structure and the (coupled) cavity. Displacement sensors may be used alternatively or additionally to pressure sensor 828. The energy harvester (EH) module 830 may include an inlet nozzle-functional cavity-outlet nozzle structure.

The device may include a capacitor or a supercapacitor 834. The capacitor or a supercapacitor 834 may be coupled to the functional elements or transducers 832. The device may also include processing circuit or processor 836. Further, the device may include a radio frequency module or transmitter circuit 838a. The radio frequency module or transmitter circuit 838a may include an antenna 838b. The device may further include power lines 840 electrically coupled to the processing circuit or processor 836 and the radio frequency module or transmitter circuit 838a. The power lines 840 may electrically couple the processing circuit or processor 836 and the radio frequency module or transmitter circuit 838a to the capacitor or a supercapacitor 834.

Pressurized gas flow transmitted in the pipeline may be directed into the inlet cavity (i.e. the fluid receiving structure) of the EH module, which may be then accelerated by the narrow nozzle(s) 804. In various embodiments, the fluid receiving structure may be or may include a laminar flow unit (LFU) and the (coupled) cavity may be or may include a whistle type cavity. The differential pressure drop in the laminar flow unit (LFU) before the whistle cavity type may be used to measure the gas flow rate. The pressure drop may be determined by the amplitude of the open circuit voltage output of the micro-belt transducers 832 that is located in the cavity. The volumetric flow rate and mass flow rate may be obtained through feeding data indicating the pressure drop into the electronics processor 836. After that, the data may be transferred to the RF module 838a to be transmitted as signals. One cycle of wireless gas meter remote reading may thus be completed. Each meter in the system may include a reader, which may be electrically connected to an electronics processor 836. The reader may store an identifier of the corresponding meter. The meter may be connected to a data logger via a wireless transmission protocol. The total gas volume consumption in a time period may be recorded by the processor 836 that equipped in the gas meter. When the vehicle of the utility provider passes by the gas meter and is within a predetermined distance from the gas meter, the gas equipped RF module 838a waked up by a control signal transmitted from data logger and may start to transmit a readout or data of the gas volume consumption to the receiving terminal of the data logger in the vehicle. The energies generated from the functional elements (piezoelectric material stacks or triboelectric materials) of the EHs module may continuously supply the power to support the transmission and processing of data. In order to scavenge more energies from intensive vibration of them, pre-positive bluff body induced vortex shedding effect and Helmholtz resonating effect may be designed and introduced to the EH module. The harvested energy generated by the transducers may be stored in nearby integrated super capacitor 834. The harvested energy may be delivered to power gas meter built-in electronics 836 (including MCU, processor, microcontroller and/or meter data logger) and the RF module or transmitter 838. The microelectromechanial system (MEMS) self-powered EH module may not require a battery, making battery-less remote wireless gas meters possible.

Figure 9:
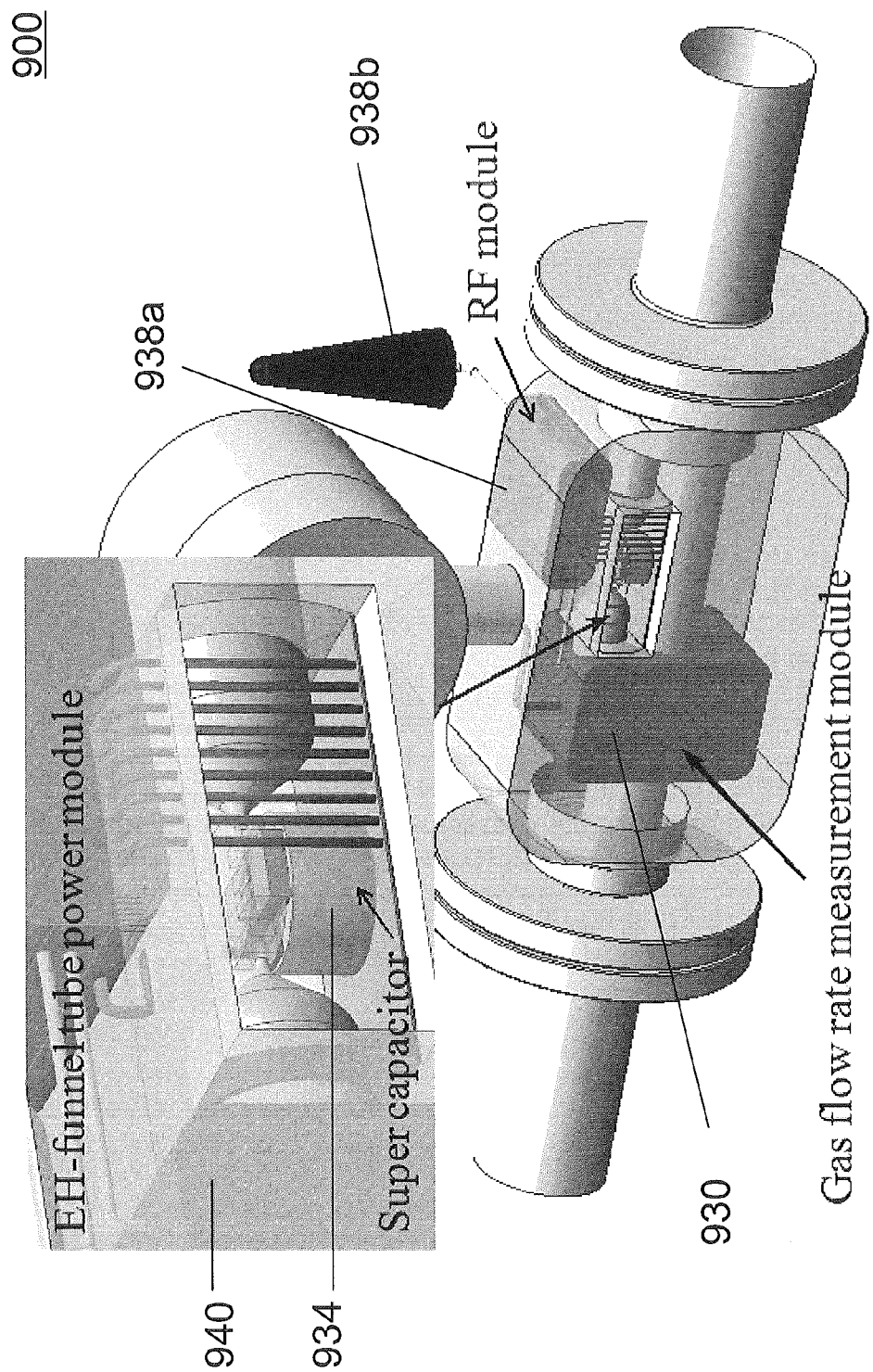
FIG. 9 is a schematic of a device for determining a property of a fluid according to various embodiments.

FIG. 9 is a schematic 900 of a device for determining a property of a fluid according to various embodiments. The device may include a gas rate measurement module or measurement unit 930. The device may also include a powering unit 940 coupled to the measurement unit 930 via an interconnecting channel or branch conduit (not shown in FIG. 9). The fluid may flow from the measurement unit 930 to the interconnecting channel to a funnel tube before flowing into the powering unit 940. The powering unit 940 may include one or more transducers configured to provide a (further) voltage. The device may include a capacitor or supercapacitor 934. The one or more transducers may be electrically coupled to the one or more transducers configured to provide a further voltage. The capacitor or supercapacitor 934 may be electrically coupled to the processor circuit and/or the transmitter circuit 938a (including antenna 938b). The powering unit 940 may include a nozzle. The powering unit may further include a bluff body arranged between the nozzle and the one or more transducers.

A powering cube may include the powering unit, the funnel tube and the supper capacitor. The powering cube may be equipped on any kind of gas meter. The gas flow rate measurement module 930 shown in FIG. 9 may be any available gas flow rate measurement module (including mechanical type and electrical types) or any measurement module described herein. A branch conduit may be added in the whole meter system, which may be connected to the outlet portion of existing flow rate measurement module 930. A branch portion of the gas flow may be directed into the powering unit 940 by the funnel tube. The gas flow may be accelerated by the narrow nozzle of EHs and cause an intensive vibration of the functional elements (piezoelectric material stacks and triboelectric materials) and which in turn may generate electrical energy. The electrical energy may be stored in the supercapacitor 934 that electrically coupled to the functional elements. The funnel tube of the powering cube may be mechanically connected (e.g. via a threaded connection) to the branch conduit, while the energies stored in the super capacitor may be interfaced (e.g. via a user-friendly interface such as a cable or an Universal Serial Bus (USB)) with the already built-in RF module 938a and processor. As long as the gas passes through the powering module, energies may be generated and stored accordingly.

The functional piezoelectric elements may be configured to harvest energy. The functional piezoelectric elements may include any kind of piezoelectric material like aluminum nitride (AlN), zinc oxide (ZnO), lithium niobate ($LiNbO_3$), or zirconate-titanate (PZT). The functional element may alternatively be a functional triboelectric element including a triboelectric material such as Kapton. The functional element may include or may be any type of structure including micro-belts, micro-nets, micro-leafs/butterfly wing and micro-cantilevers etc. with various shapes. In various embodiments, the functional element may include a soft piezoelectric material such as polyvinylidene Fluoride (PVDF) for a device with certain liquid or macromolecular gas applications.

Figure 10:
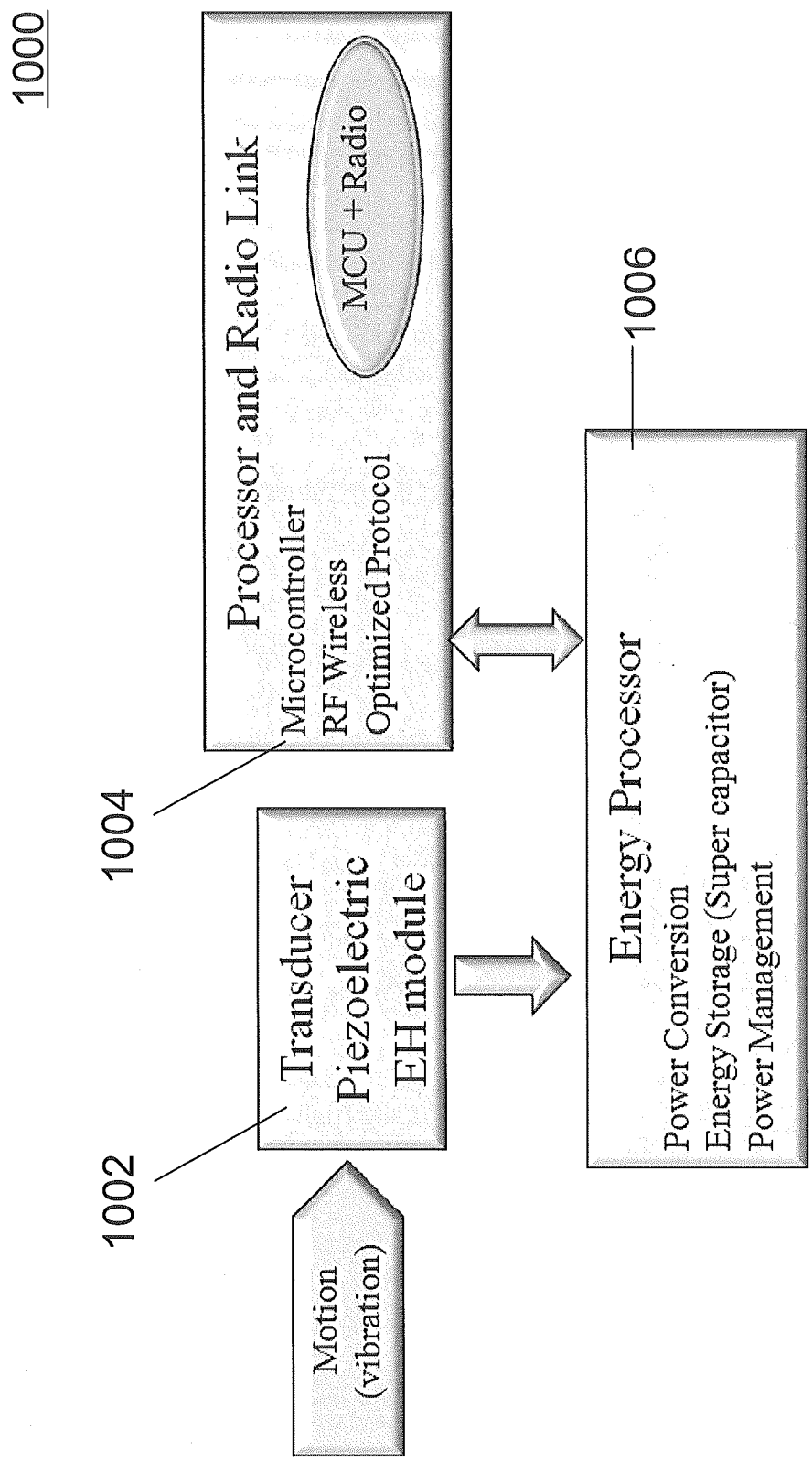
FIG. 10 is a schematic showing a system integrating the energy harvesting module, the processor circuit and the transmitter circuit according to various embodiments.

FIG. 10 is a schematic 1000 showing a system integrating the energy harvesting module 1002, the processor circuit 1004 and the transmitter circuit 1006 according to various embodiments.

Wireless Sensor Networks (WSNs) may be widely used for wireless sensing and gas monitoring (on properties such as flow rate, pressure, viscosity and chemical). With the availability of an integration system (as shown in FIG. 10) to perform sensing, signal processing, communication, and data collection functions, coupled with the versatility that wireless networks afford, it may be possible to move away from fixed, hard-wired network installations in both new construction as well as retrofits of existing installations. The power processor module 1006 may be capable of capturing, converting, storing and delivering energy in a form that may be used to provide the power needed by the system it serves. The power processor module 1006 may need to address three areas for successful EHs implementations: Energy Conversion, Energy Storage, and Power Management. The use of EHs may remove one of the key factors limiting the proliferation of wireless nodes—the scarcity of power sources having the characteristics necessary to deliver the energy and power to the sensor node for years without battery replacement. Significant economic advantages may be realized when compared with hard-wired solutions. Additional savings may be realized by removing the significant costs of battery replacement. Combining EHs transducers 1002, an power processor module 1006, low power sensors, an energy aware microcontroller, and an optimized RF module 1004 may allow the possibility of delivering long life, low maintenance battery-less gas meter using wireless remote reading networks.

Figure 11:
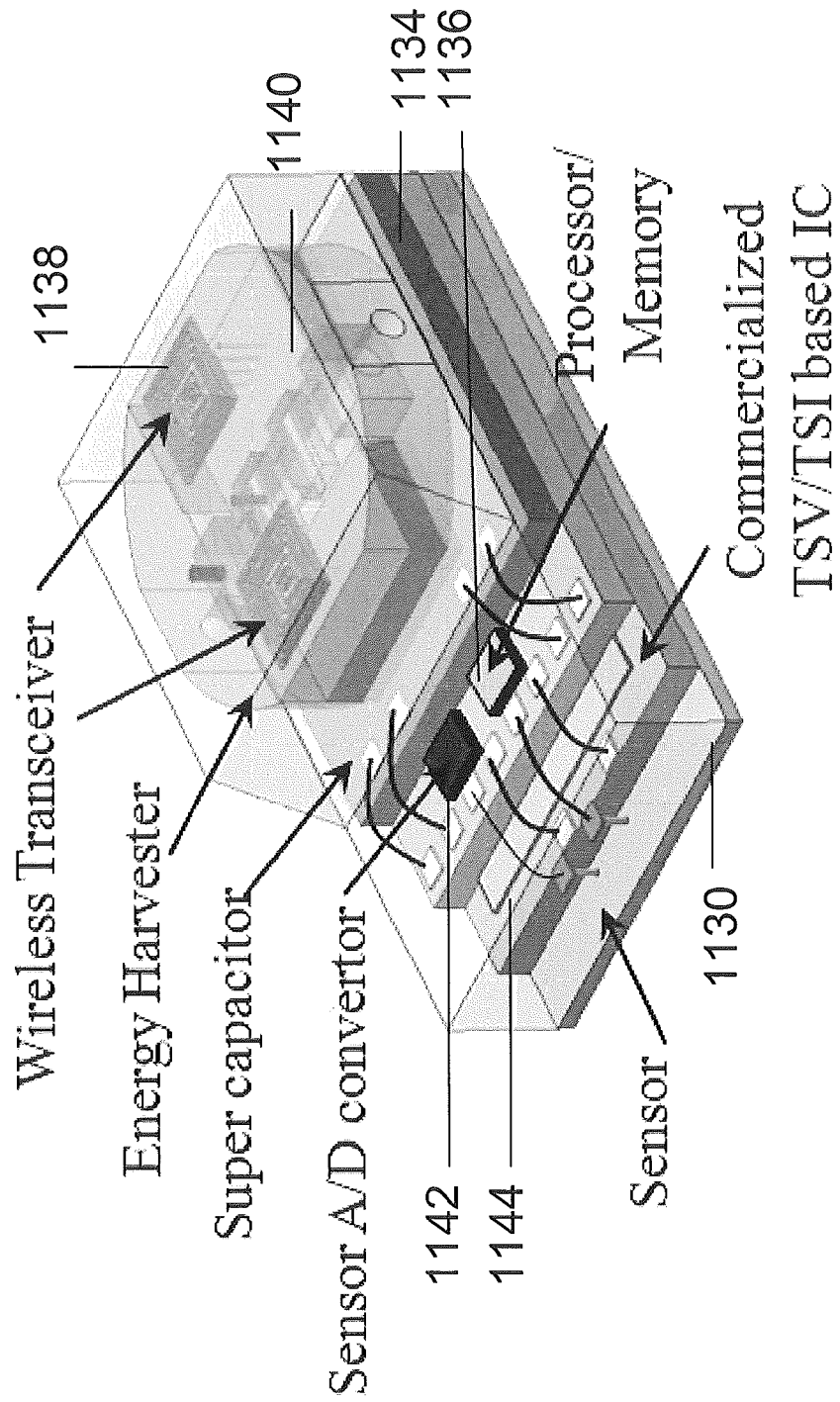
FIG. 11 is a schematic illustrating a wireless module according to various embodiments.

FIG. 11 is a schematic 1100 illustrating a wireless module according to various embodiments. The wireless module may include a wireless transceiver 1138 for transmitting and receiving signals, a MEMS EH transducer 1140 for generating electrical energy for powering the module, a super capacitor 1134 for storing the converted energy, an Energy Processing/Memory module or processor circuit 1136, TSV/TSI based IC 1144, a sensor A/D convertor 1142 and sensors 1130.

Figure 12A:
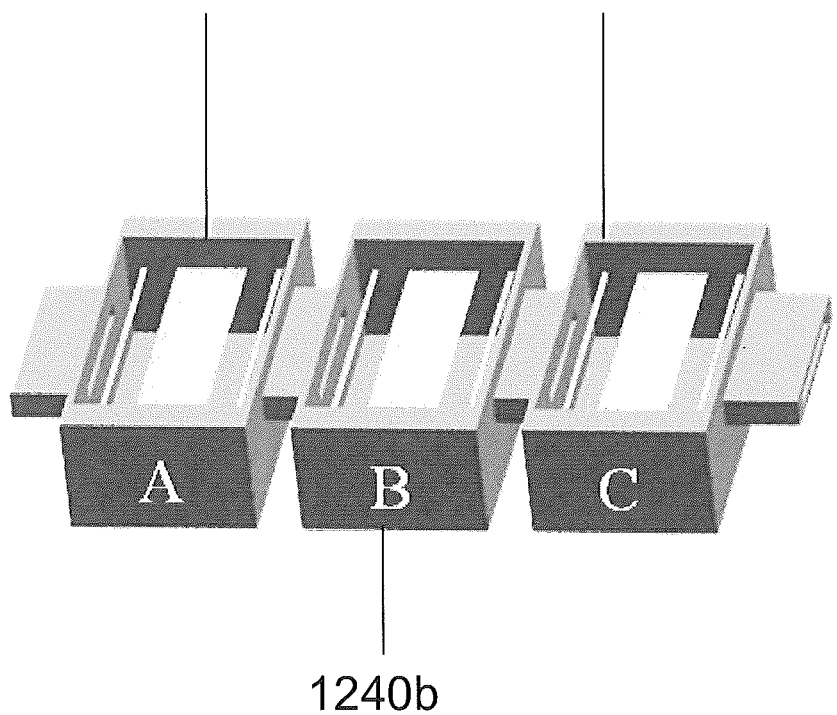
FIG. 12A shows a schematic showing a system including a plurality of devices according to various embodiments.
Figure 12B:
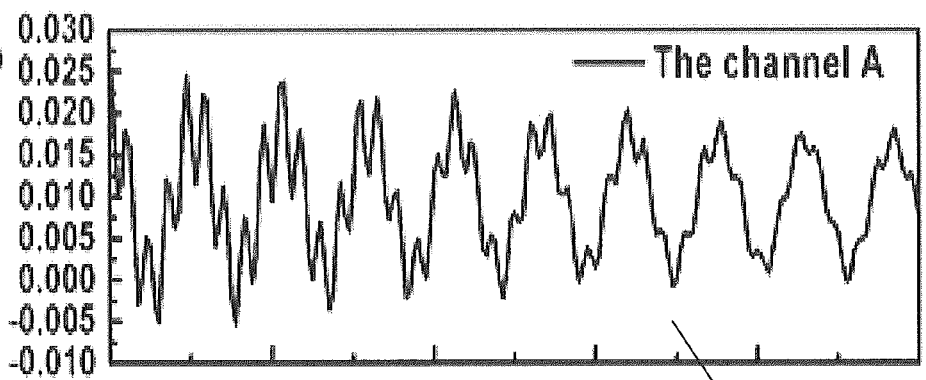
FIG. 12B is a group of plots 1202a, 1202b, 1202c of output voltages (volts) as a function of time (milliseconds or ms).
Figure 12B:
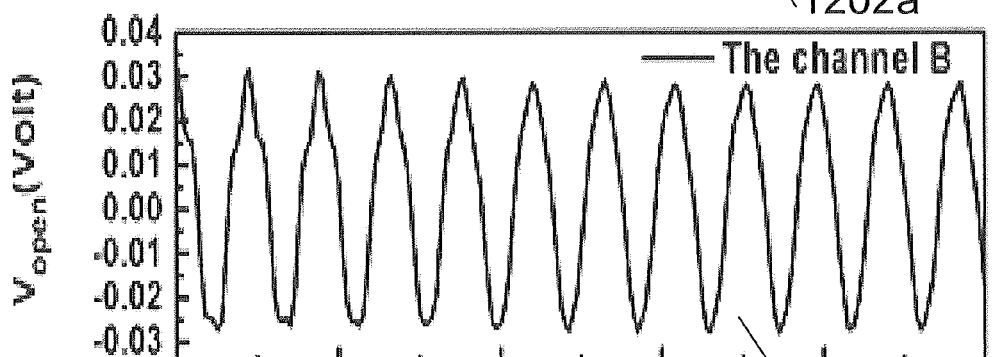
Figure 12B:
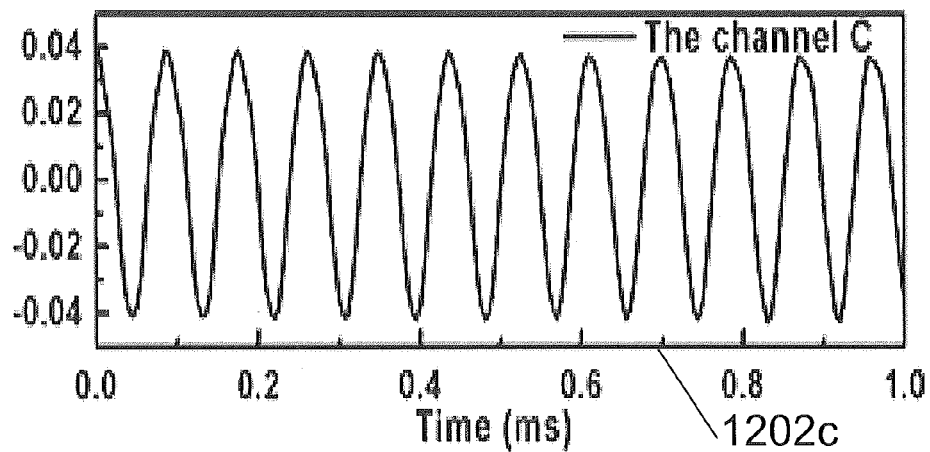
Figure 12C:
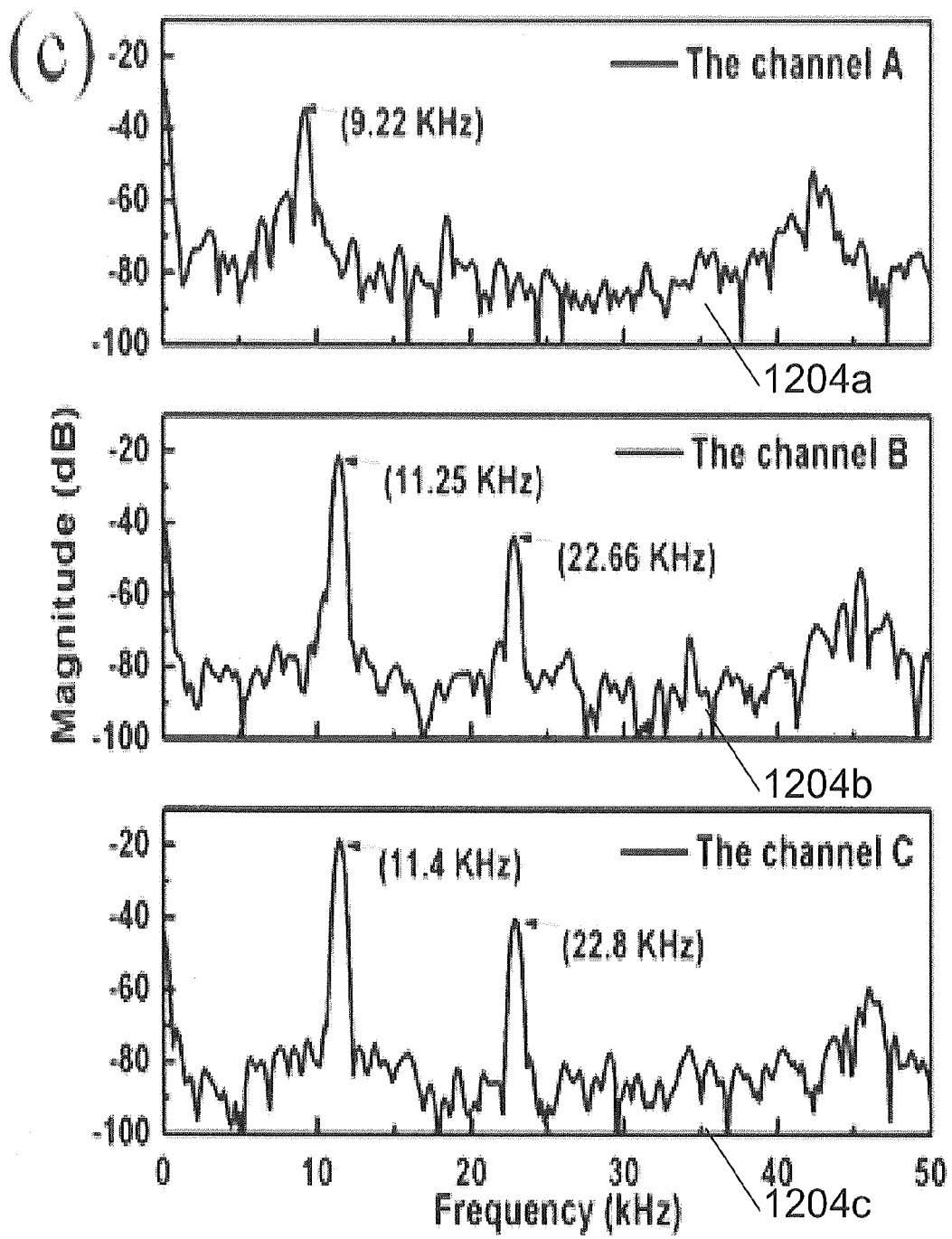
FIG. 12C is a group of frequency spectra plots 1204a, 1204b, 1204c of magnitudes (decibels of dB) as a function of frequency (kilohertzs of kHz).

A system including a plurality of devices may be provided. FIG. 12A shows a schematic 1200a showing a system including a plurality of devices 1240a, 1240b, 1240c according to various embodiments. A first device 1240a may be fluidically coupled to a second device 1240b. The second device 1240b may be fluidically coupled to a third device 1240c. Each device 1240a, 1240b, 1240c may include one or more transducers. Each device 1240a, 1240b, 1240c may also include a flow control structure. A device 1240a, 1240b or 1240c may be configured to harvest energy, i.e. configured to generate a voltage. A device 1240a, 1240b or 1240c may additionally or alternatively be configured to determine the property of the fluid. The system may also be referred to as a multi cavity device or system. A first device may be coupled to a second device via a channel or nozzle. The channel or nozzle may have a width or cross-sectional area smaller than the width or cross-sectional area of the cavity. The cross-sectional area may refer to an area across the channel or cavity that is substantially perpendicular to flow of the fluid. Each device may include a Helmholtz cavity. FIG. 12B is a group 1200b of plots 1202a, 1202b, 1202c of output voltages (volts) as a function of time (milliseconds or ms). 1202a may represent the open voltage generated from device 1240a as a function of time. 1202b may represent the open voltage generated from device 1240b as a function of time. 1202c may represent the open voltage generated from device 1240c as a function of time. FIG. 12C is a group 1200c of frequency spectra plots 1204a, 1204b, 1204c of magnitudes (decibels of dB) as a function of frequency (kilohertzs of kHz). 1204a may represent the frequency spectra from device 1240a. 1204b may represent the frequency spectra from device 1240b. 1204c may represent the frequency spectra from device 1240c. The time and frequency spectra of the open circuit voltage spectrum $V_{open}$ corresponding to three cavities (as shown in FIGS. 12B-C) indicate that only two major frequencies (about 11 kHz and about 22 kHz) dominate the fluid vibration in the cavity. These frequencies may correspond to the first and second order modes of Helmholtz resonating in the cavities. The EHs transducer may have two characteristics: 1) cavity geometry determines the operating frequency; 2) the bluff body facilitates vibration and the vibration may be regularized by the vortex shedding effect. Fast Fourier Transform (FFT) spectrum reveals that most energy output for device with bluff body may be located around the cavity resonant frequency.

Figure 13A:
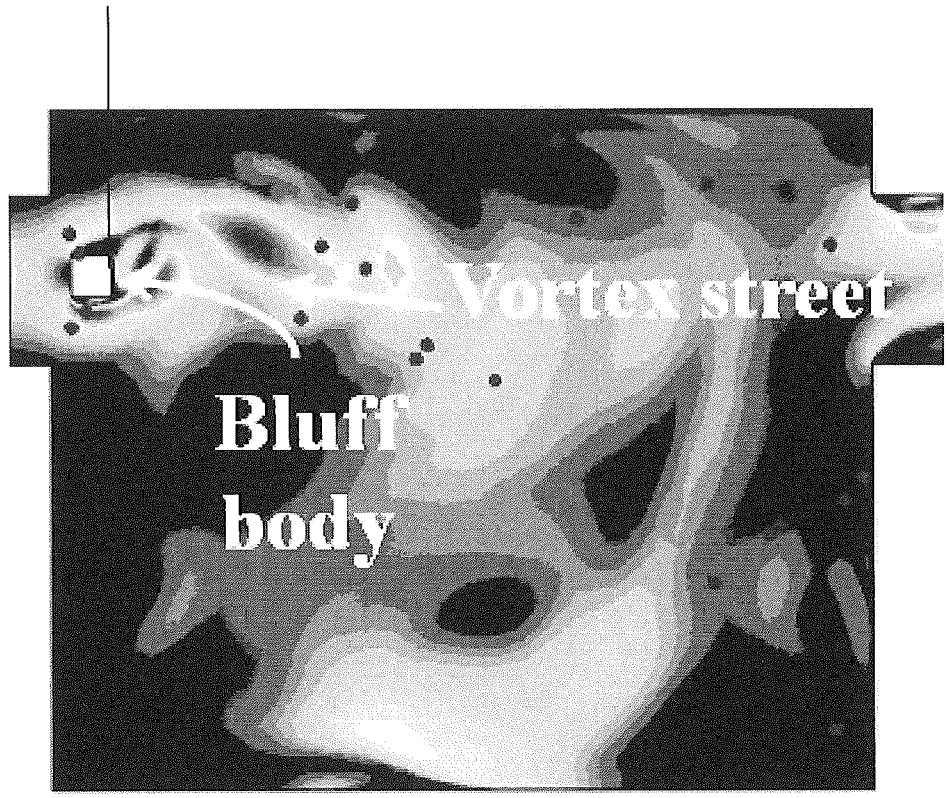
FIG. 13A is an image illustrating the simulated fluid behaviour in a single cavity energy harvester according to various embodiments.
Figure 13B:
FIG. 13B is an image illustrating the simulated fluid behaviour in a three-cavity energy harvester according to various embodiments.
Figure 1:
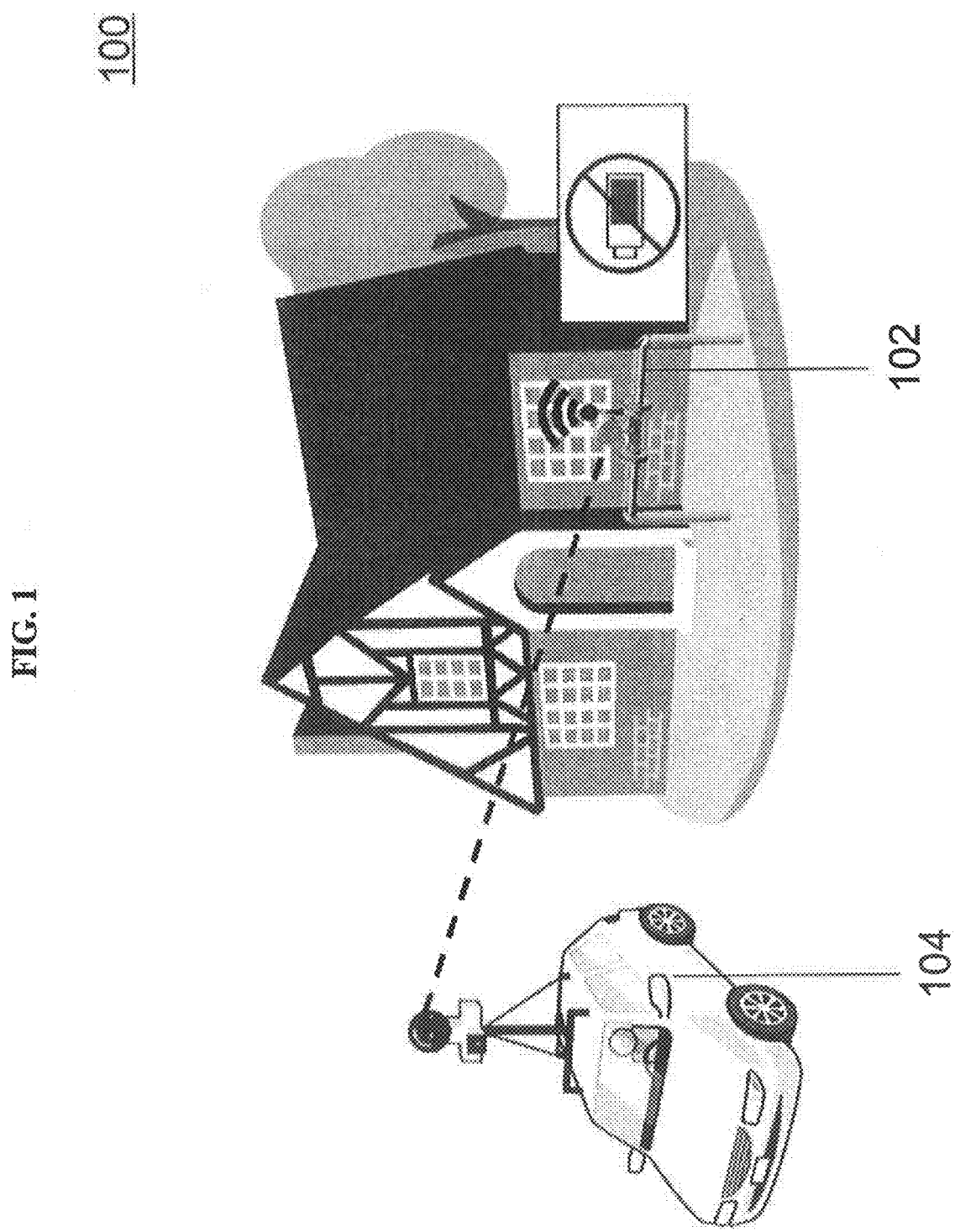
Figure 2:
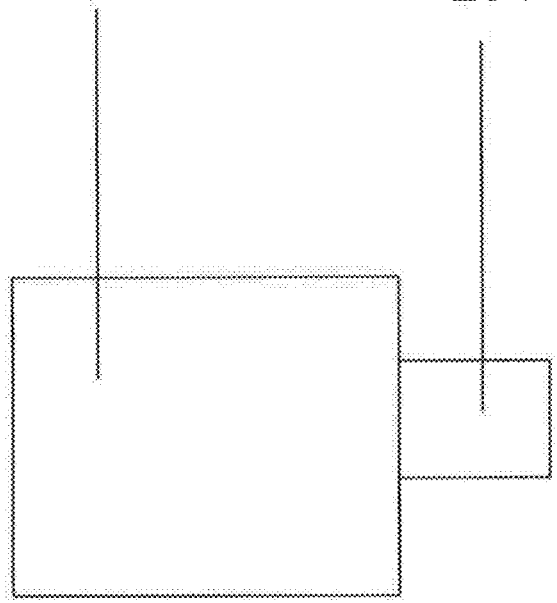
Figure 2:
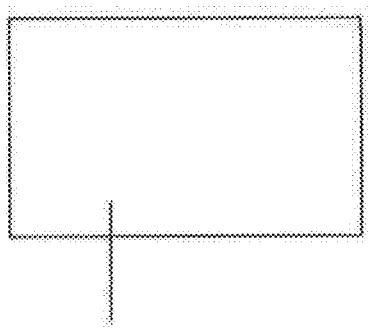
Figure 2:
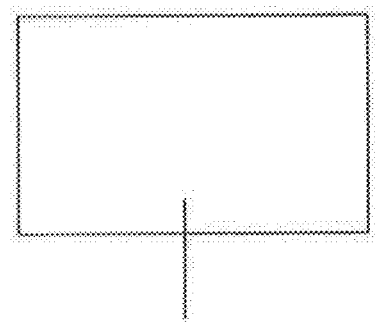
Figure 3:
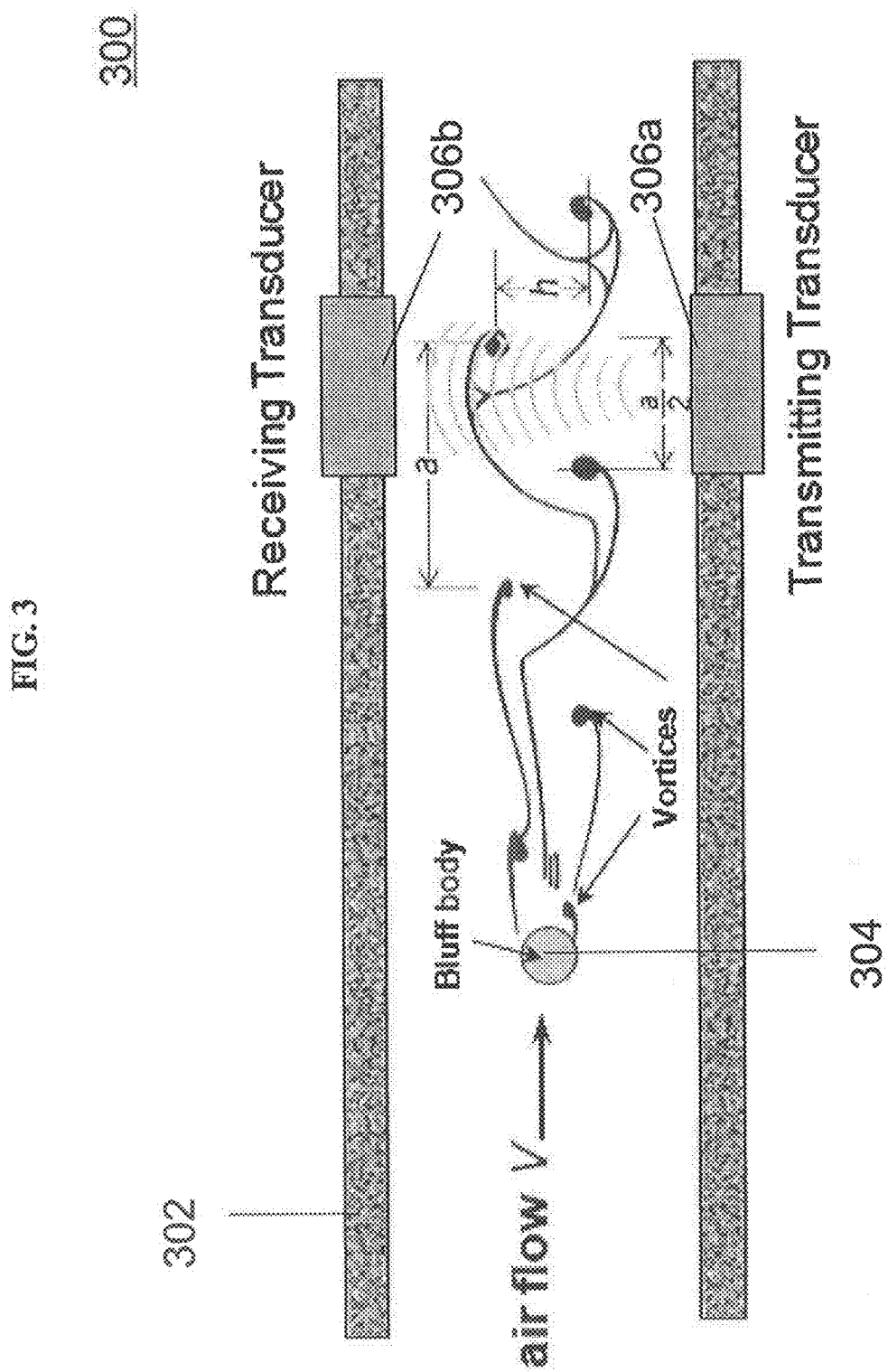
Figure 4:
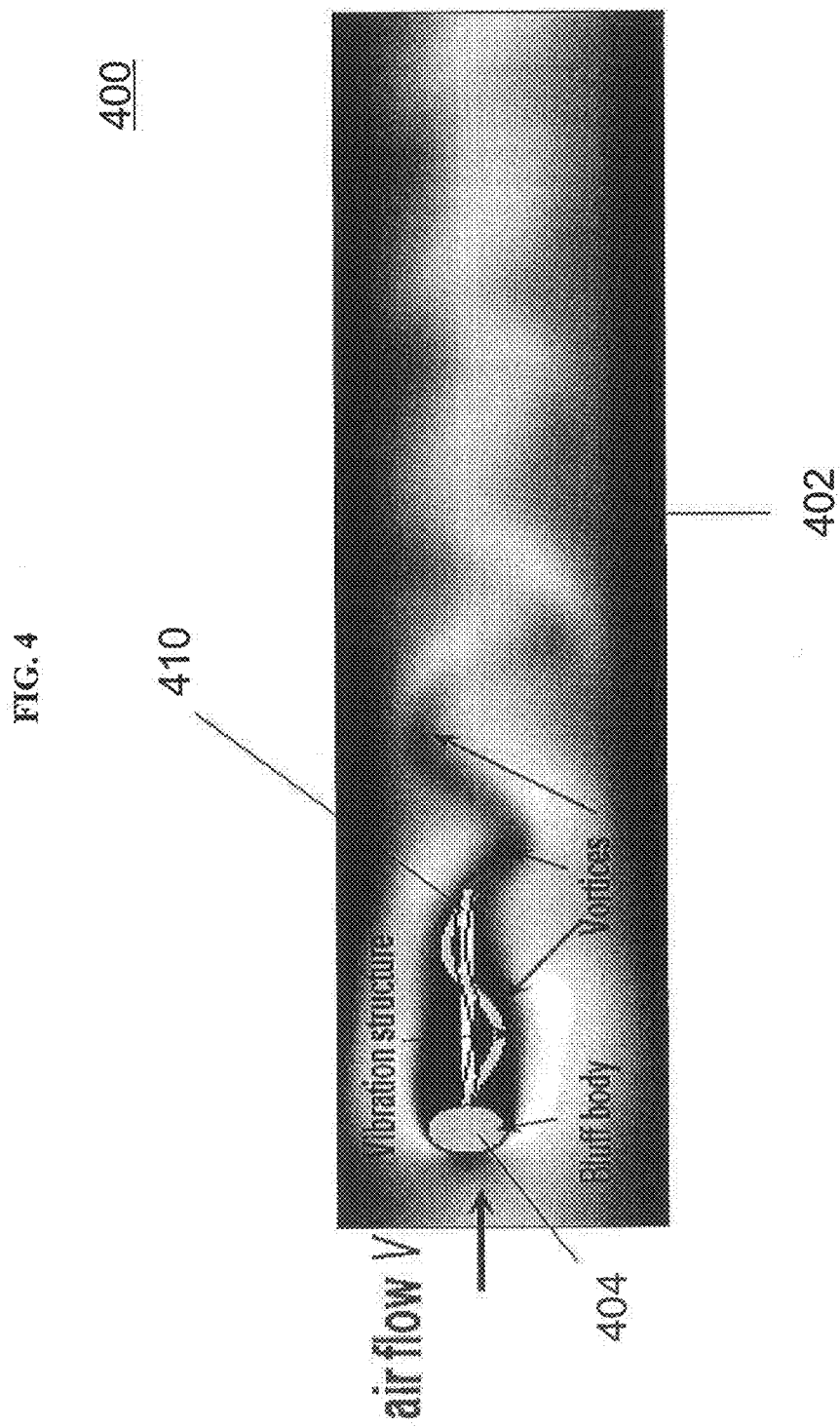
Figure 5A:
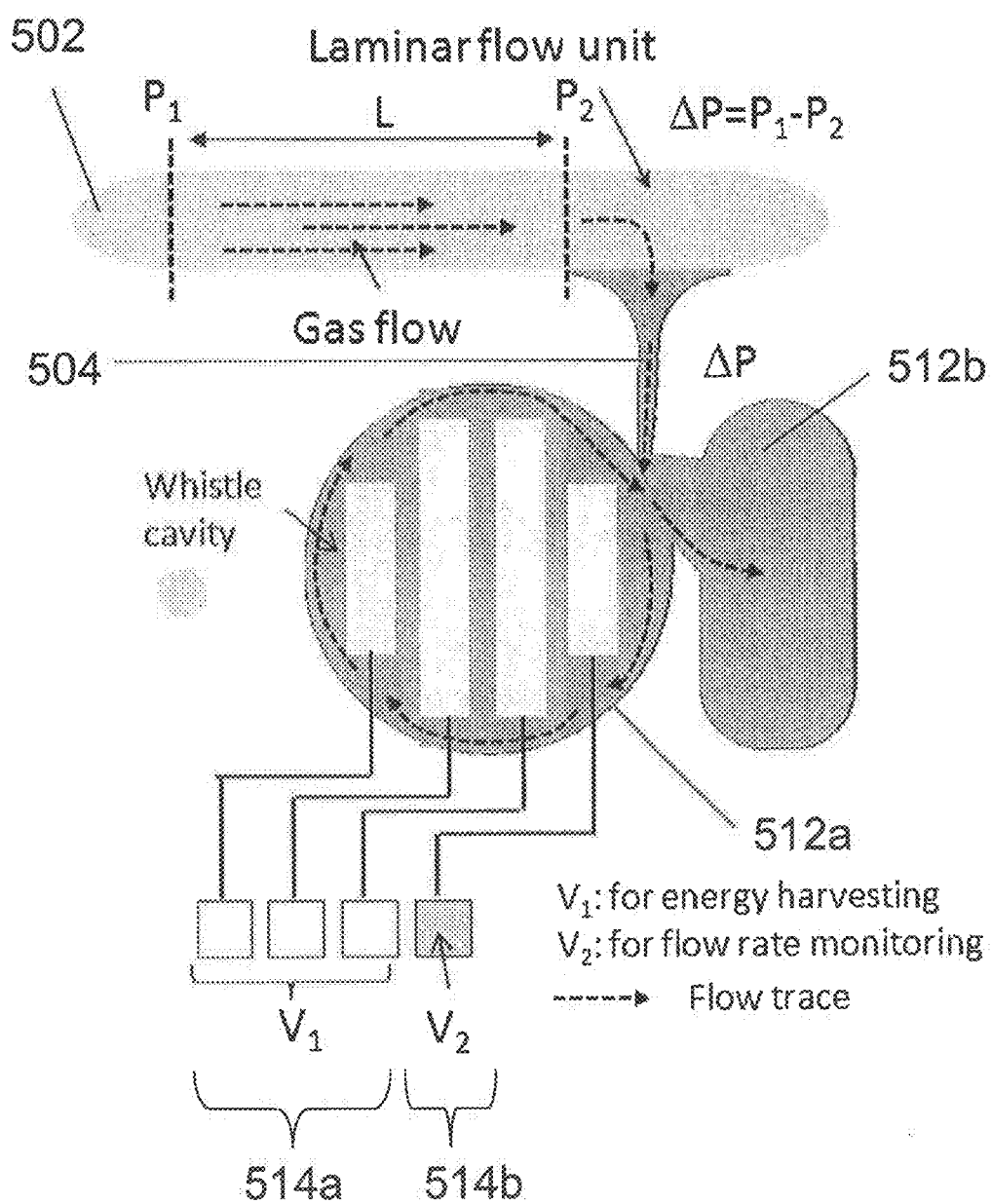
Figure 5B:
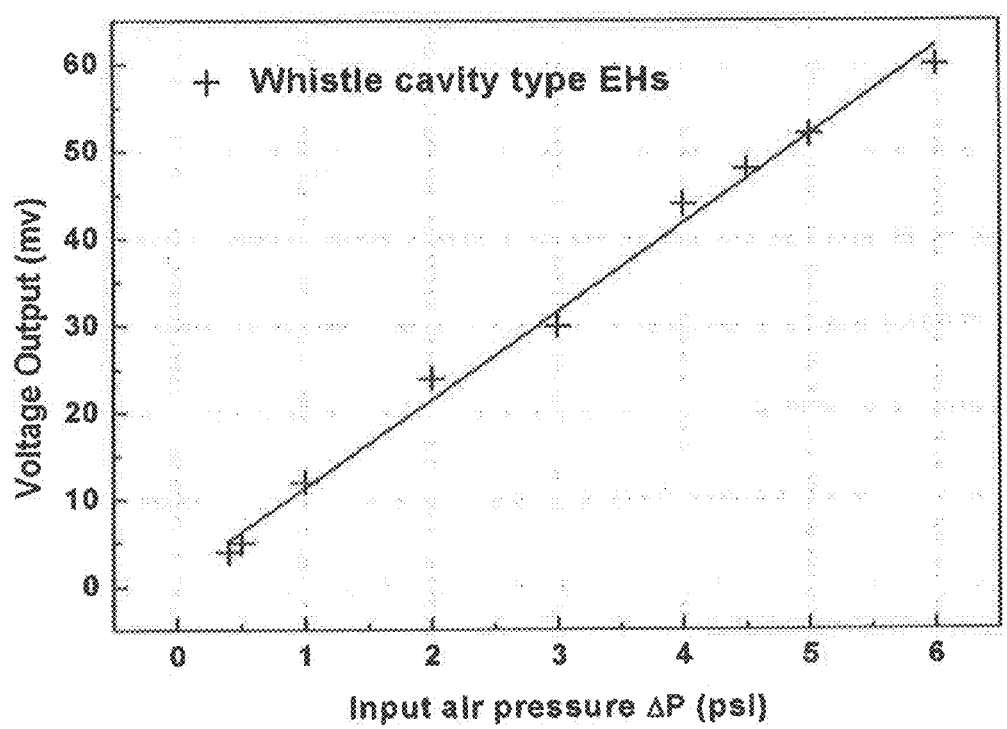
Figure 6A:
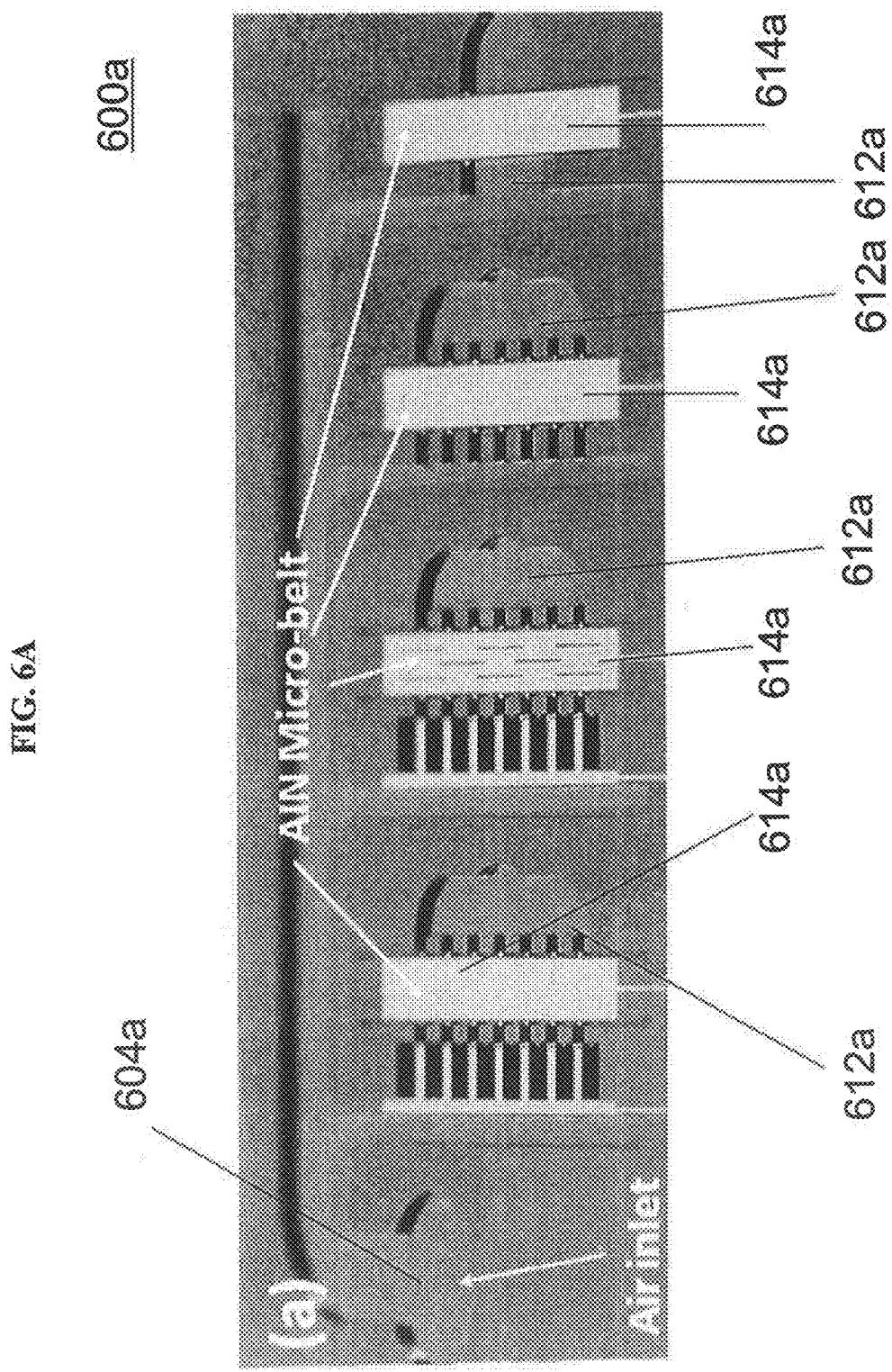
Figure 6B:
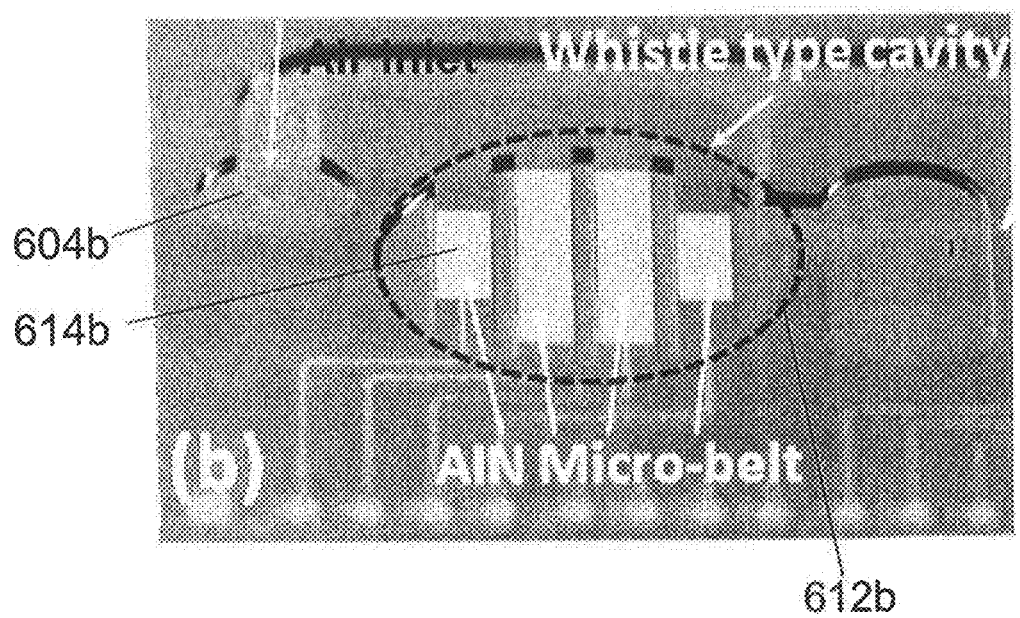
Figure 6C:
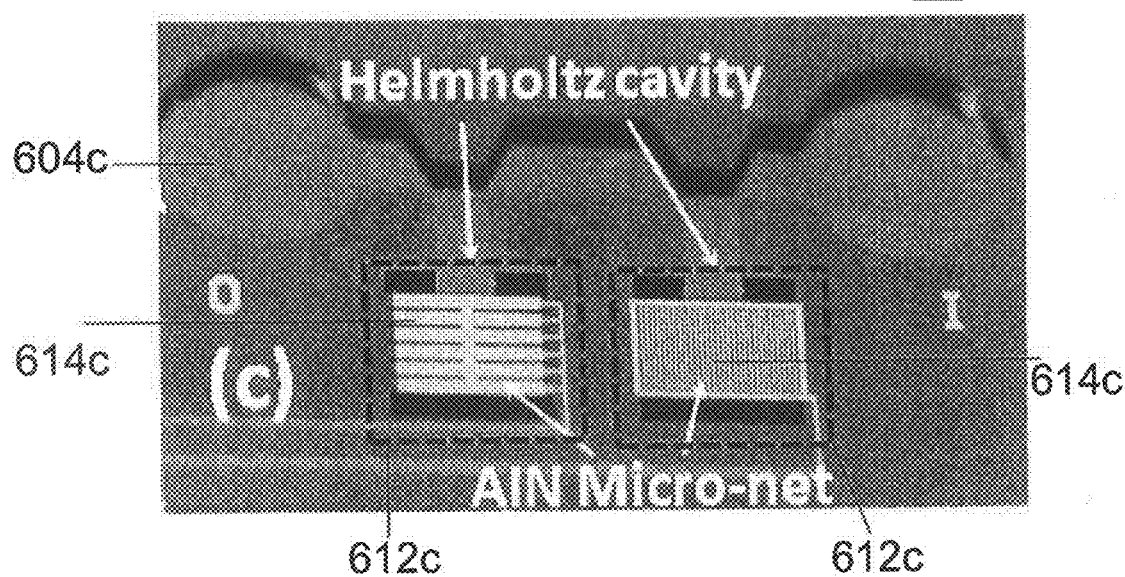
Figure 7:
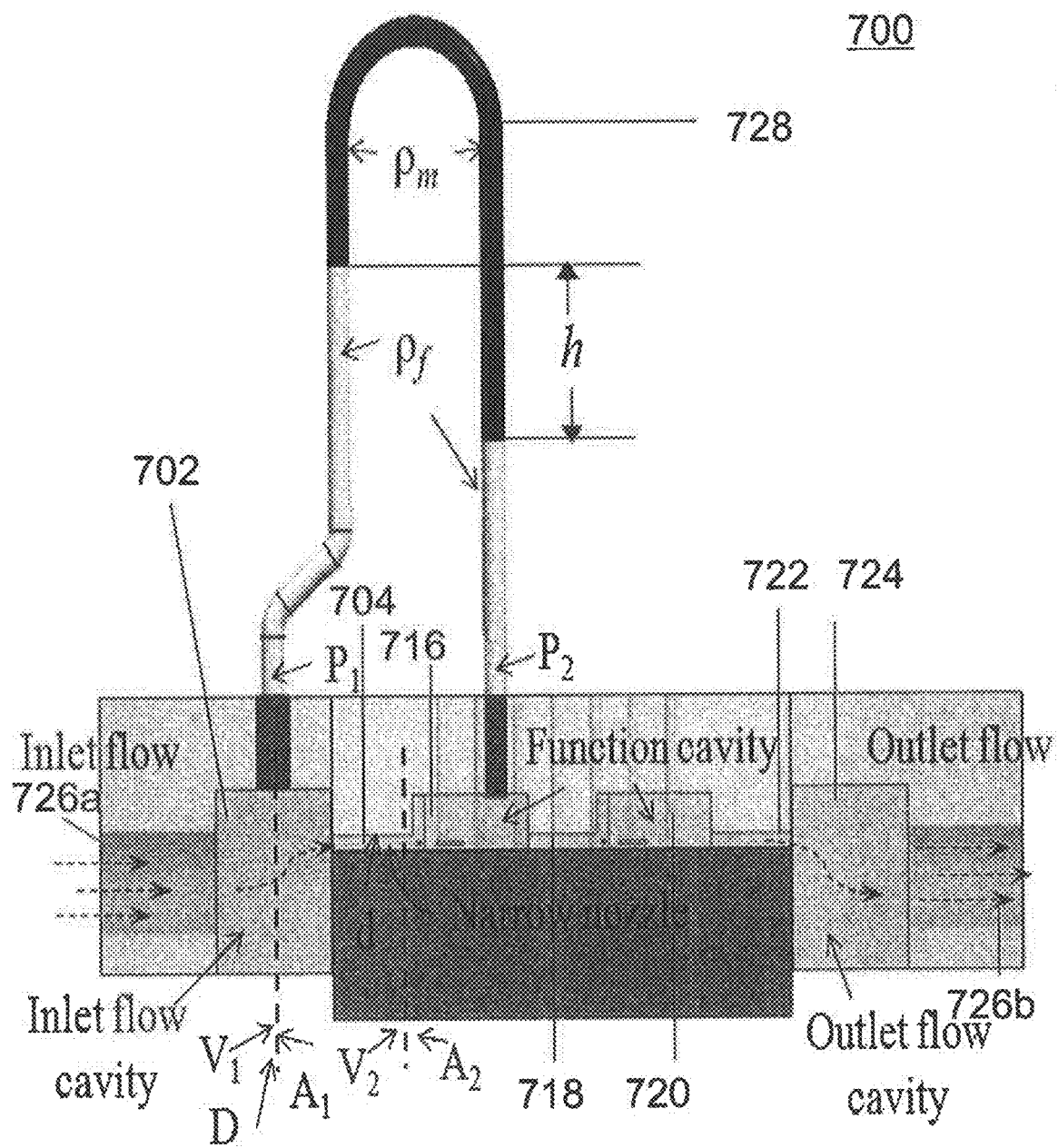
Figure 8:
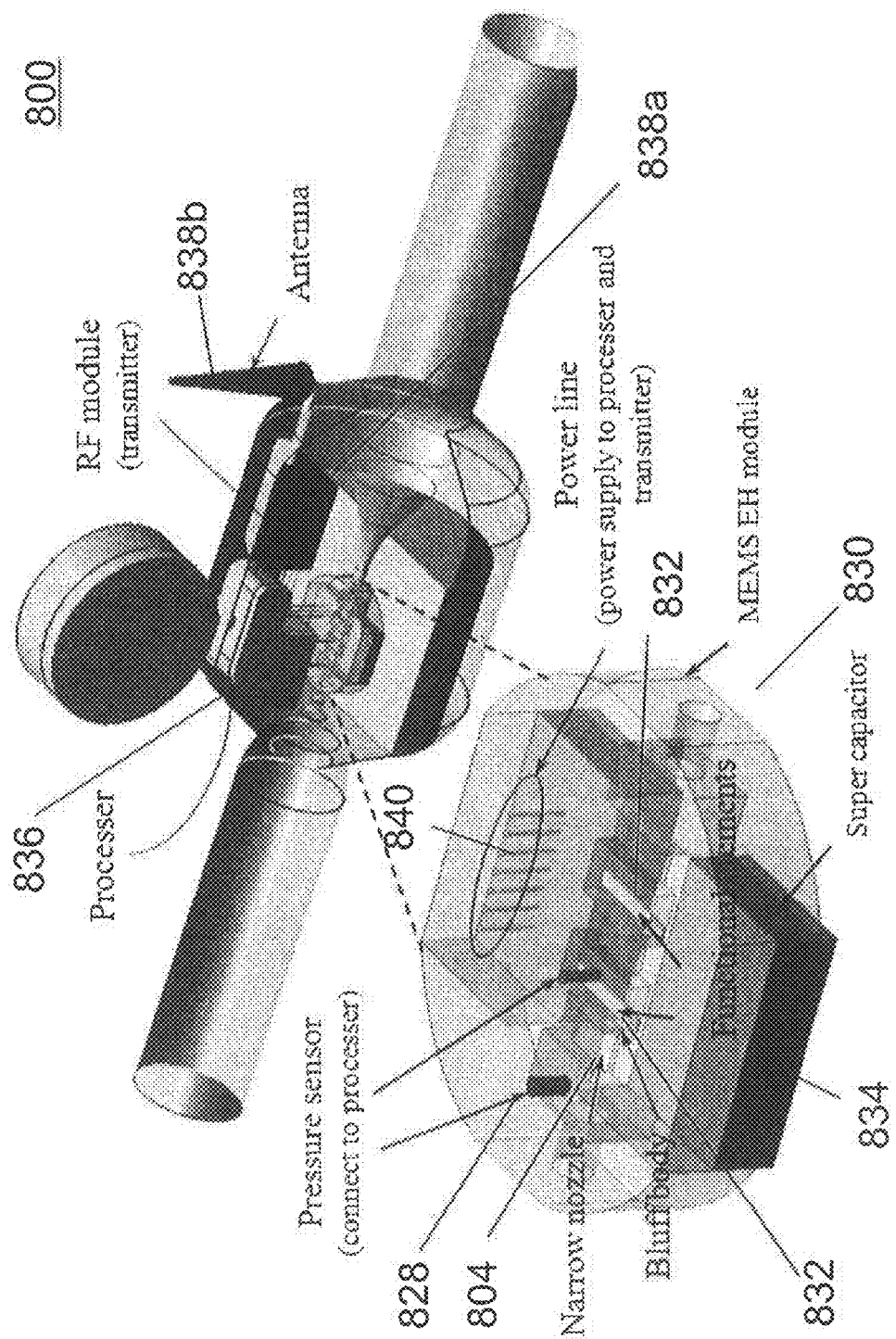
Figure 9:
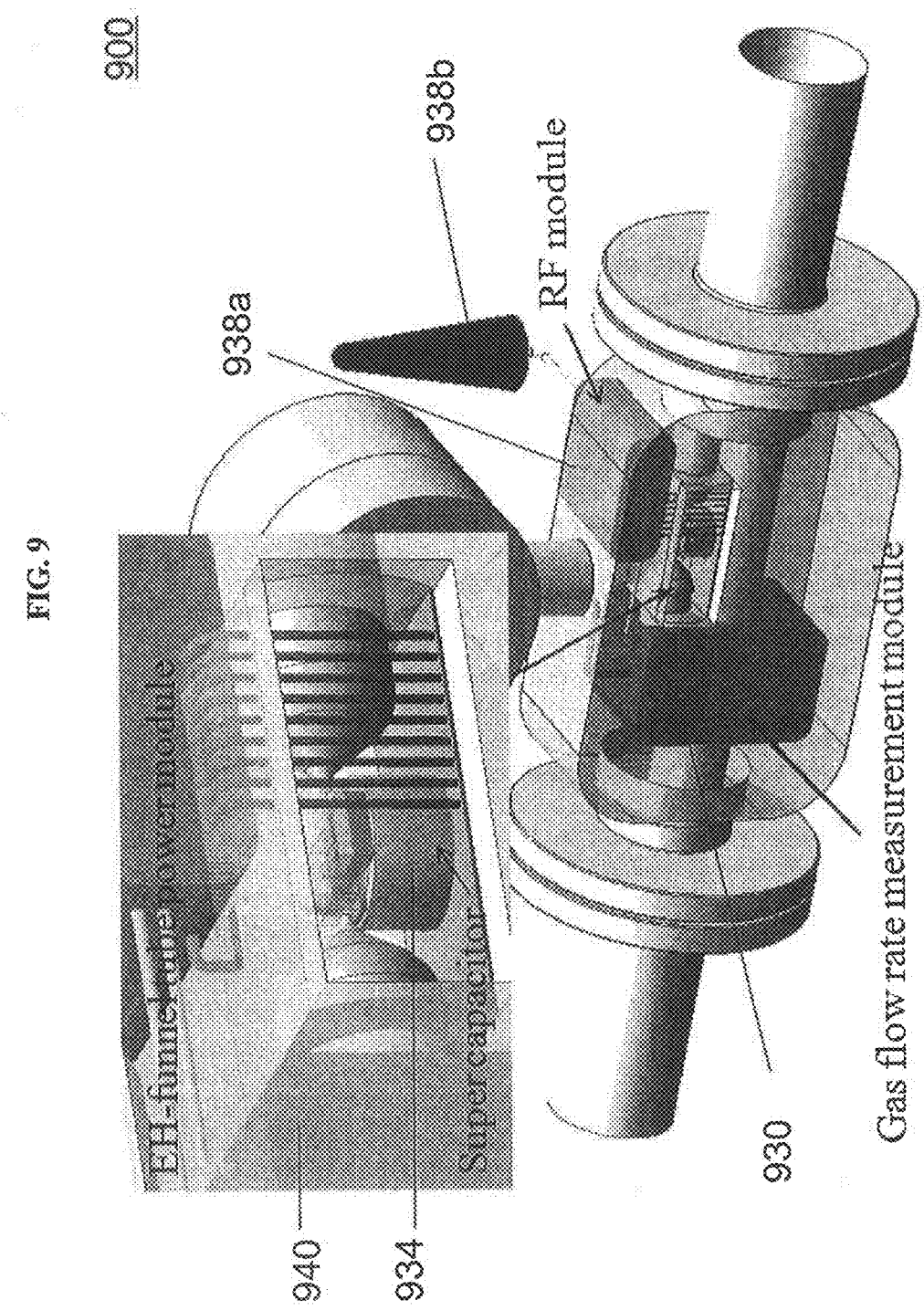
Figure 10:
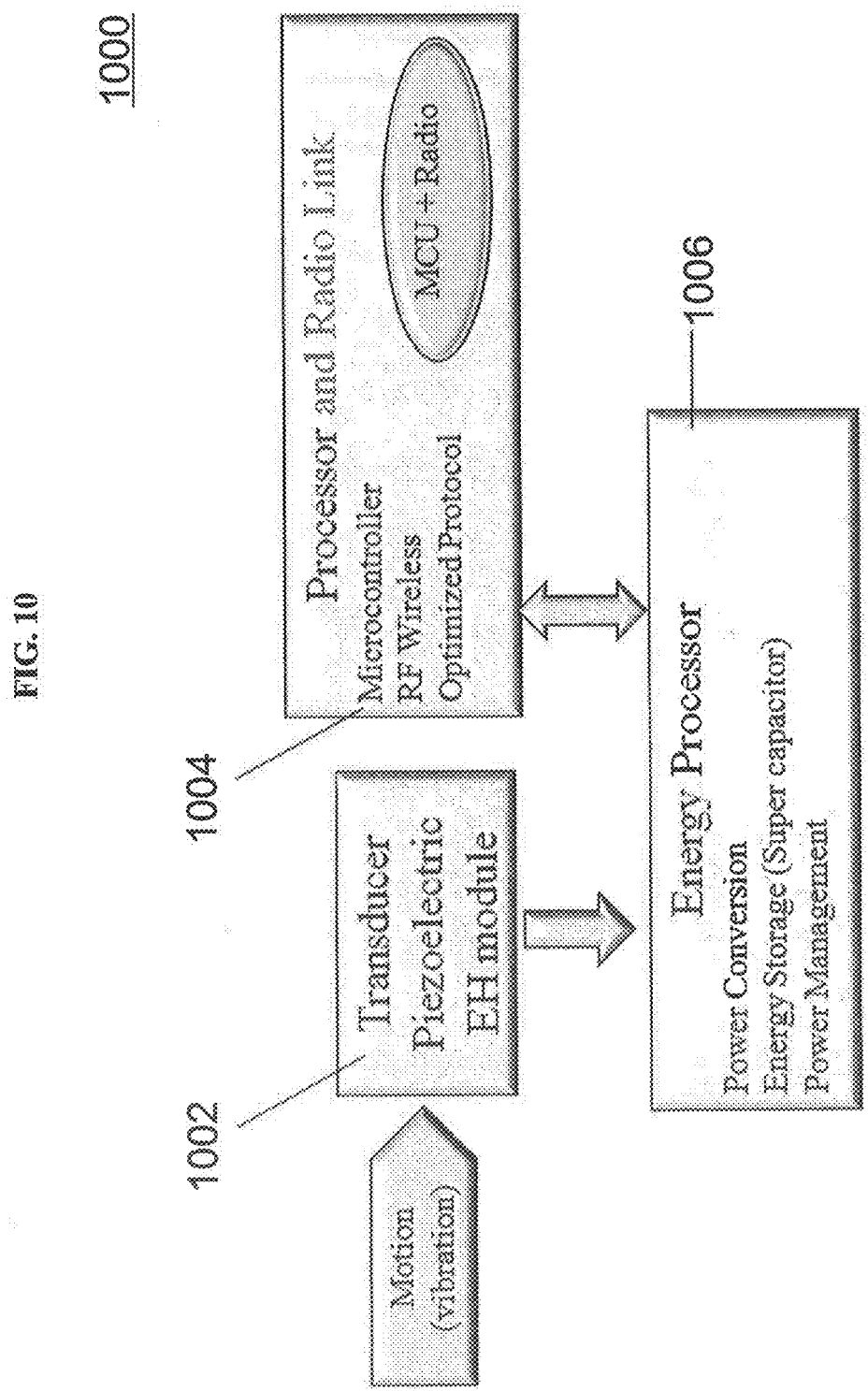
Figure 11:
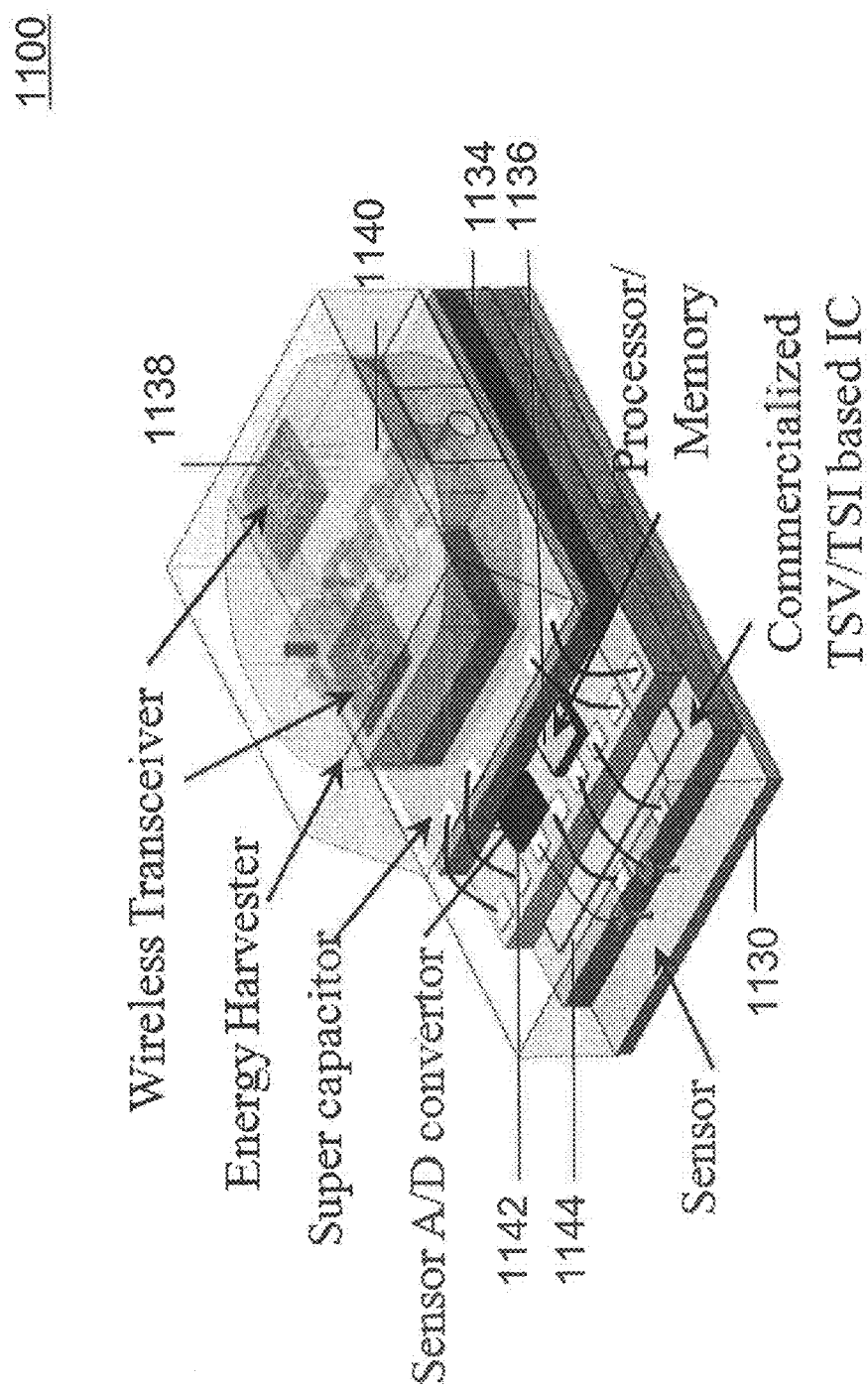
Figure 12A:
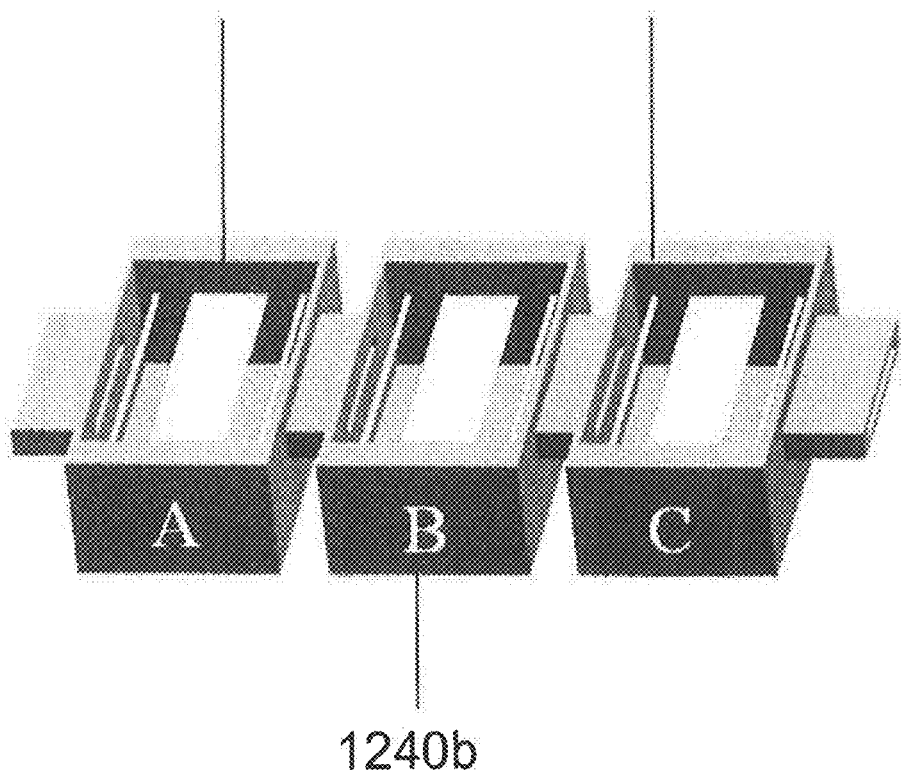
Figure 12B:
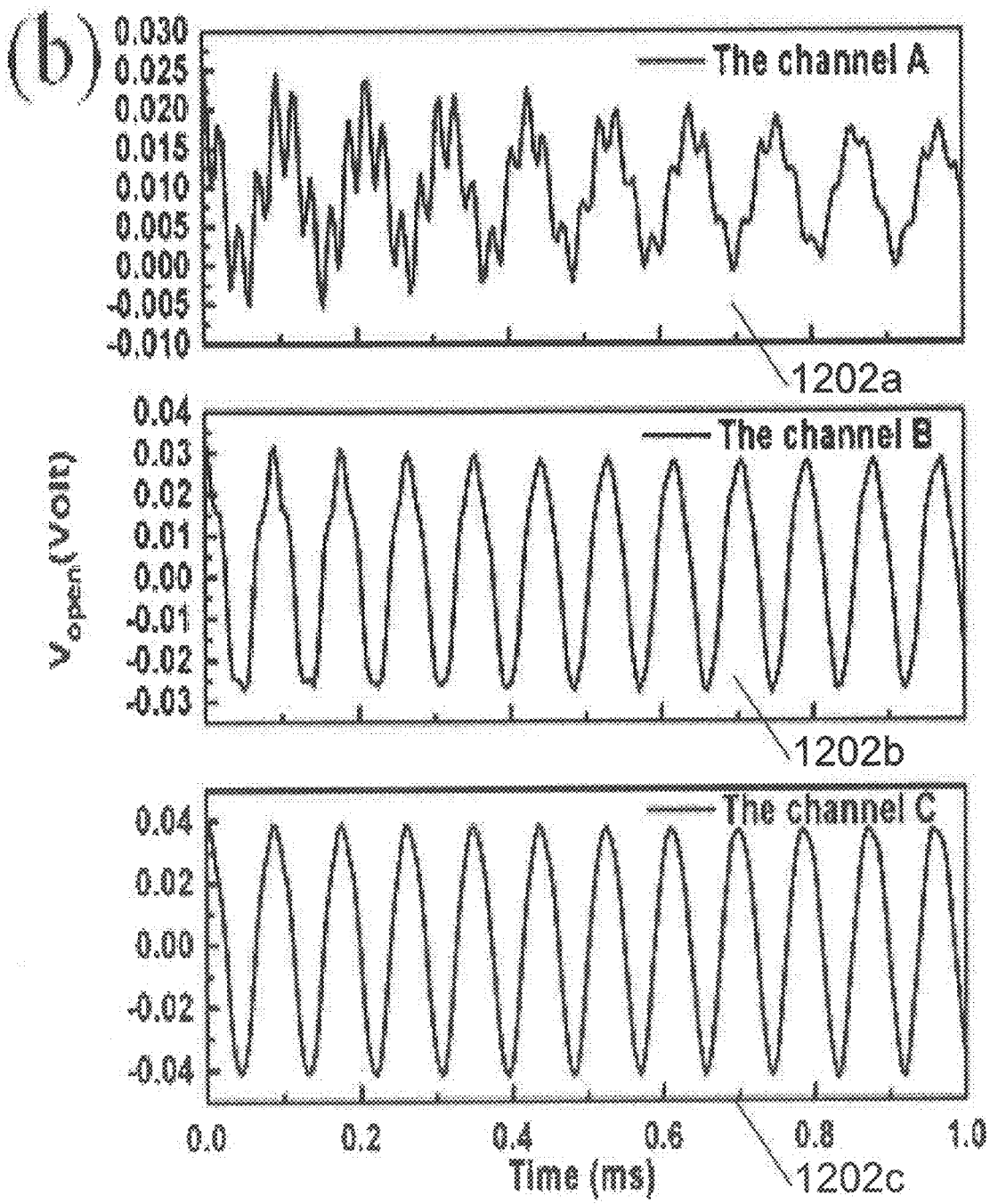
Figure 12C:
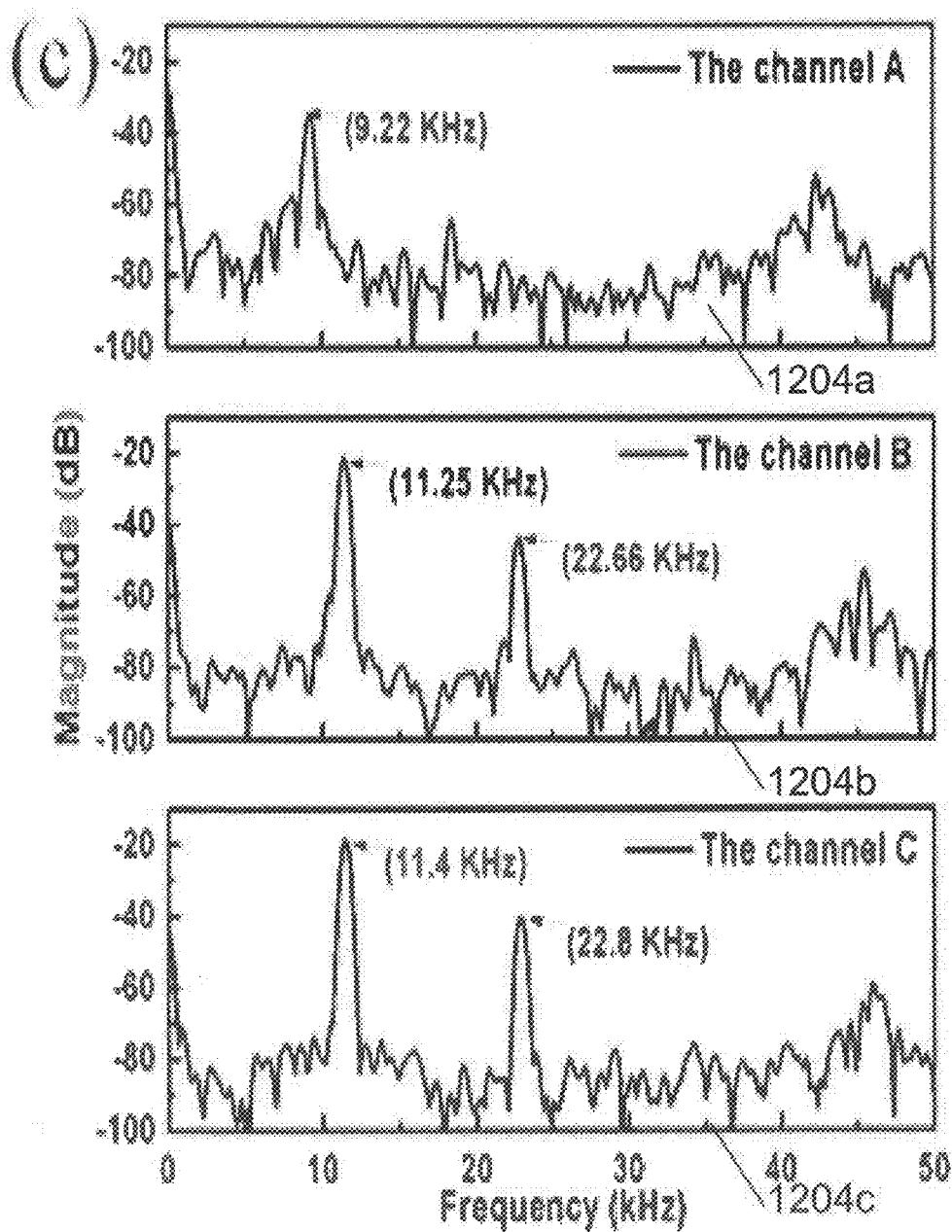
Figure 13A:
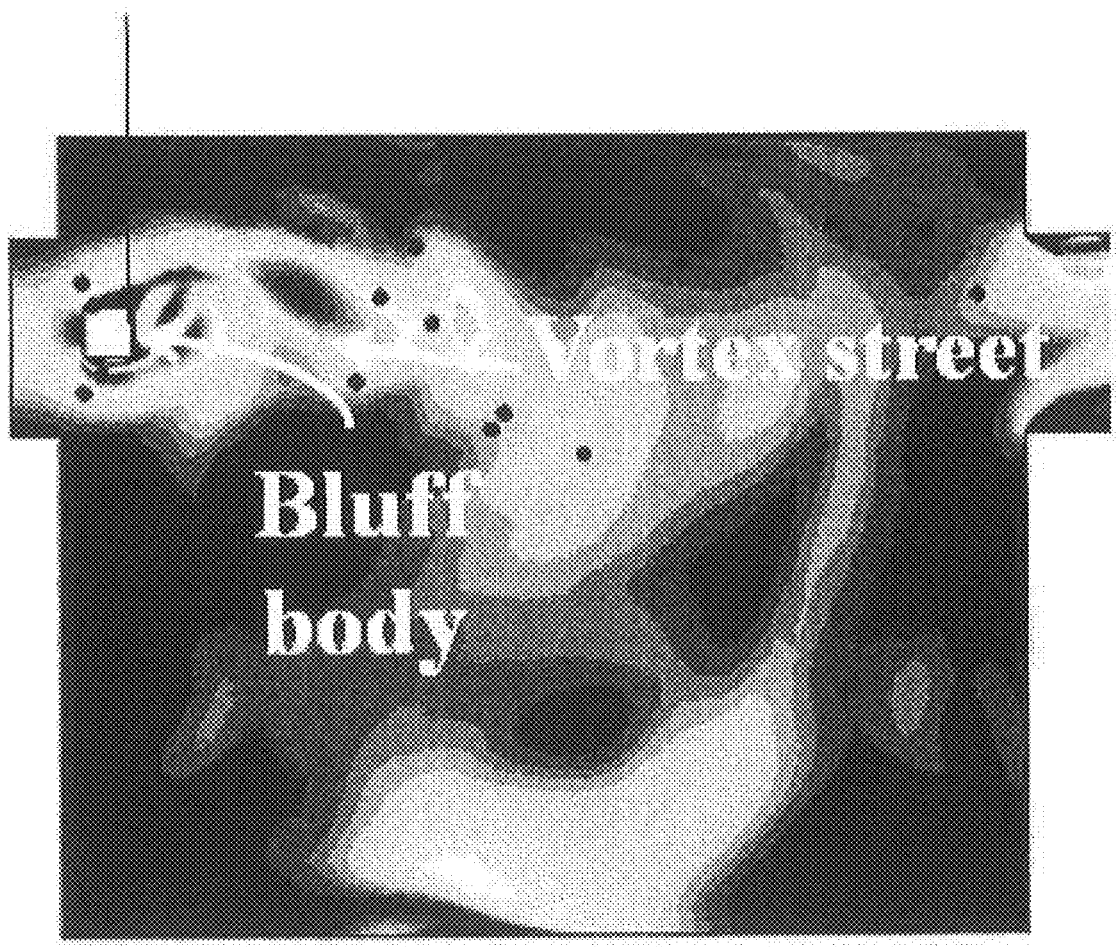
Figure 13B:
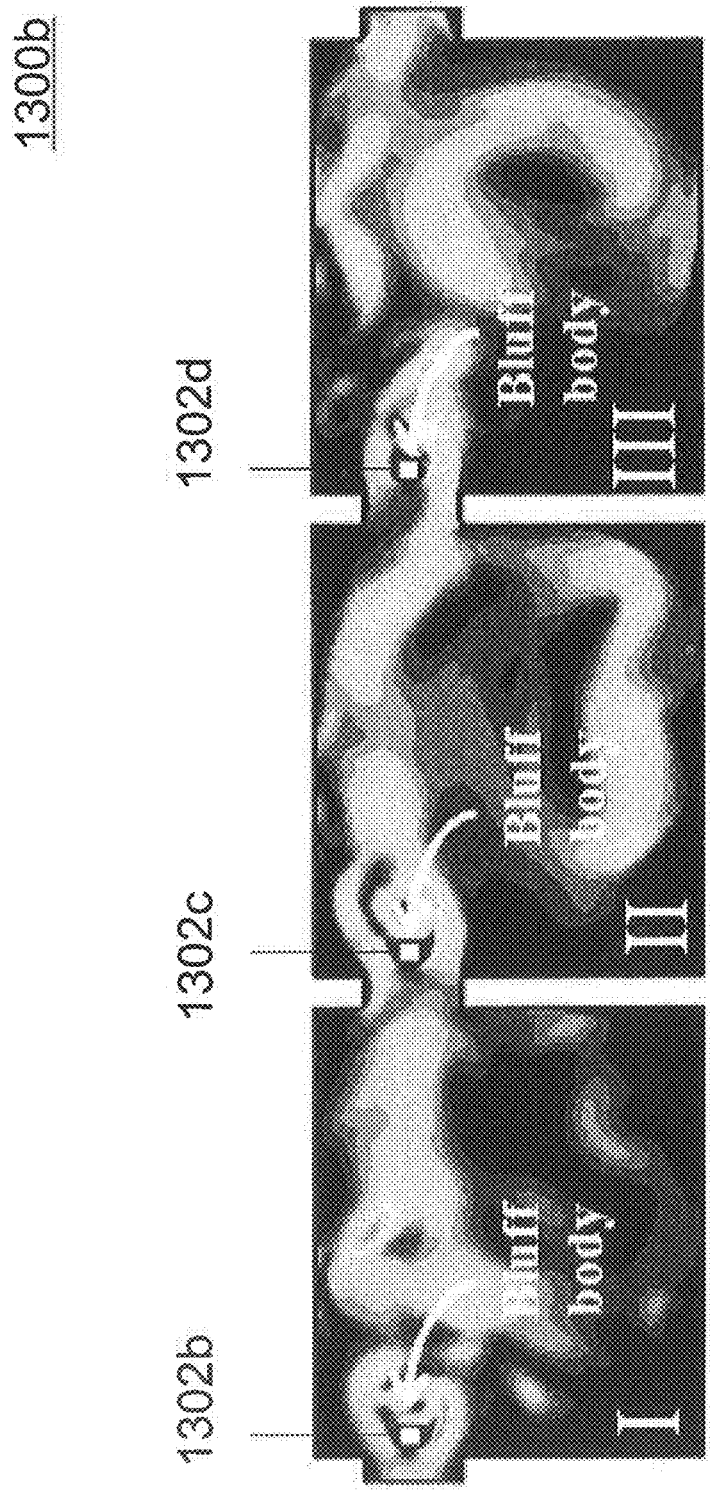

FIG. 13A is an image 1300a illustrating the simulated fluid behaviour in a single cavity energy harvester according to various embodiments. The bluff body 1302a may be configured to generate vortex street in a fluid. FIG. 13A is an image 1300a illustrating the simulated fluid behaviour in a single cavity energy harvester according to various embodiments. FIG. 13B is an image 1300b illustrating the simulated fluid behaviour in a three-cavity energy harvester according to various embodiments. The bluff bodies 1302b, 1302c, 1302d may be configured to generate vortex streets in the respective cavities. The bluff bodies 1302a, 1302b, 1302c, 1302d may help to initiate flow turbulence in micro-scaled cavities, which drives the functional piezoelectric to vibrate intensively and thus generates electrical energies for powering the devices. The cavities in devices I and III may serve as flow resistance to rectify the flow condition and the cavity in II is observed to have the most intensive turbulence among the three.

FIG. 14 is a schematic 1400 illustrating a method of forming a device for determining a property of a fluid according to various embodiments. The method may include, in 1402, providing a fluid receiving structure configured to receive the fluid having a first condition. The method may further include, in 1404, coupling a flow control structure to the fluid receiving structure, the flow control structure configured to change the first condition of the fluid to a second condition. The method may additionally include, in 1406, providing a determination mechanism configured to determine the property of the fluid based on the fluid having the second condition. The method may further include, in 1408, providing a voltage generation mechanism configured to generate a voltage based on the fluid having the second condition.

In other words, the method may include forming a fluid receiving structure which allows a fluid to flow through. The fluid receiving structure may include or may be fluidically connected to a flow control structure, which may be configured to change a first condition of the fluid to a second condition. The method may also include providing a determination mechanism configured to determine a property of the fluid. The method may further include providing a voltage generation mechanism configured to generate a voltage based on the fluid having the second condition.

The device may be formed by a complementary metal oxide semiconductor (CMOS) process or by precision machining.

The energy harvester (EH) module may be electrically intergrated with the electronics processor module (processor circuit) or the signal transmission module (transmitter circuit). The electronics processor module may be electrically connected to a reader equipped in the gas meter. The reader may store an identifier of the corresponding gas meter, and the gas meter may be connected to the data logger via a wireless transmission protocol supported by the signal transmission module (transmitter circuit). The energies generated by energy harvester (EH) module may be transferred and stored in the supercapacitor, which is electrically connected to the electronics processor module (processor circuit) and signal transmission module (transmitter circuit) for powering.

Methods described herein may further contain analogous features of any structure, device or system described herein. Correspondingly, structures, devices or systems described herein may further contain analogous features of any method described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for determining a property of a fluid, the device comprising:
 a fluid receiving structure configured to receive the fluid having a first condition;
 a flow control structure coupled to the fluid receiving structure, the flow control structure configured to change the first condition of the fluid to a second condition;
 a determination mechanism configured to determine the property of the fluid based on the second condition; and
 a voltage generation mechanism configured to generate a voltage based on the second condition.

2. The device according to claim 1,
 wherein the flow control structure comprises an obstruction within the fluid receiving structure.

3. The device according to claim 2, further comprising:
 a vibration structure attached to the obstruction.

4. The device according to claim 3,
 wherein the obstruction is further configured to generate a plurality of vortex swirls in the fluid so that the fluid is the second condition;
 wherein the vibration structure is configured to move at a frequency due to the plurality of vortex swirls.

5. The device according to claim 4,
 wherein the vibration structure includes a transducer configured to determine the property of the fluid based on a varying force exerted by the plurality of vortex swirls.

6. The device according to claim 5,
 wherein the transducer is configured to generate the voltage because of the varying force exerted by the plurality of vortex swirls.

7. The device according to claim 5
 wherein the transducer comprises one or more of a piezoelectric material, a triboelectric material, and a magnetic material.

8. The device according to claim 4,
 wherein the first condition of the fluid is a condition of the fluid being free of the plurality of vortex swirls.

9. The device according to claim 4,
 wherein the second condition of the fluid is a condition of the fluid having the plurality of vortex swirls.

10. The device according to claim 1,
 wherein the flow control structure comprises an interconnecting channel having a width smaller than a width of the fluid receiving structure.

11. The device according to claim 10, further comprising:
 a cavity coupled to the interconnecting channel so that the interconnecting channel is between the fluid receiving structure and the cavity.

12. The device according to claim 11,
 wherein the cavity is a whistle type cavity.

13. The device according to claim 11,
 wherein the cavity comprises a plurality of transducers.

14. The device according to claim 13,
 wherein the determination mechanism is further configured to determine the property of the fluid based on the first condition of the fluid;
 wherein the fluid in the first condition has a first pressure; and
 wherein the fluid in the second condition has a second pressure.

15. The device according to claim 14,
 wherein a first transducer of the plurality of transducers is configured to generate the voltage.

16. The device according to claim 15,
 wherein a second transducer of the plurality of transducers is configured to determine the property of the fluid based on a difference between the first pressure and the second pressure.

17. The device according to claim 14,
wherein the first condition of the fluid is a condition of the fluid having the first pressure.

18. The device according to claim 14,
wherein the second condition of the fluid is a condition of the fluid having the second pressure.

19. The device according to claim 1,
wherein the property of the fluid is a volumetric flow rate.

20. A method of forming a device for determining a property of a fluid, the method comprising:
   providing a fluid receiving structure configured to receive the fluid having a first condition;
   coupling a flow control structure to the fluid receiving structure, the flow control structure configured to change the first condition of the fluid to a second condition;
   providing a determination mechanism configured to determine the property of the fluid based on the fluid having the second condition; and
   providing a voltage generation mechanism configured to generate a voltage based on the fluid having the second condition.

\* \* \* \* \*

UNITED STATES PATENT AND TRADEMARK OFFICE
CERTIFICATE OF CORRECTION

| | | |
|---|---|---|
| PATENT NO. | : 9,829,358 B2 | |
| APPLICATION NO. | : 15/031982 | |
| DATED | : November 28, 2017 | |
| INVENTOR(S) | : Mu et al. | |

It is certified that error appears in the above-identified patent and that said Letters Patent is hereby corrected as shown below:

Please delete in its entirety Pat. No. 9,829,358 B2 and insert in its entirety Pat. No. 9,829,358 B2 as shown on the attached pages.

Signed and Sealed this
Tenth Day of July, 2018

Andrei Iancu
*Director of the United States Patent and Trademark Office*

(12) United States Patent
Mu et al.

(10) Patent No.: US 9,829,358 B2
(45) Date of Patent: Nov. 28, 2017

(54) DEVICE FOR DETERMINING A PROPERTY OF A FLUID AND METHOD OF FORMING THE SAME

(71) Applicant: Agency for Science, Technology and Research, Singapore (SG)

(72) Inventors: Xiaojing Mu, Singapore (SG); Chengliang Sun, Singapore (SG); Alex Yuandong Gu, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 0 days.

(21) Appl. No.: 15/031,982

(22) PCT Filed: Nov. 21, 2014

(86) PCT No.: PCT/SG2014/000553
§ 371 (c)(1),
(2) Date: Apr. 25, 2016

(87) PCT Pub. No.: WO2015/076757
PCT Pub. Date: May 28, 2015

(65) Prior Publication Data
US 2016/0273947 A1    Sep. 22, 2016

(30) Foreign Application Priority Data
Nov. 22, 2013   (SG) .................. SG201308684-8

(51) Int. Cl.
*G01F 15/06* (2006.01)
*G01F 1/48* (2006.01)
(Continued)

(52) U.S. Cl.
CPC .......... *G01F 1/3218* (2013.01); *G01F 1/3209* (2013.01); *G01F 1/36* (2013.01);
(Continued)

(58) Field of Classification Search
None
See application file for complete search history.

(56) References Cited

U.S. PATENT DOCUMENTS

| 5,223,763 A | 6/1993 | Chang |
| 6,011,346 A | 1/2000 | Buchanan et al. |

(Continued)

FOREIGN PATENT DOCUMENTS

| EP | 2399676 A1 | 12/2011 |
| EP | 2065228 B1 | 4/2013 |
| WO | WO2012081008 A1 | 6/2012 |

OTHER PUBLICATIONS

Elfrink, et al., Shock Induced Energy Harvesting with a MEMS Harvester for Automotive Applications, IEEE IEDM11-677 29.51 (2011).

(Continued)

*Primary Examiner* — Harshad R Patel
(74) *Attorney, Agent, or Firm* — K. David Crockett, Esq.; Paul J. Backofen, Esq.; Crockett & Crockett, PC

(57) ABSTRACT

In various embodiments, a device for determining a property of a fluid may be provided. The device may include a fluid receiving structure configured to receive the fluid having a first condition. The device may further include a flow control structure coupled to the fluid receiving structure. The flow control structure may be configured to change the first condition of the fluid to a second condition. The device may further include a determination mechanism configured to determine the property of the fluid based on the second condition. The device may also include a voltage generation mechanism a voltage generation mechanism configured to generate a voltage based on the second condition.

11 Claims, 19 Drawing Sheets

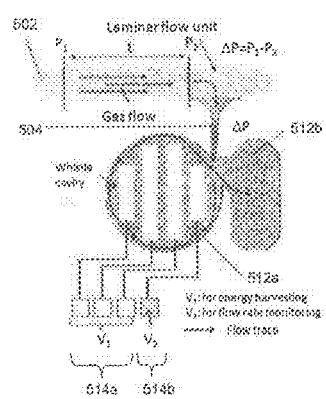

US 9,829,358 B2
Page 2

(51) Int. Cl.
*G01F 1/32* (2006.01)
*G01F 1/36* (2006.01)
*H02N 2/18* (2006.01)

(52) U.S. Cl.
CPC .............. *G01F 1/48* (2013.01); *G01F 15/063* (2013.01); *H02N 2/185* (2013.01)

(56) References Cited

U.S. PATENT DOCUMENTS

| | | |
|---|---|---|
| 6,424,079 B1 | 7/2002 | Carroll |
| 7,199,480 B2 | 4/2007 | Fripp et al. |
| 7,208,845 B2 | 4/2007 | Masters et al. |
| 7,310,052 B2 | 12/2007 | Bowman |
| 7,400,264 B2 | 7/2008 | Boaz |
| 7,560,856 B2 | 7/2009 | Chen et al. |
| 7,986,051 B2 | 7/2011 | Frayne |
| 8,314,503 B2 | 11/2012 | Liu et al. |
| 2003/0034900 A1 | 2/2003 | Han |
| 2005/0134047 A1 | 6/2005 | Schumacher et al. |
| 2009/0134632 A1 | 5/2009 | Kvisteroy et al. |
| 2009/0189778 A1 | 7/2009 | Juan et al. |

OTHER PUBLICATIONS

Sun, et al., PVDF Microbelts for Harvesting Energy from Respiration, 4 Energy and Environmental Science 4508 (2011).

Aktakka, et al., Thinned-PZT on SOI Process and Design Optimization for Piezoelectric Inertial Energy Harvesting, Transducers 1649 (Jun. 2011).

Elfrink, et al., Vacuum-Packaged Piezoelectric Vibration Energy Harvesters: Damping Contributions and Autonomy for a Wireless Sensor System, 20 Journal of Micromechanics and Microengineering 1 (Sep. 2010).

FIG. 14

1400 provide a fluid receiving structure configured to receive the fluid having a first condition ⸺ 1402 couple a flow control structure to the fluid receiving structure, the flow control structure configured to change the first condition of the fluid to a second condition ⸺ 1404 provide a determination mechanism configured to determine the property of the fluid based on the fluid having the second condition ⸺ 1406 provide a voltage generation mechanism configured to generate a voltage based on the fluid having the second condition ⸺ 1408 f

DEVICE FOR DETERMINING A PROPERTY OF A FLUID AND METHOD OF FORMING THE SAME

CROSS-REFERENCE TO RELATED APPLICATION

This application claims the benefit of priority of Singapore patent application No. 201308684-8, filed 22 Nov. 2013, the content of it being hereby incorporated by reference in its entirety for all purposes.

TECHNICAL FIELD

Various aspects of this disclosure relate to devices for determining properties of a fluid and methods of forming the devices.

BACKGROUND

The advantages of wireless automatic reading of gas meters have long been recognized. Such advantages accrue from the elimination of the high costs associated with manually reading meters located a long distance from a central utility office, inside of a customer's premises, at dangerous locations, and at the remote ends of a distribution network. Furthermore, in rural utility networks, long distances are typically encountered between each meter location. Thus, more employees are required to manually read each meter on a predetermined time schedule for accurate billing. However, most traditional wireless modules require a battery as a power source, and the battery may lead to problems such as adding weight to the whole system, limited life time, high cost of replacement, or potential hazard to the environment.

SUMMARY

In various embodiments, a device for determining a property of a fluid may be provided. The device may include a fluid receiving structure configured to receive the fluid having a first condition. The device may further include a flow control structure coupled to the fluid receiving structure. The flow control structure may be configured to change the first condition of the fluid to a second condition. The device may further include a determination mechanism configured to determine the property of the fluid based on the second condition. The device may also include a voltage generation mechanism configured to generate a voltage based on the second condition.

In various, a method of forming a device for determining a property of a fluid may be provided. The method may include providing a fluid receiving structure configured to receive the fluid having a first condition. The method may further include coupling a flow control structure to the fluid receiving structure, the flow control structure configured to change the first condition of the fluid to a second condition. The method may additionally include providing a determination mechanism configured to determine the property of the fluid based on the fluid having the second condition. The method may further include providing a voltage generation mechanism configured to generate a voltage based on the fluid having the second condition.

BRIEF DESCRIPTION OF THE DRAWINGS

The invention will be better understood with reference to the detailed description when considered in conjunction with the non-limiting examples and the accompanying drawings, in which:

FIG. 1 is a schematic illustrating a wireless remote meter reading process according to various embodiments.

FIG. 2 is a schematic illustrating a device for determining a property of a fluid according to various embodiments.

FIG. 3 is a schematic of a device for determining a property of a fluid according to various embodiments.

FIG. 4 is a schematic of a device for determining a property of a fluid according to various embodiments.

FIG. 5A is a schematic of a device for determining a property of a fluid according to various embodiments.

FIG. 5B is a plot of voltage output (in mV) against input air pressure $\Delta P$ (in pounds per square inch or psi) illustrating the linear relationship between open-circuit voltage output and the input air pressure $\Delta P$.

FIG. 6A is an optical image of a plurality of aluminum nitride micro-belt transducers within a cavity according to various embodiments.

FIG. 6B is an optical image of a plurality of aluminum nitride micro-belt transducers within a cavity according to various embodiments.

FIG. 6C is an optical image of a plurality of aluminum nitride micro-net transducers within a cavity according to various embodiments.

FIG. 7 is a schematic illustrating a device for determining a property of a fluid according to various embodiments.

FIG. 8 is a schematic of a device for determining a property of a fluid according to various embodiments.

FIG. 9 is a schematic of a device for determining a property of a fluid according to various embodiments.

FIG. 10 is a schematic showing a system integrating the energy harvesting module, the processor circuit and the transmitter circuit according to various embodiments.

FIG. 11 is a schematic illustrating a wireless module according to various embodiments.

FIG. 12A shows a schematic showing a system including a plurality of devices according to various embodiments.

FIG. 12B is a group of plots 1202a, 1202b, 1202c of output voltages (volts) as a function of time (milliseconds or ms).

FIG. 12C is a group of frequency spectra plots 1204a, 1204b, 1204c of magnitudes (decibels of dB) as a function of frequency (kilohertzs of kHz).

FIG. 13A is an image illustrating the simulated fluid behaviour in a single cavity energy harvester according to various embodiments.

FIG. 13B is an image illustrating the simulated fluid behaviour in a three-cavity energy harvester according to various embodiments.

FIG. 14 is a schematic illustrating a method of forming a device for determining a property of a fluid according to various embodiments.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure.

To solve the abovementioned problems, battery-less self-powered Energy Harvesting (EH) module for gas meter built-in processor and RF module (transmitter and sensors), which could scavenge energy from the environment (gas flow), are highly desirable. FIG. 1 is a schematic 100 illustrating a wireless remote meter reading process according to various embodiments. The gas meter 102 may be read via a wireless means from a remote location, such as from a vehicle 104. In various embodiments, the gas meter 102 may not require a battery. In various embodiments, the gas meter 102 may include an energy harvesting (EH) module or energy harvester (EH). The use of energy harvesting may remove one of the key factors limiting the proliferation of wireless nodes—the scarcity of power sources having the characteristics necessary to deliver the energy and power to the sensor node for years without battery replacement.

Plenty of motion energy from high frequency ambient environments may be efficiently harvested to power the wireless module. The gas flow rate is normally constant in the conduit of gas transmission line. However, the low frequency energy may not able to be effectively harvested by existing energy harvester devices.

A method of up-regulating the gas flow linear velocity, frequency up-conversion and high power generation may be provided herein. The method may be necessary for the efficient operation of energy harvesters (EHs). The energy harvesting capabilities of piezoelectric EHs may depend on the vibration source from which the energy can be extracted, the electromechanical properties of piezoelectric material, and structure of the functional elements where the energy conversion takes place. Various piezoelectric materials have been extensively investigated on the energy generation capability and have proved to be effective under different circumstances. Triboelectric materials or magnetic materials may also be used.

FIG. 2 is a schematic 200 illustrating a device for determining a property of a fluid according to various embodiments. The device may include a fluid receiving structure 202 configured to receive the fluid having a first condition. The device may further include a flow control structure 204 coupled to the fluid receiving structure. The flow control structure 204 may be configured to change the first condition of the fluid to a second condition. The device may further include a determination mechanism 206 configured to determine the property of the fluid based on the second condition. The device may also include a voltage generation mechanism 208 configured to generate a voltage based on the second condition.

In other words, a device for measuring a property of a fluid, such as a volumetric flow rate or a mass flow rate of the fluid, may be provided. The device may include a fluid receiving structure 202 in which the fluid flows through. The device may further include a suitable structure 204 coupled to the fluid receiving structure 202 in which the suitable structure 204 is configured to effect a change in a condition of the fluid. The device may further include a determination mechanism 206 configured to determine the property of the fluid based on the changed condition of the fluid. The device may also include a voltage generation mechanism 208 configured to generate a voltage based on the changed condition.

In various embodiments, the device may be a gas meter. The fluid may be a gas. Various embodiments may provide a gas meter which is able to provide a reading on a property of the gas, such as a flow rate of the gas, and which is at least partially powered by the gas flowing through, e.g. by the kinetic of the gas that flows through the gas meter. Various embodiments may reduce the need or do not require a power source such as a battery.

The voltage generation mechanism 208 may be configured to at least partially convert a kinetic energy of the fluid to electrical energy.

In various embodiments, a "circuit" may be understood as any kind of a logic implementing entity, which may be special purpose circuitry or a processor executing software stored in a memory, firmware, or any combination thereof. Thus, in various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java.

In various embodiments, the flow control structure 204 may include or may be an obstruction within the fluid receiving structure 202. The obstruction may be a bluff body. The device may also include a vibration structure attached to the obstruction. The vibration structure may also be referred to as a flexible structure.

The obstruction may be further configured to generate a plurality of vortex swirls in the fluid so that the fluid is the second condition. The obstruction may be configured to alternately generate vortex swirls on a first side of the obstruction and a second side of the obstruction. Fluid flowing through the obstruction may be separated into two portions, i.e. a first portion on the first side and a second portion on the second side of the obstruction. The obstruction may be configured to create a local increase in pressure (and a local decrease in velocity) on the first portion and a local decrease in pressure (and a local increase in velocity) on the second portion. Subsequently, the obstruction may be configured to create a local decrease in pressure (and a local increase in velocity) on the first portion and a local increase in pressure (and a local decrease in velocity) on the second portion.

The obstruction may be configured to generate periodic fluctuations of increased pressure and decreased pressure on each side. When the first portion experiences an increased pressure, the second portion may experience a decreased pressure. When the first portion experiences a decreased pressure, the second portion may experience an increased pressure.

The vibration structure may be configured to move at a frequency due to the plurality of vortex swirls.

In various embodiments, the vibration structure may include a transducer configured to determine the property of the fluid based on the varying force. In various other embodiments, the device may include a transducer configured to determine the property of the fluid based on a varying force exerted by the plurality of vortex swirls. In other words, the transducer may be included in the vibration structure or in another part of the device. A transducer may also be referred to as a functional element.

A transducer or transducers described herein may include or be made of a suitable piezoelectric material such as but not limited to aluminum nitride (AlN), zinc oxide (ZnO), lithium niobate (LiNbO$_3$), zirconate-titanate (PZT) or polyvinylidene fluoride (PVDF). The transducer or transducers may also include a triboelectric material such as Kapton. The transducer or transducers may also include a magnetic material. The transducers may include a combination of the different types of materials. For instance, the transducers may include piezoelectric transducers and triboelectric transducers. The transducer or transducers may include one or more of a piezoelectric material, a triboelectric material, and a magnetic material. For instance, the vibration structure may include the triboelectric material and the device may further include one or more electrodes (e.g. on the fluid receiving structure 202) for detecting the movement of charges as the vibration structure moves.

The transducer may be configured to generate the voltage because of the varying force exerted by the plurality of vortex swirls.

The first condition of the fluid may be a condition of the fluid being free of the plurality of vortex swirls. Correspondingly, the second condition of the fluid may be a condition of the fluid having the plurality of vortex swirls.

In various embodiments, the flow control structure 204 may be or may include an interconnecting channel having a width smaller than a width of the fluid receiving structure 202. The device may also include a (coupled) cavity coupled to the interconnecting channel so that the interconnecting channel is between the fluid receiving structure 202 and the (coupled) cavity. In various embodiments, the fluid receiving structure 202 may be or may include a cavity, i.e. a fluid receiving cavity, or a channel, i.e. a fluid receiving channel. The interconnecting channel may be referred to as a nozzle.

In various embodiments, the (coupled) cavity may be or may include a whistle type cavity or a Helmholtz (resonating) cavity. The (coupled) cavity may include a plurality of transducers. The determination mechanism may be further configured to determine the property of the fluid based on the first condition of the fluid. The fluid in the first condition may have a first pressure. The fluid in the second condition may have a second pressure. A first transducer of the plurality of transducers may be configured to generate the voltage. A second transducer of the plurality of transducers may be configured to determine the property of the fluid based on a difference between the first pressure and the second pressure. The second transducer may be configured to generate a voltage proportional or having a linear relationship with the difference between the first pressure and the second pressure. The transducers may include microbelts, micro-nets, micro-cantilevers, micro-leafs/butterfly-wings and/or micro-beams. The transducers may be of various suitable shapes and sizes. In various embodiments, the transducers may include nanostructures or microstructures. The first condition of the fluid may be a condition of the fluid having the first pressure. The second condition of the fluid may be a condition of the fluid having the second pressure.

In various embodiments, the (coupled) cavity may be or may include a Helmholtz cavity. The (coupled) cavity may include a plurality of transducers, e.g. piezoelectric structures, configured to generate the voltage. The determination mechanism may be further configured to determine the property of the fluid based on the first condition of the fluid. The fluid in the first condition may have a first pressure. The fluid in the second condition may have a second pressure. The device may further include a pressure sensor coupled between the fluid receiving structure and the (coupled) cavity. The pressure sensor may be configured to determine the property of the fluid based on a difference between the first pressure and the second pressure. The pressure sensor may be configured to determine the property of the fluid based on a difference between the first pressure and the second pressure. The first condition of the fluid may be a condition of the fluid having the first pressure. The second condition of the fluid may be a condition of the fluid having the second pressure.

The device may be or may include a energy harvester (EH) module. The fluid receiving structure 202 and the flow control structure 204 may be included in the energy harvester (EH) module. Additionally, the EH module may include the determination mechanism 206 and a voltage generation mechanism 208. The EH module may be configured to determine the property of the fluid and provide a voltage (convert at least partially kinetic energy of the fluid to electrical energy).

The device may include a measurement unit may include the fluid receiving structure 202, the flow control structure and the determination mechanism 206. The measurement unit may or may not include the voltage generation mechanism 208. If the measurement unit does not include the voltage generation mechanism 208, the voltage generation mechanism 208 may be included in a powering unit coupled to the measurement unit. The measurement unit may also be referred to as a measurement module.

The energy harvester (EH) module or measurement unit may also be coupled to a powering unit even if the energy harvester (EH) module or measurement unit includes a voltage generation mechanism 208.

The device may include a powering unit further coupled to the fluid receiving structure. The power unit may be coupled to the (coupled) cavity. The power unit may be coupled to the EH module or a measurement unit. The powering unit may be coupled to via an interconnecting channel such as a funnel tube. The powering unit may include one or more (additional) transducers may be configured to provide a further voltage. The one or more (additional) transducers may be configured to at least partially convert a further kinetic energy of the fluid to a further electrical energy. The one or more (additional) transducers may be within a (further coupled) cavity. The (further coupled) cavity may be coupled to the coupled cavity by a (further) interconnecting channel. In various embodiments, the (further coupled cavity) may include an obstruction, e.g. a bluff body, positioned at a predetermined positioned from the (further) interconnecting channel. The bluff body may be configured to generate a plurality of vortex swirls. The one or more (additional) transducers may be configured to be driven by the plurality of vortex swirls. The one or more (additional) transducers may be coupled to a capacitor such as a super capacitor, the super capacitor configured to store the electrical energy converted.

The device or determination circuit may further include a processor circuit. The processor circuit may also be referred to as an electronics processor module. The processor may be configured to determine or calculate the property of the fluid, e.g. the volumetric flow rate, based on one or more readings from the pressure sensor or the transducer. The processor circuit may alternatively or additionally determine or calculate data such as volume usage based on the property determined. The processor circuit may include one or more of a microcontroller unit, a microcontroller, a data logger, a super capacitor, a through silicon via/through silicon interconnects based integrated circuit, a sensor analog-to-digital conversion circuit and sensors.

The device may include a transmitter circuit and/or a transceiver circuit coupled to the processor circuit. The transmitter circuit and/or transceiver circuit may also be referred to as a signal transmission module. The transmitter circuit and/or a transceiver circuit may include an antenna. The transmitter circuit and/or a transceiver circuit may be configured to transmit data, e.g. data indicating the property of the fluid such as flow rate, volume usage etc to a remote location, such as a central location or a remote reader or a data logger. The data may be used for subsequent billing.

The processor circuit may be configured to store an identifier, which may be transmitted by the transmitter/transceiver circuit for identification of the device. The processor circuit may be coupled to a reader or a meter. The reader or meter may include an identifier.

The EH module may be configured to power the transmitter module or/and processor module.

The device or measurement unit may be or may include a gas flow meter for measuring a flow rate or quantity of a moving fluid. The device may measure the property using an open or closed conduit. The device may have a mechanical type, an inferential type or an electrical type flow meter. The gas meter may include a fixed restriction variable head type flow meter using different sensors such as orifice plates, venturi tubes, flow nozzles, pitot tubes or dall tubes, or a quantity meter such as positive displacement meter or mass flow meter. The variable head type flow meter may include a restriction of known dimensions (introduced along a pipeline). The restriction may cause a head loss or pressure drop and an increase in flow velocity.

FIG. 3 is a schematic 300 of a device for determining a property of a fluid according to various embodiments. The device may include a fluid receiving channel 302. The device may include an obstruction such as a bluff body 304. The device may further include a transmitting transducer 306a and a receiving transducer 306b. The transmitting transducer 306a and the receiving transducer 306b may be provided along the fluid receiving channel 302. The transmitting transducer 306a and the receiving transducer 306b may be provided may be provided downstream (with reference to flow of the fluid) from the bluff body 304. The transmitting transducer 306a may be provided on a first side of the fluid receiving channel 302 and the receiving transducer 306b may be provided on a second side of the fluid receiving channel 302.

The device may be or may include a vortex shedding meter. The operating principle of the vortex shedding meter may utilize the vortex shedding phenomenon. When a fluid stream encounters the obstruction or bluff body 304, the fluid may separate, move around the bluff body 304 and may continue to flow downstream. At the point of contact, eddy currents or vortex swirls may be formed alternately on either side of the bluff body 304. This may create a local increase in pressure and a local decrease in velocity on one side of the bluff body 304. Meanwhile, the bluff body 304 may also create a local decrease in pressure and a local increase in velocity on the other side of the bluff body 304. After shedding a swirl from one side, the process may be reversed and a vortex or a swirl may be shed from the other side. The frequency of this alternating shedding process may be proportional to the velocity of the flowing stream of fluid as the fluid passes the point of contact, i.e. the bluff body 304. The rate of vortex shedding may be detected by an ultrasonic, electronic, or fiber-optic sensor, e.g. transducers 306a, 306b, that monitors the changes in the vortex pattern, or von karman vortex street downstream from the bluff body 304. A von karman vortex street is a repeating pattern of swirling vortices caused by the unsteady separation of flow of a fluid around blunt bodies. The transducers 306a, 306b may transmit a pulsating output signal to external readouts or data acquisition equipment. There vortex shedding flow meter may not require moving parts.

FIG. 4 is a schematic 400 of a device for determining a property of a fluid according to various embodiments. The device may include a fluid receiving structure configured 402, e.g. a fluid receiving channel, to receive the fluid having a first condition. The device may further include a flow control structure 404, i.e. an obstruction such as a bluff body, coupled to the fluid receiving structure 402, the flow control structure 404 configured to change the first condition of the fluid to a second condition. The first condition of the fluid may be a condition of the fluid being free of the plurality of vortex swirls. The second condition of the fluid may be a condition of the fluid having the plurality of vortex swirls. The obstruction 404 may be configured to generate the plurality of vortex swirls in the fluid so that the fluid is the second condition.

The bluff body 404 may be arranged within the fluid receiving channel 402. The device may further include a vibration structure 410 attached to the obstruction 404. The vibration structure 410 may be configured to move at a frequency due to the plurality of vortex swirls.

The vibration structure 410 may include a transducer configured to determine the property of the fluid based on a varying force exerted by the plurality of vortex swirls. The transducer may be configured to generate the voltage because of the varying force exerted by the plurality of vortex swirls. In other words, the vibration structure 410 may include the a determination mechanism configured to determine the property of the fluid based on the second condition and a voltage generation mechanism configured to generate a voltage based on the second condition. The transducer may be or may include the determination mechanism and the voltage generation mechanism. The device may be referred to as a vortex shedding flow meter.

The vibration structure 410 may be a non-rigid structure mounted on the back of the bluff body 404. The vibration structure 410 may be configured to vibrate with the frequency of vortex shedding. The transducer may be a piezoelectric transducer or a triboelectric transducer. As a result, the structure 410 may exhibit piezoelectric effect or triboelectric effect and the vibrating frequency may be readout from the structure 410. The voltage output may be used to power the device. The voltage output may be used to power the processing circuit coupled to the structure 410. Further, the voltage may be used to determine a property of the fluid, e.g. measure a flow rate of the fluid.

The average fluid velocity may be proportional to the frequency of vortex shedding and the width of the bluff body. This proportionality may be defined as the Strouhal number, which is dimensionless. Therefore, $$St = f*d/v \qquad (1)$$

where: St=Strouhal number; f=frequency of vortex shedding; d=width of bluff body; v=average fluid velocity.

The actual width of a bluff body within a specific vortex meter may be fixed, and therefore constant. The frequency of vortex shedding may be linearly proportional to the average flowing velocity over a wide range of Reynolds numbers. The vortex shedding flow meter may operate accurately at Reynolds numbers from 10,000 up to 10,000,000.

The vortex shedding flow meter may be a volumetric flow meter. Therefore, to define the mathematics of vortex metering, the following relationship of volumetric flow may be defined:

$$Q = A*v \qquad (2)$$

where: $Q$=volumetric flow rate; $v$=average fluid velocity; $A$=cross sectional area of flow path.

If a Strouhal number is substituted for average fluid velocity ("$v$"), it becomes:

$$Q = f * d * A / St \quad (3)$$

Since the Strouhal number, and bluff body width, and the cross sectional area of the flow meter are all constants (which is defined as "$K$"), the equation may become:

$$Q = f / K \quad (4)$$

FIG. 5A is a schematic 500a of a device for determining a property of a fluid according to various embodiments. The device may include a fluid receiving channel 502. The device may include a flow control structure 504 such as nozzle 504. The device may further include cavity 512a, 512b. The cavity 512a, 512b may be a whistle type cavity and may include a first chamber 512a and a second chamber 512b coupled to the first chamber 512a. The nozzle 504 may be coupled to the first chamber 512a so that the nozzle 504 is between the fluid receiving channel 502 and the first chamber 512a. The first chamber 512a may include a plurality of transducers 514a, 514b. First transducers 514a of the plurality of transducers 514a, 514b may be configured to generate the voltage. A second transducer 514b of the plurality of transducers 514a, 514b may be configured to determine the property of the fluid based on a difference between the first pressure and the second pressure. The second transducer 514b may be configured to generate a voltage proportional or having a linear relationship with the difference between the first pressure and the second pressure. The fluid receiving channel 502 may also be referred to as a laminar flow unit (LFU). The difference between the first pressure and the second pressure may be referred to as an input air pressure.

The nozzle 504 may be configured to change the first condition of the fluid to a second condition. The device may further include a determination mechanism, i.e. second transducer 514b, configured to determine the property of the fluid based on the first condition and the second condition. The device may also include a voltage generation mechanism, i.e. 514a, configured to generate a voltage based on the second condition. The first condition of the fluid may be a condition of the fluid having the first pressure. The second condition of the fluid may be a condition of the fluid having the second pressure.

The whistle type cavity 512a, 512b may be integrated with the laminar flow unit 502. The laminar flow unit 502 may force the gas molecules to move in parallel paths along the length of the passage, nearly eliminating flow turbulence. In other words, the laminar flow unit 502 may be configured to generate a laminar flow of the fluid. The differential pressure drop may be measured within the laminar region. The Poiseuille Equation may quantify the relationship between pressure drop and flow and may be provided as follows:

$$Q = (P_1 - P_2) \pi r^4 / 8 \eta L \quad (5)$$

where: $Q$=volumetric flow rate; $P_1$=static pressure at the inlet; $P_2$=static pressure at the outlet; $r$=hydraulic Radius of the restriction; $\eta$=absolute viscosity of the fluid. Since $\pi$, $r$ and $L$ are constant, the equation may be rewritten as:

$$Q = K(\Delta P / \eta) \quad (6)$$

$K$ may be a constant factor determined by the geometry of the restriction. Equation (6) shows the linear relationship between volumetric flow rate ($Q$), differential pressure ($\Delta P$), and absolute viscosity ($\eta$) in a simpler form. Taken temperature effect into consideration to correct the viscosity and the gas density, actual mass flow rate of the gas may be determined. The relationship between volume flow and mass flow may be defined as:

$$\text{Mass flow rate} = \text{Volumetric flow rate} * \text{Density correction factor} \quad (7)$$

According to the experimental results, the amplitude of open-circuit voltage output ($V_{pp}$) of the transducer, i.e. the second transducer 514b, near the cavity inlet area may have a linear relationship with inlet air pressure drop ($\Delta P$). $\Delta P$ may be determined based on the open-circuit voltage output. The volumetric flow rate and mass flow rate may be determined or calculated according to the equations (6) and (7).

FIG. 5B is a plot 500b of voltage output (in mV) against input air pressure $\Delta P$ (in pounds per square inch or psi) illustrating the linear relationship between open-circuit voltage output and the input air pressure $\Delta P$.

FIG. 6A is an optical image 600a of a plurality of aluminum nitride micro-belt transducers 614a within a cavity 612a according to various embodiments. The cavity 612a may be a modified Helmholtz resonating cavity. An air inlet 604a may be coupled to the cavity 612a.

FIG. 6B is an optical image 600b of a plurality of aluminum nitride micro-belt transducers 614b within a cavity 612b according to various embodiments. The cavity 612b may be a (traditional) whistle type cavity with a first chamber and a second chamber. An air inlet 604b may be coupled to the cavity 612b.

FIG. 6C is an optical image 600c of a plurality of aluminum nitride micro-net transducers 614c within a cavity 612c according to various embodiments. The cavity 612c may be a (traditional) Helmholtz resonating type cavity. An air inlet 604c may be coupled to the cavity 612c.

FIG. 7 is a schematic 700 illustrating a device for determining a property of a fluid according to various embodiments. The device may include a fluid receiving structure 702 configured to receive the fluid having a first condition. The device may further include a flow control structure 704, i.e. an interconnecting channel, coupled to the fluid receiving structure 702. The flow control structure 704 may be configured to change the first condition of the fluid to a second condition. The fluid receiving structure 702 may be referred to as an inlet flow cavity.

The first condition of the fluid may be a condition of the fluid having the first pressure. The second condition of the fluid may be a condition of the fluid having the second pressure.

The device may also include a cavity 716, i.e. a functional cavity, coupled to the interconnecting channel 704 so that the interconnecting channel 704 is between the fluid receiving structure 702 and the cavity 716. The cavity 716 may be a Helmholtz resonating type cavity. The cavity 716 may include a plurality of transducers (not shown in FIG. 7) configured to generate the voltage. The plurality of transducers may be configured to generate a voltage based on the second condition. In other words, the voltage generation mechanism may be implemented by the plurality of transducers.

The device may further include a further cavity 720, i.e. a further functional cavity, and a further interconnecting channel 718 coupled between the further cavity 720 and the cavity 716. The further cavity 720 may include a further plurality of transducers (not shown in FIG. 7) configured to generate the voltage.

The device may further include an outlet flow cavity 724 and another interconnecting channel 722 coupled between the outlet flow cavity 724 and the further cavity 720. Fluid may flow in from an external channel or pipe into inlet flow cavity 702 (for instance through channel or pipe 726a). Fluid may flow out from the outlet flow cavity 724 into a further external channel or pipe (for instance through channel or pipe 726b).

The cavity 716 and/or cavity 720 may include an obstruction or bluff body. The fluid control structure may include the interconnecting channel and the obstruction.

The device may include a pressure sensor 728, such as a manometer, coupled between the fluid receiving structure 702 and the cavity 716. The pressure sensor 728 may be configured to determine the property of the fluid based on a difference between the first pressure and the second pressure. In other words, the determination mechanism may be implemented by the pressure sensor 728.

The narrow nozzles 704, 718 may serve as accelerators to increase the flow rate of inlet cavity gas, e.g. from flow rate of $V_1$ to the flow rate of $V_2$ at the outlet location of the nozzle 704, which results in a pressure drop from $P_1$ to $P_2$. The derivation of the expression of the volume flow rate may be summarized from equations (8)-(22).

The fluid may be compressible. The flow rate can be obtained if the gas is considered ideal and the flow is considered adiabatic.

The relation between pressure and velocity for flow of a compressible fluid through the narrow nozzle may be be found from the fluid and no external work done on or by the fluid and neglecting the very small datum level difference $(Z_1-Z_2)$, we have $$P_2 v_2 + \frac{V_2^2}{2g} + JE_2 = P_1 v_1 + \frac{V_1^2}{2g} + JE_1 \quad (8)$$

where E=internal molecular energy of fluid; J=work equivalent of heat; v=specific volume of fluid; g=acceleration due to gravity.

Employing the definition of enthalpy H may provide:

$$V_2^2 - V_1^2 = 2gJ(H_1 - H_2) \quad (9A)$$

For an idea gas and if specific heats are constant, $$H_1 - H_2 = \frac{KR}{J(K-1)} T[1-(P_2/P_1)^{(K-1)/K}] \quad (9B)$$

where K=ratio of specific heats=$C_p/C_v$; R=gas constant for a given gas; T=absolute temperature.

From the equation of continuity (conservation of mass)

$$W = \frac{A_2 V_2}{v_2} = \frac{A_1 V_1}{v_1} \quad (10)$$

where W is the mass flow rate, A is the cross-sectional area.

Combining the foregoing equations and manipulating, we get the relation for flow of ideal gases.

$$W = A_1 \beta^2 \sqrt{\frac{2gK}{K-1} \frac{P_1}{v_1} \frac{(P_2/P_1)^{2/K}-(P_2/P_1)^{(K+1)/K}}{1-\beta^4(P_2/P_1)^{2/K}}} \quad (11)$$

where β is the ratio between the diameter of the restriction and the inside diameter of the pipe as provided in Equation (20).

A manometer, however, measures $(P_1-P_2)$ and not $P_2/P_1$. Therefore, it may be necessary to convert the equation (11) such that W is a function of $(P_1-P_2)$. Write $P_2/P_1=1-x$ such that $x=1-(P_2/P_1)$. In general, for gas flow $P_2/P_1$ is very close to unity such that x is very close to zero.

$$(P_2/P_1)^{2/K} \cong 1-(2/K)x = 1-(2/K)+(2/K)(P_2/P_1) \quad (12)$$

Hence, $$(P_2/P_1)^{(K+1)/K} \cong 1-(K+1/K)+(K+1/K)(P_2/P_1) \quad (13)$$

Using equation (13), equation (11) may be modified to $$W = CA_1 \beta^2 \frac{2g(P_1-P_2)}{v_1[1-\beta^4(P_2/P_1)^{2/K}]} \quad (14)$$

where C is the discharge coefficient.

By determining the mass flow rate for incompressible fluids and multiplying with Y, flow rate for compressible fluids can be found out and Y may be easily shown as $$Y = \sqrt{\frac{1-\beta^4}{1-\beta^4(P_2/P_1)^{2/K}} \frac{K(P_2/P_1)^{2/K}}{K-1} \frac{1-(P_2/P_1)^{(K-1)/K}}{1-(P_2/P_1)}} \quad (15)$$

Instead of calculating Y from the equation (15) empirical relations may be suggested which give good results for limited $(P_2/P_1)$ values, such as $0.8 < 1.0$.

$$Y=1-[0.41+0.35\beta^4](P_1-P_2/KP_1) \quad (16)$$

When the gas contains moisture, a further correction may be required to account correctly for the density of the vapour $$M = 1 + \frac{K(HS/S)-1)}{P} \quad (17)$$

where $P_v$=Vapour pressure (abs);
$S_v$=Vapour specific gravity referred to air at the same pressure and temperature;
S=Specific gravity of the gas; and
P=Pressure of the gas
The specific volume of the gas may be found from $$v = \frac{yRT}{P} \quad (18)$$

where y=compressibility factor; and
R=gas constant.
The flow equation for gases may be provided as $$Q = KA_2 Y \frac{v_b}{M_b} \sqrt{\frac{2gM_i(p_u - p_d)}{v_1}} \quad (19)$$

where $v_b$=Specific volume of gas at base condition;
$v_1$=Specific volume of gas at upstream conditions;
$M_i$=Moisture factor at upstream conditions;
$M_b$=Moisture factor at base conditions;

$\rho_m$ = weight density of manometer fluid;
$\rho_f$ = weight density of fluid over the manometer fluid;
h = differential at restriction, liquid column height; and
Q = volumetric flow rate.

Most variable head meters may depend on a restriction (narrow nozzle) in the flow path to produce a change in velocity. For the usual circular pipe, the Beta ratio is the ratio between the diameter of the restriction and the inside diameter of the pipe.

$$\beta = d/D \quad (20)$$

where d = diameter of the restriction (narrow nozzle); and
D = inside diameter of the pipe (front cavity in this disclosure).

The discharge coefficient, $C_d$ may be defined as the ratio between actual volumetric flow rate and ideal volumetric flow rate:

$$C_d = \frac{q_{actual}}{q_{ideal}} \quad (21)$$

where $q_{actual}$ = Actual volumetric flow rate; and
$q_{ideal}$ = Ideal volumetric flow rate (Theoretical)
The flow Coefficient, K, may be defined as:

$$K = C_d/\sqrt{1-\beta^2} \quad (22)$$

where K = Flow coefficient;
$C_d$ = discharge coefficient; and
β = ratio of diameters = d/D FIG. 8 is a schematic 800 of a device for determining a property of a fluid according to various embodiments. The device may include an energy harvester (EH) module 830. The energy harvester (EH) module 830 may be similar to that illustrated in FIG. 7. The EH module 830 may include a (coupled) cavity. The device may include nozzle 804 coupled to the (coupled) cavity. The (coupled) cavity may be or may be a Helmholtz resonator type cavity. The (coupled) cavity may include functional elements or transducers 832, e.g. piezoelectric micro-belts. The (coupled) cavity may include a bluff body. The bluff body may be provided between the nozzle 804 and the functional elements or transducers 832. The device may further include a pressure sensor 828 coupled with a fluid receiving structure and the (coupled) cavity. Displacement sensors may be used alternatively or additionally to pressure sensor 828. The energy harvester (EH) module 830 may include an inlet nozzle-functional cavity-outlet nozzle structure.

The device may include a capacitor or a supercapacitor 834. The capacitor or a supercapacitor 834 may be coupled to the functional elements or transducers 832. The device may also include processing circuit or processor 836. Further, the device may include a radio frequency module or transmitter circuit 838a. The radio frequency module or transmitter circuit 838a may include an antenna 838b. The device may further include power lines 840 electrically coupled to the processing circuit or processor 836 and the radio frequency module or transmitter circuit 838a. The power lines 840 may electrically couple the processing circuit or processor 836 and the radio frequency module or transmitter circuit 838a to the capacitor or a supercapacitor 834.

Pressurized gas flow transmitted in the pipeline may be directed into the inlet cavity (i.e. the fluid receiving structure) of the EH module, which may be then accelerated by the narrow nozzle(s) 804. In various embodiments, the fluid receiving structure may be or may include a laminar flow unit (LFU) and the (coupled) cavity may be or may include a whistle type cavity. The differential pressure drop in the laminar flow unit (LFU) before the whistle cavity type may be used to measure the gas flow rate. The pressure drop may be determined by the amplitude of the open circuit voltage output of the micro-belt transducers 832 that is located in the cavity. The volumetric flow rate and mass flow rate may be obtained through feeding data indicating the pressure drop into the electronics processor 836. After that, the data may be transferred to the RF module 838a to be transmitted as signals. One cycle of wireless gas meter remote reading may thus be completed. Each meter in the system may include a reader, which may be electrically connected to an electronics processor 836. The reader may store an identifier of the corresponding meter. The meter may be connected to a data logger via a wireless transmission protocol. The total gas volume consumption in a time period may be recorded by the processor 836 that equipped in the gas meter. When the vehicle of the utility provider passes by the gas meter and is within a predetermined distance from the gas meter, the gas equipped RF module 838a waked up by a control signal transmitted from data logger and may start to transmit a readout or data of the gas volume consumption to the receiving terminal of the data logger in the vehicle. The energies generated from the functional elements (piezoelectric material stacks or triboelectric materials) of the EHs module may continuously supply the power to support the transmission and processing of data. In order to scavenge more energies from intensive vibration of them, pre-positive bluff body induced vortex shedding effect and Helmholtz resonating effect may be designed and introduced to the EH module. The harvested energy generated by the transducers may be stored in nearby integrated super capacitor 834. The harvested energy may be delivered to power gas meter built-in electronics 836 (including MCU, processor, micro-controller and/or meter data logger) and the RF module or transmitter 838. The microelectromechanial system (MEMS) self-powered EH module may not require a battery, making battery-less remote wireless gas meters possible.

FIG. 9 is a schematic 900 of a device for determining a property of a fluid according to various embodiments. The device may include a gas rate measurement module or measurement unit 930. The device may also include a powering unit 940 coupled to the measurement unit 930 via an interconnecting channel or branch conduit (not shown in FIG. 9). The fluid may flow from the measurement unit 930 to the interconnecting channel to a funnel tube before flowing into the powering unit 940. The powering unit 940 may include one or more transducers configured to provide a (further) voltage. The device may include a capacitor or supercapacitor 934. The one or more transducers may be electrically coupled to the one or more transducers configured to provide a further voltage. The capacitor or supercapacitor 934 may be electrically coupled to the processor circuit and/or the transmitter circuit 938a (including antenna 938b). The powering unit 940 may include a nozzle. The powering unit may further include a bluff body arranged between the nozzle and the one or more transducers.

A powering cube may include the powering unit, the funnel tube and the supper capacitor. The powering cube may be equipped on any kind of gas meter. The gas flow rate measurement module 930 shown in FIG. 9 may be any available gas flow rate measurement module (including mechanical type and electrical types) or any measurement module described herein. A branch conduit may be added in the whole meter system, which may be connected to the outlet portion of existing flow rate measurement module 930. A branch portion of the gas flow may be directed into the powering unit 940 by the funnel tube. The gas flow may be accelerated by the narrow nozzle of EHs and cause an intensive vibration of the functional elements (piezoelectric material stacks and triboelectric materials) and which in turn may generate electrical energy. The electrical energy may be stored in the supercapacitor 934 that electrically coupled to the functional elements. The funnel tube of the powering cube may be mechanically connected (e.g. via a threaded connection) to the branch conduit, while the energies stored in the super capacitor may be interfaced (e.g. via a user-friendly interface such as a cable or an Universal Serial Bus (USB)) with the already built-in RF module 938a and processor. As long as the gas passes through the powering module, energies may be generated and stored accordingly.

The functional piezoelectric elements may be configured to harvest energy. The functional piezoelectric elements may include any kind of piezoelectric material like aluminum nitride (AlN), zinc oxide (ZnO), lithium niobate ($LiNbO_3$), or zirconate-titanate (PZT). The functional element may alternatively be a functional triboelectric element including a triboelectric material such as Kapton. The functional element may include or may be any type of structure including micro-belts, micro-nets, micro-leafs/butterfly wing and micro-cantilevers etc. with various shapes. In various embodiments, the functional element may include a soft piezoelectric material such as polyvinylidene Fluoride (PVDF) for a device with certain liquid or macromolecular gas applications.

FIG. 10 is a schematic 1000 showing a system integrating the energy harvesting module 1002, the processor circuit 1004 and the transmitter circuit 1006 according to various embodiments.

Wireless Sensor Networks (WSNs) may be widely used for wireless sensing and gas monitoring (on properties such as flow rate, pressure, viscosity and chemical). With the availability of an integration system (as shown in FIG. 10) to perform sensing, signal processing, communication, and data collection functions, coupled with the versatility that wireless networks afford, it may be possible to move away from fixed, hard-wired network installations in both new construction as well as retrofits of existing installations. The power processor module 1006 may be capable of capturing, converting, storing and delivering energy in a form that may be used to provide the power needed by the system it serves. The power processor module 1006 may need to address three areas for successful EHs implementations: Energy Conversion, Energy Storage, and Power Management. The use of EHs may remove one of the key factors limiting the proliferation of wireless nodes—the scarcity of power sources having the characteristics necessary to deliver the energy and power to the sensor node for years without battery replacement. Significant economic advantages may be realized when compared with hard-wired solutions. Additional savings may be realized by removing the significant costs of battery replacement. Combining EHs transducers 1002, an power processor module 1006, low power sensors, an energy aware microcontroller, and an optimized RF module 1004 may allow the possibility of delivering long life, low maintenance battery-less gas meter using wireless remote reading networks.

FIG. 11 is a schematic 1100 illustrating a wireless module according to various embodiments. The wireless module may include a wireless transceiver 1138 for transmitting and receiving signals, a MEMS EH transducer 1140 for generating electrical energy for powering the module, a super capacitor 1134 for storing the converted energy, an Energy Processing/Memory module or processor circuit 1136, TSV/TSI based IC 1144, a sensor A/D convertor 1142 and sensors 1130.

A system including a plurality of devices may be provided. FIG. 12A shows a schematic 1200a showing a system including a plurality of devices 1240a, 1240b, 1240c according to various embodiments. A first device 1240a may be fluidically coupled to a second device 1240b. The second device 1240b may be fluidically coupled to a third device 1240c. Each device 1240a, 1240b, 1240c may include one or more transducers. Each device 1240a, 1240b, 1240c may also include a flow control structure. A device 1240a, 1240b or 1240c may be configured to harvest energy, i.e. configured to generate a voltage. A device 1240a, 1240b or 1240c may additionally or alternatively be configured to determine the property of the fluid. The system may also be referred to as a multi cavity device or system. A first device may be coupled to a second device via a channel or nozzle. The channel or nozzle may have a width or cross-sectional area smaller than the width or cross-sectional area of the cavity. The cross-sectional area may refer to an area across the channel or cavity that is substantially perpendicular to flow of the fluid. Each device may include a Helmholtz cavity. FIG. 12B is a group 1200b of plots 1202a, 1202b, 1202c of output voltages (volts) as a function of time (milliseconds or ms). 1202a may represent the open voltage generated from device 1240a as a function of time. 1202b may represent the open voltage generated from device 1240b as a function of time. 1202c may represent the open voltage generated from device 1240c as a function of time. FIG. 12C is a group 1200c of frequency spectra plots 1204a, 1204b, 1204c of magnitudes (decibels of dB) as a function of frequency (kilohertzs of kHz). 1204a may represent the frequency spectra from device 1240a. 1204b may represent the frequency spectra from device 1240b. 1204c may represent the frequency spectra from device 1240c. The time and frequency spectra of the open circuit voltage spectrum $V_{open}$ corresponding to three cavities (as shown in FIGS. 12B-C) indicate that only two major frequencies (about 11 kHz and about 22 kHz) dominate the fluid vibration in the cavity. These frequencies may correspond to the first and second order modes of Helmholtz resonating in the cavities. The EHs transducer may have two characteristics: 1) cavity geometry determines the operating frequency; 2) the bluff body facilitates vibration and the vibration may be regularized by the vortex shedding effect. Fast Fourier Transform (FFT) spectrum reveals that most energy output for device with bluff body may be located around the cavity resonant frequency.

FIG. 13A is an image 1300a illustrating the simulated fluid behaviour in a single cavity energy harvester according to various embodiments. The bluff body 1302a may be configured to generate vortex street in a fluid. FIG. 13A is an image 1300a illustrating the simulated fluid behaviour in a single cavity energy harvester according to various embodiments. FIG. 13B is an image 1300b illustrating the simulated fluid behaviour in a three-cavity energy harvester according to various embodiments. The bluff bodies 1302b, 1302c, 1302d may be configured to generate vortex streets in the respective cavities. The bluff bodies 1302a, 1302b, 1302c, 1302d may help to initiate flow turbulence in micro-scaled cavities, which drives the functional piezoelectric to vibrate intensively and thus generates electrical energies for powering the devices. The cavities in devices I and III may serve as flow resistance to rectify the flow condition and the cavity in II is observed to have the most intensive turbulence among the three.

FIG. 14 is a schematic 1400 illustrating a method of forming a device for determining a property of a fluid according to various embodiments. The method may include, in 1402, providing a fluid receiving structure configured to receive the fluid having a first condition. The method may further include, in 1404, coupling a flow control structure to the fluid receiving structure, the flow control structure configured to change the first condition of the fluid to a second condition. The method may additionally include, in 1406, providing a determination mechanism configured to determine the property of the fluid based on the fluid having the second condition. The method may further include, in 1408, providing a voltage generation mechanism configured to generate a voltage based on the fluid having the second condition.

In other words, the method may include forming a fluid receiving structure which allows a fluid to flow through. The fluid receiving structure may include or may be fluidically connected to a flow control structure, which may be configured to change a first condition of the fluid to a second condition. The method may also include providing a determination mechanism configured to determine a property of the fluid. The method may further include providing a voltage generation mechanism configured to generate a voltage based on the fluid having the second condition.

The device may be formed by a complementary metal oxide semiconductor (CMOS) process or by precision machining.

The energy harvester (EH) module may be electrically intergrated with the electronics processor module (processor circuit) or the signal transmission module (transmitter circuit). The electronics processor module may be electrically connected to a reader equipped in the gas meter. The reader may store an identifier of the corresponding gas meter, and the gas meter may be connected to the data logger via a wireless transmission protocol supported by the signal transmission module (transmitter circuit). The energies generated by energy harvester (EH) module may be transferred and stored in the supercapacitor, which is electrically connected to the electronics processor module (processor circuit) and signal transmission module (transmitter circuit) for powering.

Methods described herein may further contain analogous features of any structure, device or system described herein. Correspondingly, structures, devices or systems described herein may further contain analogous features of any method described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for determining a property of a fluid, the device comprising:
   a fluid receiving structure configured to receive the fluid having a first pressure;
   a flow control structure coupled to the fluid receiving structure, the flow control structure configured to cause a pressure change of the fluid from the first pressure to a second pressure, wherein the flow control structure comprises an interconnecting channel having a width smaller than a width of the fluid receiving structure;
   a whistle type cavity coupled to the interconnecting channel so that the interconnecting channel is between the fluid receiving structure and the cavity;
   a transducer in the whistle type cavity, the transducer configured to generate a voltage as a measure of the pressure change for determination of the property of the fluid.

2. The device according to claim 1, wherein the whistle type cavity comprises an obstruction.

3. The device according to claim 1, wherein the transducer is positioned near an inlet of the whistle type cavity.

4. The device according to claim 1, wherein the voltage generated is linearly proportional to the pressure change.

5. The device according to claim 1, wherein the fluid receiving structure is adapted to generate a laminar flow of the fluid along the fluid receiving structure.

6. The device according to claim 1, further comprising: a processor for determining the property of the fluid from the voltage generated.

7. The device according to claim 1, wherein the transducer comprises one or more of a piezoelectric material, a triboelectric material, and a magnetic material.

8. The device according to claim 1, wherein the whistle type cavity comprises a plurality of transducers.

9. The device according to claim 8, further comprising:
   a capacitor coupled to at least one of the plurality of transducers.

10. The device according to claim 1, wherein the property of the fluid is a volumetric flow rate.

11. A method of forming a device for determining a property of a fluid, the method comprising:
   providing a fluid receiving structure configured to receive the fluid having a first pressure;
   coupling a flow control structure to the fluid receiving structure, the flow control structure configured to cause a pressure change of the fluid from the first pressure to a second pressure, wherein the flow control structure comprises an interconnecting channel having a width smaller that a width of the fluid receiving structure;
   coupling a whistle type cavity to the interconnecting channel so that the interconnecting channel is between the fluid receiving structure and the cavity;
   providing a transducer in the whistle type cavity, the transducer configured to generate a voltage as a measure of the pressure change for determination of the property of the fluid.

* * * * *